(12) United States Patent
Morishita et al.

(10) Patent No.: US 7,506,120 B2
(45) Date of Patent: Mar. 17, 2009

(54) DATA TRANSFER VIRTUALIZATION SYSTEM

(75) Inventors: Noboru Morishita, Yokohama (JP); Yasutomo Yamamoto, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 11/503,937

(22) Filed: Aug. 15, 2006

(65) Prior Publication Data

US 2006/0277378 A1 Dec. 7, 2006

Related U.S. Application Data

(63) Continuation of application No. 10/783,018, filed on Feb. 23, 2004, now Pat. No. 7,124,267.

(30) Foreign Application Priority Data

Dec. 27, 2003 (JP) ............................. 2003-418907

(51) Int. Cl.
*G06F 12/00* (2006.01)
(52) U.S. Cl. ..................................... 711/162
(58) Field of Classification Search .................. 711/162
See application file for complete search history.

(56) References Cited

U.S. PATENT DOCUMENTS

| | | | |
|---|---|---|---|
| 5,673,382 A | 9/1997 | Cannon et al. | |
| 6,240,494 B1 | 5/2001 | Nagasawa et al. | |
| 6,253,295 B1 * | 6/2001 | Beal et al. | 711/162 |
| 6,408,370 B2 | 6/2002 | Yamamoto et al. | |
| 6,420,494 B1 | 7/2002 | Soucek et al. | |
| 6,640,291 B2 * | 10/2003 | Fujibayashi et al. | 711/162 |
| 6,708,232 B2 | 3/2004 | Obara | |
| 6,752,120 B2 | 6/2004 | Saito et al. | |
| 6,754,792 B2 | 6/2004 | Nakamura et al. | |
| 6,779,093 B1 | 8/2004 | Gupta | |
| 6,996,672 B2 * | 2/2006 | Lubbers et al. | 711/114 |
| 6,996,689 B2 * | 2/2006 | Chatterjee et al. | 711/162 |

(Continued)

FOREIGN PATENT DOCUMENTS

JP  1-185408  7/1989

(Continued)

OTHER PUBLICATIONS

Structured Computer Organization, 2nd Edition, Tanenbaum, Prentice-Hall, Inc., p. 11, year of Publication: 1984, ISBN: 0138544239.

(Continued)

*Primary Examiner*—Brian R Peugh
(74) *Attorney, Agent, or Firm*—Mattingly, Stanger, Malur & Brundidge, P.C.

(57) ABSTRACT

When data in the first primary volume is migrated to the second primary volume, an access request from the host to the primary volume is transferred to the second primary volume. Further, the second storage system stores write data received from the host and data of the first primary volume received from the storage system, into the second primary volume. Out of data stored in the second primary volume, the second storage system sends data determined by management information received from the first storage system, to the third storage system.

20 Claims, 33 Drawing Sheets

U.S. PATENT DOCUMENTS

| | | |
|---|---|---|
| 2001/0011324 A1 | 8/2001 | Sakaki et al. |
| 2002/0004857 A1 | 1/2002 | Arakawa et al. |
| 2003/0004981 A1 | 1/2003 | Kaneda et al. |
| 2003/0033494 A1 | 2/2003 | Fujibayashi et al. |
| 2003/0126388 A1 | 7/2003 | Yamagami |
| 2003/0177321 A1 | 9/2003 | Watanabe |
| 2004/0078399 A1 | 4/2004 | Tabuchi et al. |
| 2004/0078637 A1 | 4/2004 | Fellin et al. |
| 2004/0107315 A1 | 6/2004 | Watanabe et al. |
| 2004/0128363 A1 | 7/2004 | Yamagami et al. |
| 2004/0145538 A1 | 7/2004 | Uchida et al. |
| 2004/0148443 A1* | 7/2004 | Achiwa ................ 710/36 |
| 2004/0153719 A1 | 8/2004 | Achiwa et al. |
| 2004/0193660 A1 | 9/2004 | Gagne et al. |
| 2004/0205294 A1 | 10/2004 | Nakayama et al. |
| 2004/0230859 A1 | 11/2004 | Cochran et al. |
| 2004/0260902 A1 | 12/2004 | Stanley et al. |
| 2005/0050115 A1 | 3/2005 | Kekre |
| 2005/0081091 A1 | 4/2005 | Bartfai et al. |

FOREIGN PATENT DOCUMENTS

| | | |
|---|---|---|
| JP | 11-85408 | 3/1999 |
| JP | 11-184641 | 7/1999 |
| JP | 2002-82775 | 3/2002 |
| JP | 2003-15931 | 1/2003 |
| JP | 2003-85018 | 3/2003 |
| JP | 2003-108315 | 4/2003 |
| JP | 2004-294642 | 10/2004 |

OTHER PUBLICATIONS

Ervin, "Managing Extended Distance EMC SRDF Semi-Synchronous Remote Copy,", Technical Support, Aug. 1999.

* cited by examiner

FIG.3A

| SEQUENCE NUMBER | TRANSFER/FORMALIZATION OBJECT INFORMATION | | CACHE MEMORY MANAGEMENT INFORMATION ADDRESS |
|---|---|---|---|
| | FORWARD ADDRESS | BACKWARD ADDRESS | |
| 1 | 0101 ··· | 1100 ··· | 1001 ··· |
| 3 | 0111 ··· | 0110 ··· | 0100 ··· |
| ⋮ | ⋮ | ⋮ | ⋮ |
| 17 | 1111 ··· | 1011 ··· | 1101 ··· |

FIG.3B

| SEQUENCE NUMBER COUNTER | 99 |
|---|---|
| TRANSFER OBJECT MANAGEMENT INFORMATION | 0100 ··· |
| | 1011 ··· |
| FORMALIZATION OBJECT MANAGEMENT INFORMATION | 0101 ··· |
| | 1011 ··· |

FIG.4A

| | |
|---|---|
| REMOTE COPY OBJECT FLAG | OFF/COPY SOURCE/COPY TARGET |
| SEQUENCE MANAGEMENT INFORMATION NUMBER | 1 ~ N |
| NEWEST SEQUENCE NUMBER | M |
| PAIR STATE | COPYING/DUPLICATED/SUSPENDING |
| DIFFERENTIAL BIT MAP | 010010 ··· |
| COPY SOURCE INFORMATION | COPY SOURCE 1 ADDRESS INFORMATION |
| | COPY SOURCE 2 ADDRESS INFORMATION |
| COPY SOURCE VALID FLAG | 1/2/TRANSITIONAL |
| COPY TARGET INFORMATION | COPY TARGET ADDRESS INFORMATION |
| READ/WRITE MODE | ORMAL/THROUGH/PENDING/DATA MIGRATING |
| DATA MIGRATION SOURCE INFORMATION | DATA MIGRATION SOURCE ADDRESS INFORMATION |
| DATA MIGRATION TARGET INFORMATION | DATA MIGRATION TARGET ADDRESS INFORMATION |
| DATA MIGRATION COMPLETION BIT MAP | 010010 ··· |

FIG.4B

| ADDRESS INFORMATION | STORAGE SYSTEM NUMBER | PORT NUMBER | VOLUME NUMBER |
|---|---|---|---|
| 00011 ··· | 00101 ··· | 11101 ··· | 01001 ··· |

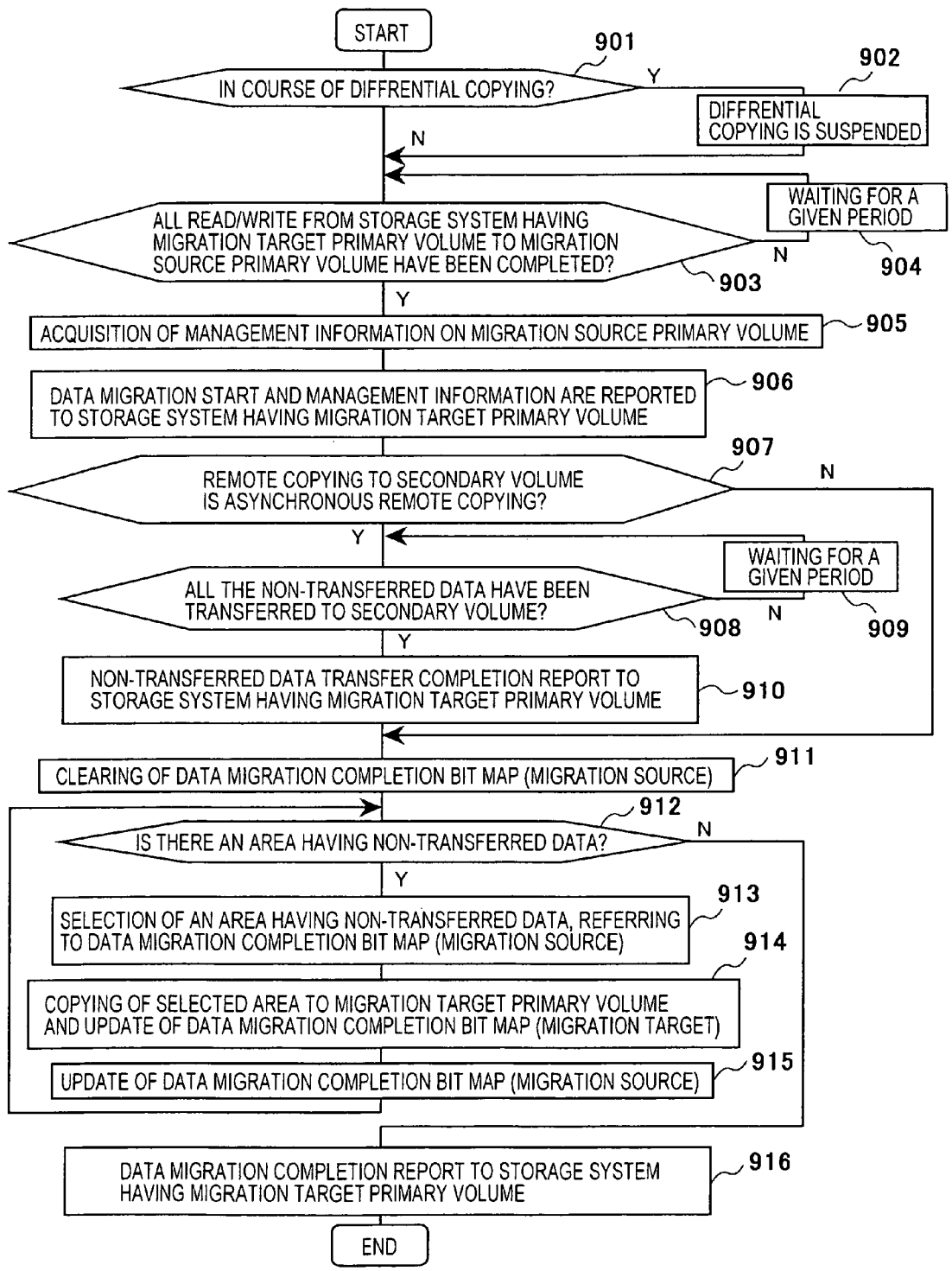

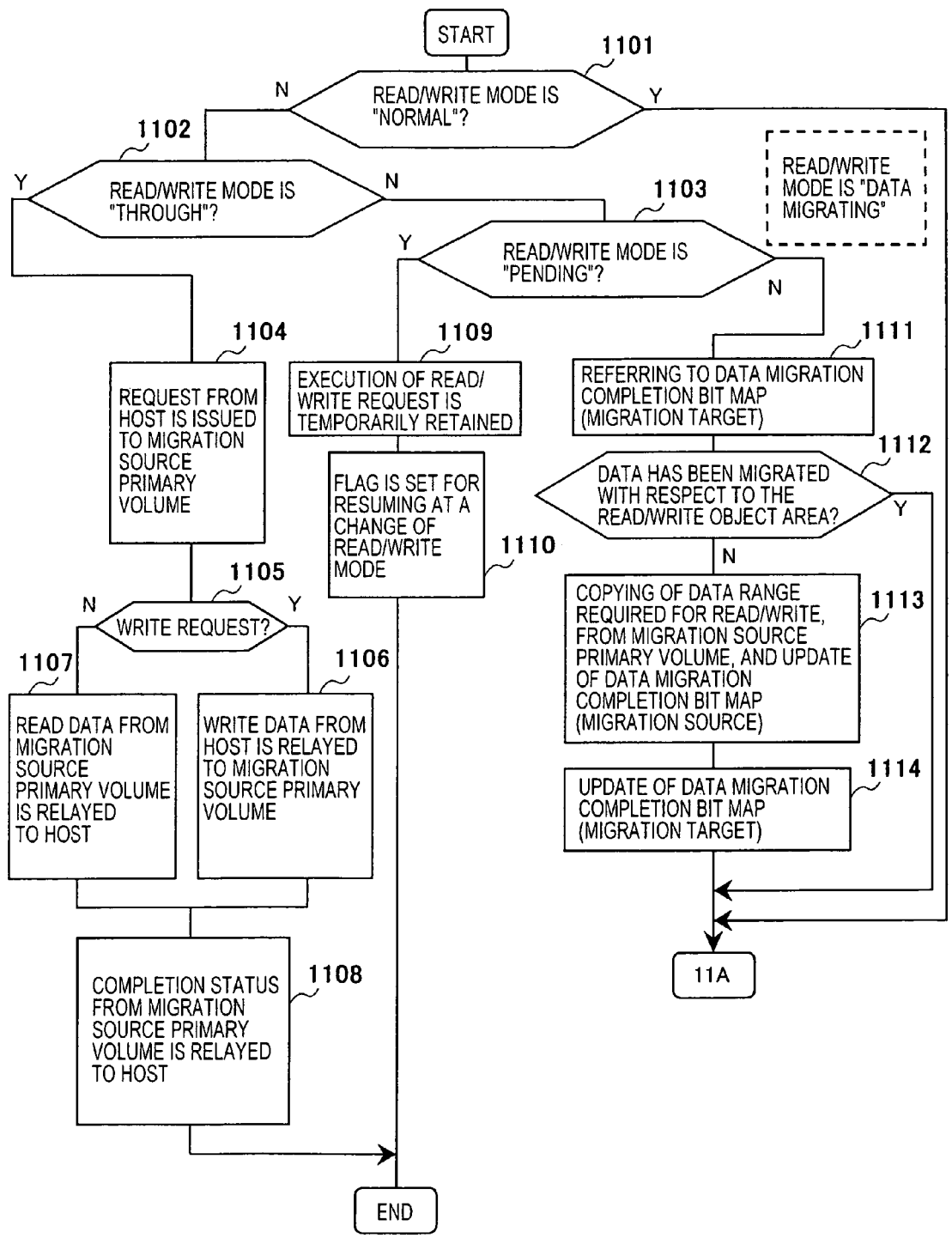

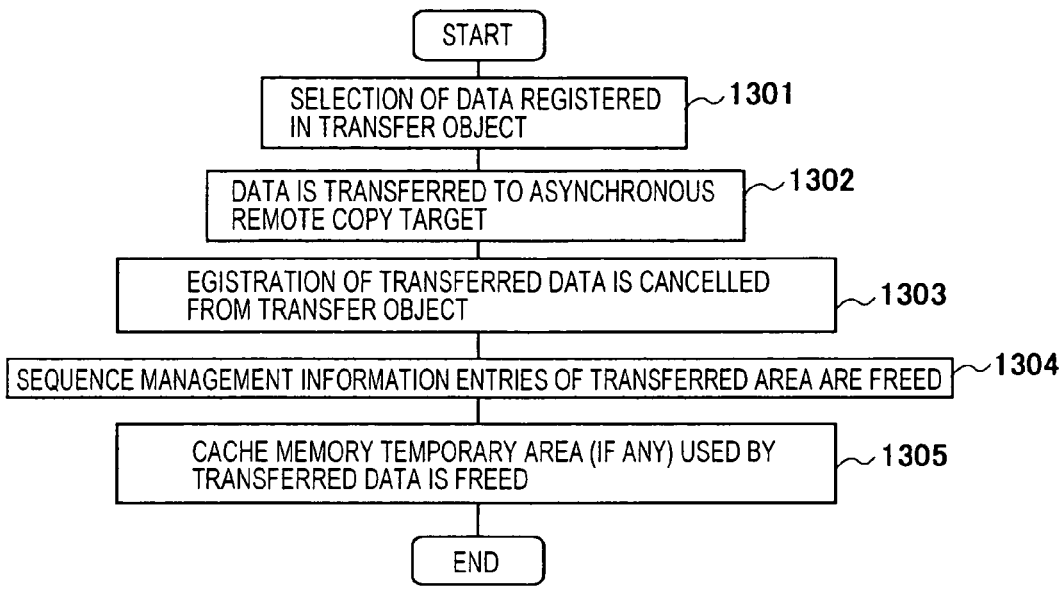
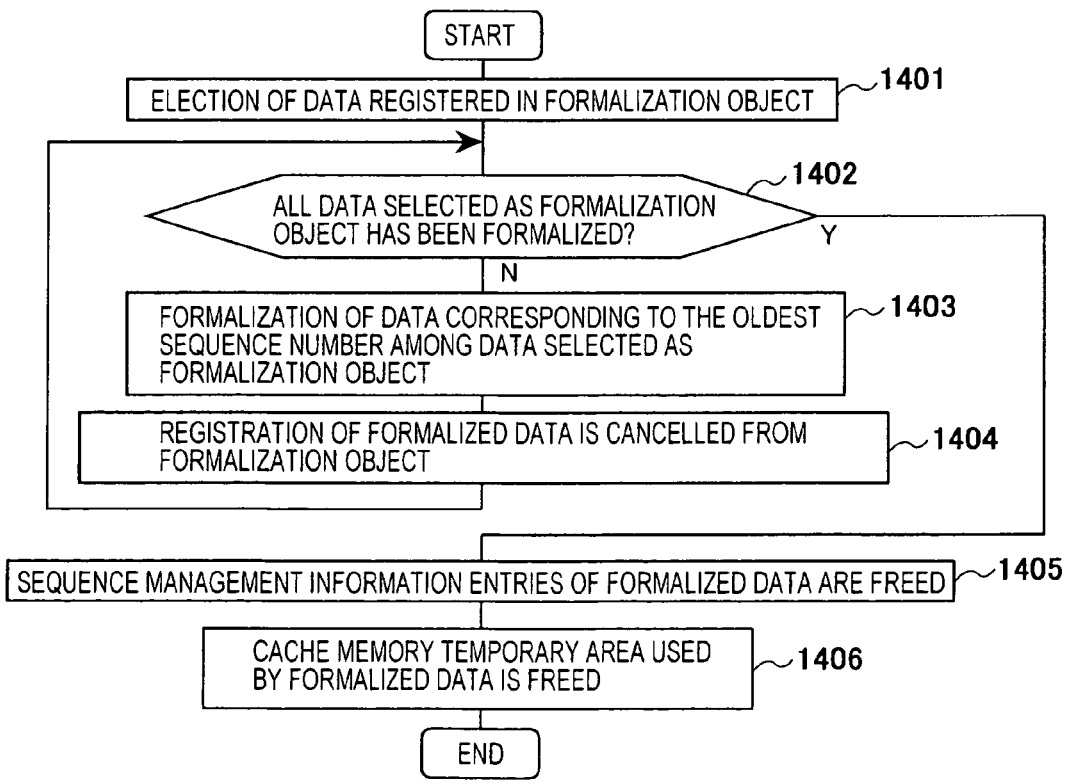

| SEQUENCE NUMBER | VOLUME UPDATE INFORMATION | | | DATA AREA ADDRESS |
|---|---|---|---|---|
| | VOLUME NUMBER | ADDRESS | DATA LENGTH | |
| ⋮ | ⋮ | ⋮ | ⋮ | ⋮ |
| 8245 | 4 | 1020 | 4 | 5120 |
| 8246 | 6 | 1520 | 16 | 5124 |
| ⋮ | ⋮ | ⋮ | ⋮ | ⋮ |
| 8261 | 5 | 2021 | 8 | 5233 |

FIG.22A

| SEQUENCE NUMBER COUNTER | | | 8262 |
|---|---|---|---|
| EMPTY JOURNAL MANAGEMENT INFORMATION | AVAILABLE TOP ADDRESS | MANAGEMENT AREA | 2762 |
| | | DATA AREA | 5241 |
| | AVAILABLE END ADDRESS | MANAGEMENT AREA | 2625 |
| | | DATA AREA | 4860 |
| JOURNAL-IN-USE MANAGEMENT INFORMATION | STORED | SEQUENCE NUMBER | 8261 |
| | | MANAGEMENT AREA ADDRESS | 2761 |
| | TRANSFERRED | SEQUENCE NUMBER | 8187 |
| | | MANAGEMENT AREA ADDRESS | 2687 |
| | APPLIED | SEQUENCE NUMBER | 8135 |
| | | MANAGEMENT AREA ADDRESS | 2635 |
| | DISCARDED | SEQUENCE NUMBER | 8125 |
| | | MANAGEMENT AREA ADDRESS | 2625 |

FIG.22B

| VOLUME LIST | VOLUME 1 | VOLUME NUMBER | 8 |
|---|---|---|---|
| | | NUMBER OF MANAGEMENT AREAS | 400 |
| | | NUMBER OF DATA AREAS | 800 |
| | VOLUME 2 | VOLUME NUMBER | 9 |
| | | NUMBER OF MANAGEMENT AREAS | 600 |
| | | NUMBER OF DATA AREAS | 1200 |
| | ⋮ | ⋮ | ⋮ |
| | VOLUME H | VOLUME NUMBER | 12 |
| | | NUMBER OF MANAGEMENT AREAS | 1000 |
| | | NUMBER OF DATA AREAS | 2000 |
| MANAGEMENT AREA ADDRESS TABLE | 0 | VOLUME NUMBER | 8 |
| | | ADDRESS | 0 |
| | 400 | VOLUME NUMBER | 9 |
| | | ADDRESS | 0 |
| | ⋮ | ⋮ | ⋮ |
| DATA AREA ADDRESS TABLE | 0 | VOLUME NUMBER | 8 |
| | | ADDRESS | 400 |
| | 800 | VOLUME NUMBER | 9 |
| | | ADDRESS | 600 |
| | ⋮ | ⋮ | ⋮ |

FIG.23

| | |
|---|---|
| REMOTE COPY OBJECT FLAG | OFF/COPY SOURCE/COPY TARGET |
| JOURNAL VOLUME FLAG | ON(OFF) |
| JOURNAL MANAGEMENT INFORMATION NUMBER | 1 ~ N |
| NEWEST SEQUENCE NUMBER | M |
| PAIR STATE | COPYING/DUPLICATED/SUSPENDING |
| DIFFERENTIVAL BIT MAP | 010010 ··· |
| COPY SOURCE INFORMATION | COPY SOURCE 1 ADDRESS INFORMATION |
| | COPY SOURCE 2 ADDRESS INFORMATION |
| COPY SOURCE VALID FLAG | 1/2/TRANSITIONAL |
| COPY TARGET INFORMATION | COPY TARGET ADDRESS INFORMATION |
| READ/WRITE MODE | NORMAL/THROUGH/ PENDING/DATA MIGRATING |
| DATA MIGRATION SOURCE INFORMATION | DATA MIGRATION SOURCE ADDRESS INFORMATION |
| DATA MIGRATION TARGET INFORMATION | DATA MIGRATION TARGET ADDRESS INFORMATION |
| DATA MIGRATION COMPLETION BIT MAP | 010010 ··· |

DATA TRANSFER VIRTUALIZATION SYSTEM

CROSS REFERENCES TO RELATED APPLICATIONS

This is a continuation application of U.S. Ser. No. 10/783,018, filed Feb. 23, 2004, now U.S. Pat. No. 7,124,267, This application claims priority from Japanese Application No. JP 2003-418907, filed Dec. 27, 2003.

BACKGROUND OF THE INVENTION

The present invention relates to a remote copy technique for duplicating data between storage systems without intervention of a host computer.

As a technique of avoiding data loss in a storage system in case of a disaster or the like, remote copying is employed to duplicate data to another storage system located in a remote place. Here, it is assumed that a storage system includes a storage device such as a disk or the like and a storage controller connected to the storage device for controlling data input and output to and from the storage device. The remote copying is a technique in which a storage system in a local site (hereinafter, also referred to as a primary storage system) transfers data in the primary storage system to another storage system (hereinafter, also referred to as a secondary storage system) located in a remote place (hereinafter, also referred to as a remote site), and the secondary storage system stores the data received from the primary storage system into the storage device of the secondary storage system. With respect to remote copying, there is disclosed a technique of duplicating data between different storage controllers without intervention of a host computer (hereinafter, referred to as a host) (See Patent Document 1).

Further, data migration is a technique of migrating data stored in an old storage system to a new storage system at the time of replacement of the old storage system with the new storage system. With respect to data migration, there are disclosed techniques in which data of a storage system is migrated to another storage system without stopping the job executed in a host computer so that the job may not be affected by the migration (See Patent Documents 2 and 3).

Further, there is disclosed a technique in which data migration is performed between storage systems while suppressing effect on remote copying to the minimum (See Patent Document 4). This technique can keep the remote copy function operable in the course of data migration. Further, completeness of data can be maintained, since update data is stored in both the old and new storage systems in the course of data migration.

Patent Document 1 is Japanese Non-examined Patent Laid-open No. 11-85408;

Patent Document 2 is Japanese Non-examined Patent Laid-open No. 11-184641;

Patent Document 3 is Japanese Non-examined Patent Laid-open No. 2003-108315; and Patent Document 4 is Japanese Non-examined Patent Laid-open No. 2003-85018.

SUMMARY OF THE INVENTION

When, for example, a new storage system is introduced to a local site, sometimes it becomes necessary to migrate data from an old storage system to the new storage system. In such a case, as remote copy operation to avoid data loss, it is desired to continue to duplicate data as the object of remote copying to a remote place even in the course of migration of the data in the primary storage system to the new primary storage system, and to continue the job executing in a host that accesses the data stored in the primary storage system.

It, however, is necessary to reset the path set between the old primary storage system and the secondary storage system before the data migration, to the path between the new primary storage system and the secondary storage system. Unfavorably, in the conventional techniques, remote copying is discontinued when the path connection is changed.

As a result, differential data (which the primary storage system receives from the host during the discontinuance of the remote copying, can not send to the secondary storage system, and therefore holds) between remote copy pair increases (hereinafter, data that is held in the primary storage system and not held in the secondary storage system is referred to as differential data). Thus, after resuming the remote copying, it takes time to transfer the differential data from the primary storage system to the secondary storage system in order that both the storage systems have the equivalent data.

Further, in the case where a local site suffers from an accident during discontinuance of remote copy process, sometimes a primary storage system loses update data received from a host during the discontinuance of the remote copy process.

Further, in the case of migration of data of a primary storage system that receives direct read/write requests from a host, it is necessary to suspend a read/write request from the host to the primary storage system, affecting the job executed by the host.

Thus, the present invention discloses a technique of migrating data in a primary storage system while continuing remote copy and continuing reception of read/write requests from a host.

A remote copy system comprises a first storage system having a first primary volume, a second storage system having a second primary volume, and a third storage system having a secondary volume that is connected with the first storage system and the second storage system.

The first storage system stores data received from a host computer into the first primary volume and sends the data stored in the first primary volume to the third storage system through a network. The third storage system stores the data received from the first storage system into the secondary volume.

When data stored in the first primary volume is migrated to the second primary volume, access requests from the host computer to the primary volume are transferred to the second primary volume. Further, the second storage system receives management information for identifying data to send to the third storage system, from the first storage system. The second storage system stores write data received from the host computer and the data stored in the first primary volume received from the first storage system, into the second primary volume. Further, the second storage system sends data that is determined based on the management information out of the data stored in the second primary volume, to the third storage system.

The third storage system stores the data received from the second storage system into the secondary volume.

According to thus-described remote copy system, data stored in the primary volume for remote copying can be migrated to a new primary volume while continuing remote copying and receiving and processing read/write requests from a host.

BRIEF DESCRIPTION OF THE DRAWINGS

FIGS. 3A and 3B are diagrams showing an example of sequence management information in the first embodiment;

FIG. 4A is a diagram showing an example of volume management information in the first embodiment;

FIG. 4B is a diagram showing an example of copy source information in the volume management information in the first embodiment;

FIG. 9 is a chart showing an example of processes performed by a data migration program in the first embodiment;

FIG. 10 is a chart showing an example of processes performed by a read/write program (primary) in the first embodiment;

FIG. 13 is a chart showing an example of processes performed by an asynchronous transfer program in the first embodiment;

FIG. 14 is a chart showing an example of processes performed by an asynchronous formalization program in the first embodiment;

FIG. 22A is a diagram showing an example of journal management information in the second embodiment;

FIG. 22B is a diagram showing an example of journal volume management information;

FIG. 23 is a diagram showing an example of volume management information in the second embodiment;

DETAILED DESCRIPTION OF THE PREFERRED EMBODIMENTS

Now, embodiments of the present invention will be described, although the present invention is not limited by those embodiments described below.

Embodiment 1

Figure 1:
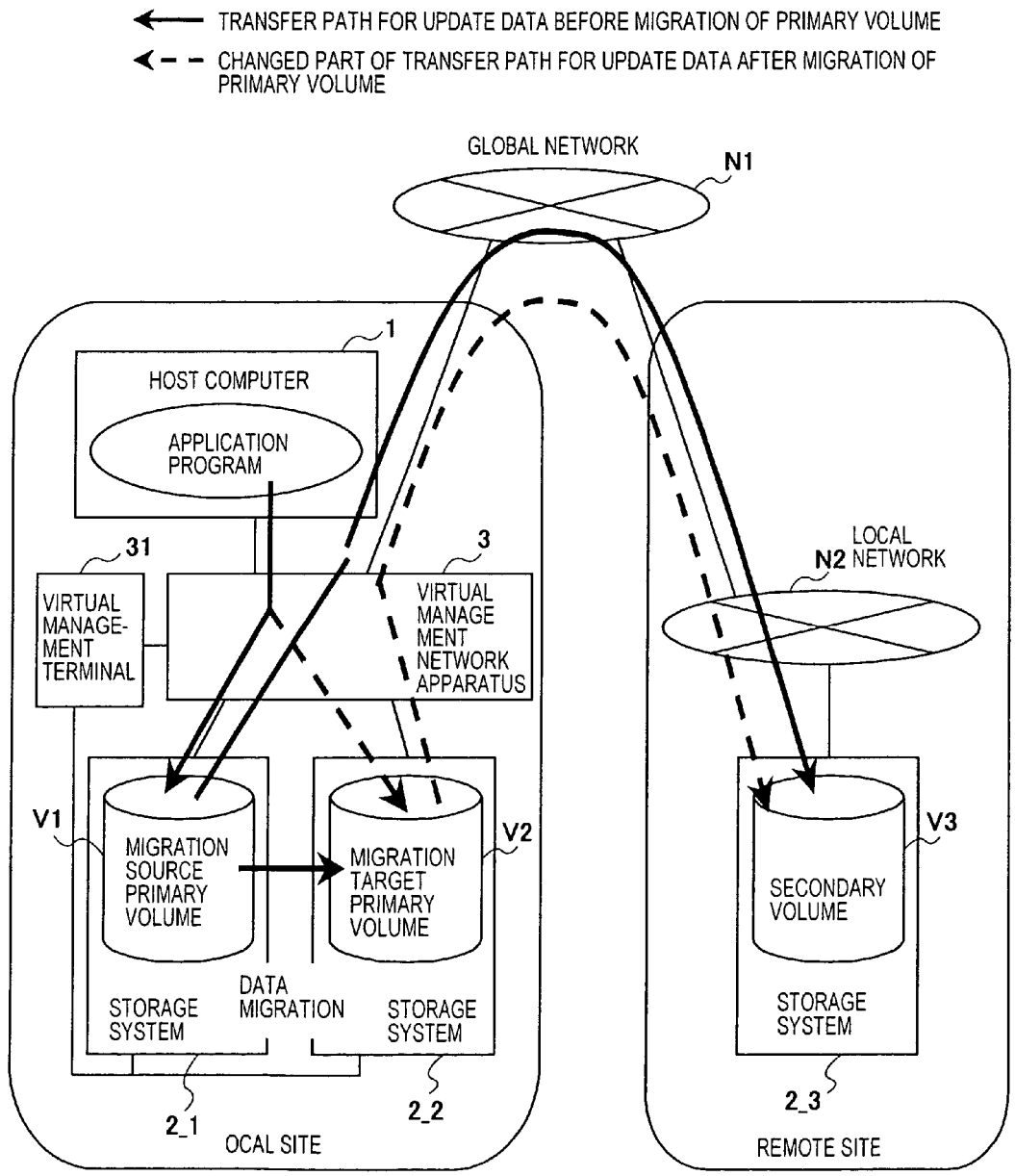
FIG. 1 is a diagram showing an example of a system configuration of a first embodiment.

FIG. 1 shows an example of a computer system according to a first embodiment of the present invention. In each of local and remote sites, hosts 1, storage systems 2 and the like are connected with one another through a local network N2 such as LAN (Local Area Network) or SAN (Storage Area Network). Here, in the local site shown in FIG. 1, a virtual management network apparatus 3 corresponds to a local network N2. Further, the number of hosts 1 and storage systems 2 connected to a local network N2 is not particularly limited. On the other hand, among the storage systems 2 existing in each site, storage systems 2 used for performing remote copy are connected through a global network N1. Generally, the global network N1 is a communication line for public use and, in many cases, is rented from a company that provides communication service on chargeable basis. However, the present invention is not limited by a configuration of the local networks N2 and the global network N1.

FIG. 1 shows that, in the local site, data (which is updated by a host 1) in a volume is migrated from a storage system 2_1 to a storage system 2_2 while continuing reception of data update from the host 1 and continuing remote copy.

The storage system 2_1 of the local site 1 is accessed by the host 1, and comprises a migration source primary volume V1 that stores data written by the host 1. The storage system 2_2 comprises a migration target primary volume V2 as a data migration target of the data in the migration source primary volume V1. Further, a storage system 2_3 of the remote site comprises a secondary volume V3 that becomes a remote copy target for the migration source primary volume V1 or the migration target primary volume V2. Here, a volume means a unit of treating a storage medium such as a magnetic disk, and may be a logical unit or a physical unit.

Further, the virtual management network apparatus 3 has a function of managing one or a plurality of volumes (hereinafter, referred to as a group of volumes) provided by one or a plurality of storage systems 2, as a volume pool, to assign any volume to the host 1. In particular, the virtual management network apparatus 3 has a function of presenting a virtual volume provided by the virtual management network apparatus 3 (i.e., a virtual volume accessible through the virtual management network apparatus 3) and hiding which storage system 2 has the substance of the volume constituting the virtual volume, to the host 1. Although FIG. 1 shows only one virtual management network apparatus 3, a plurality of virtual management network apparatuses 3 may operate in cooperation with one another.

Further, a virtual management terminal 31 is connected with the virtual management network apparatus 3 and the storage systems 2, and can perform operations such as instruction of a configuration change and monitoring of an internal state. In particular, the virtual management terminal 31 can give instructions of path switching and data migration.

Generally speaking, remote copying can be classified into two types.

One is synchronous remote copying in which a primary storage system 2 executes a write process corresponding to a write request from a host 1 or another storage system 2, and a primary storage controller transfers data to a secondary storage controller before issuing a write process completion report to the source of the write request.

The other is asynchronous remote copying in which a primary storage system sends a write process completion report to the source of a write request, and thereafter, a primary storage controller transfers data to a secondary storage controller asynchronously with the write request. In the case of asynchronous remote copying, to ensure log update order for an application such as a database executed in the host 1, it is necessary to update a volume in the secondary storage system in the order of update of a volume in the primary storage system 2. To implement this, there is a method in which the secondary storage controller stores data received from the primary storage controller to a volume (or a cache memory 26), in accordance with the below-mentioned sequence numbers. This method is called formalization. Here, the primary storage controller means a storage controller of the copy source that transfers data, and the secondary storage controller means a storage controller of the copy target to which the data is transferred from the primary storage controller.

Figure 2A:
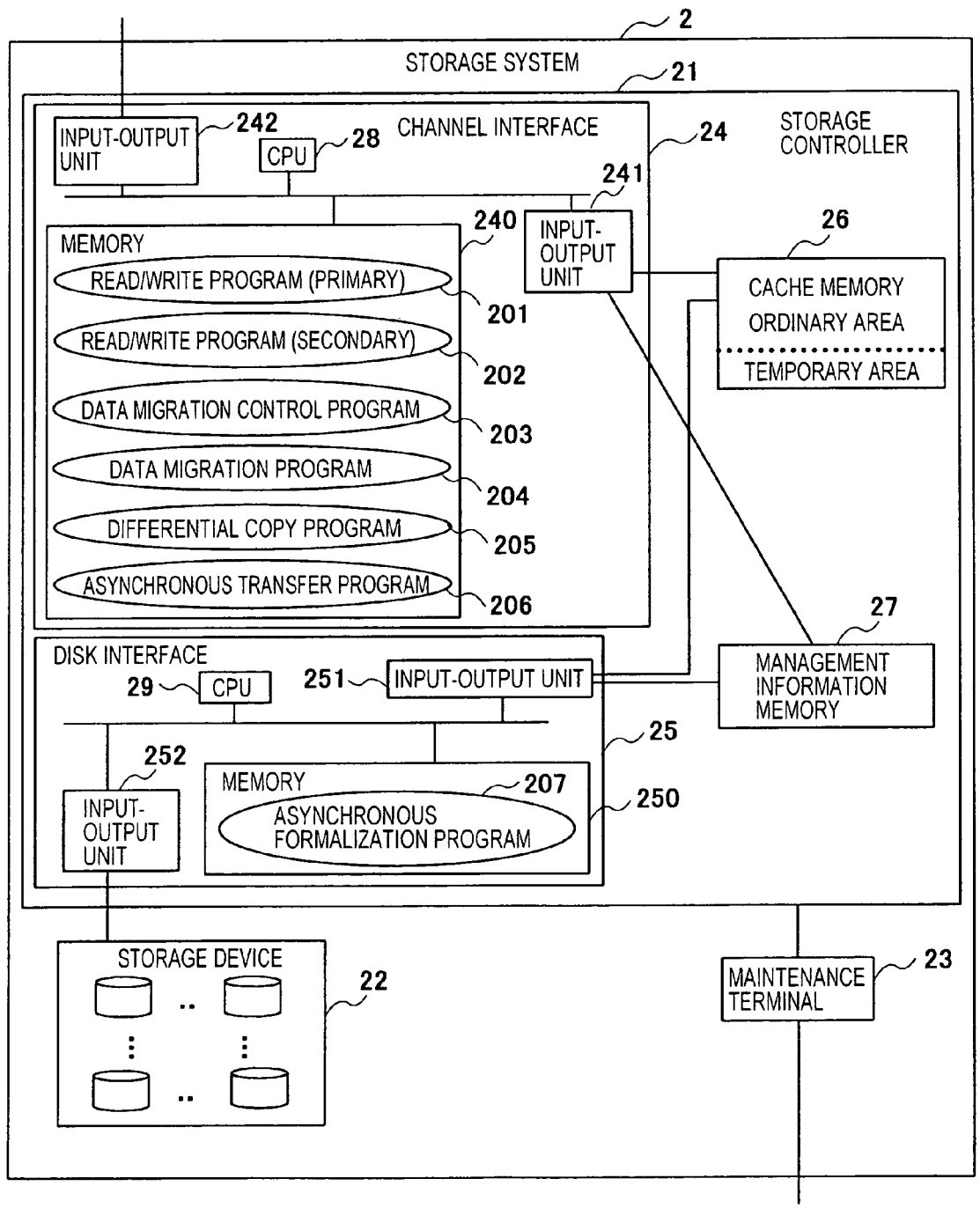
FIG. 2A is a diagram showing an example of a configuration of a storage system in the first embodiment.

FIG. 2A shows a configuration of a storage system 2. An encircled item shows software. A storage system 2 comprises a storage controller 21, one or a plurality of storage devices 22, and a maintenance terminal 23 for giving a notice to the storage controller 21 and displaying an internal state of the storage controller 21. The maintenance terminal 23 is not essential, and can be dispensed with.

The storage controller 21 comprises channel interfaces 24, disk interfaces 25, a cache memory 26, and a management information memory 27. Although not shown, there exist a plurality of channel interfaces 24 and a plurality of disk interfaces 25. Further, the cache memory 26 and the management information memory 27 are each of dual structure.

As another embodiment, instead of a CPU 28 in each channel interface 24 and a CPU 29 in each disk interface, one CPU may be provided in the storage controller 21 to control generally the channel interfaces 24, the disk interfaces 25, the cache memory 26 and the management information memory 27.

Each of the channel interfaces 24 and the disk interfaces 25 is connected with the cache memory 26 and the management information memory 27 with paths through an input-output unit 241 or input-output unit 251. The path connection may be switch connection or bus connection, and this does not limit the present invention.

Each channel interface 24 is connected to the host 1 and the copy source storage system 2 or the copy target storage system 2 through an input-output unit 242, the local network N2 and, the global network N1.

A memory 240 in each channel interface 24 stores a read/write program (primary) 201, a read/write program (secondary) 202, a data migration control program 203, a data migration program 204, a differential copy program 205 and an asynchronous transfer program 206.

The CPU 28 of a channel interface 24 executes the read/write program (primary) 201 to perform write process according to a write request from the host 1. Or, the CPU 28 executes the read/write program (secondary) 202 to perform write process according to a write request from the primary storage system 2.

The CPU 28 executes the data migration control program 203, the data migration program 204 and, in case of need, the differential copy program 205, to migrate data while continuing remote copying, and receiving and processing read/write requests from the host 1. The method of this data migration will be described later.

When the storage system 2 is a copy source of asynchronous remote copying, the CPU 28 executes the asynchronous transfer program 206 to perform process of transferring data to the secondary storage system 2 as the copy target, asynchronously with a write request (namely, after issuing completion report for the write request to the host).

Here, a remote copy object volume is a volume that becomes the object of storing of a duplicate of data to another storage system 2.

A disk interface 25 is connected to the storage devices 22 through an input-output unit 252. Further, a memory 250 in each disk interface 25 stores an asynchronous formalization program 207. When the storage system 2 is a copy target of asynchronous remote copying, the CPU 29 in a disk interface 25 executes the asynchronous formalization program 207 to perform process of data formalization and process of storing the formalized data to the storage devices 22.

The cache memory 26 is a nonvolatile memory for storing data, and stores data read or written from the host 1. A configuration of the cache memory is largely classified into an ordinary area and a temporary area. These areas will be described later.

The management information memory 27 is a nonvolatile memory for storing management information used for management of data, and stores sequence management information and volume management information required for remote copying between storage systems 2. Information stored in the management information memory 27 may be stored in the cache memory 26.

Figure 2B:
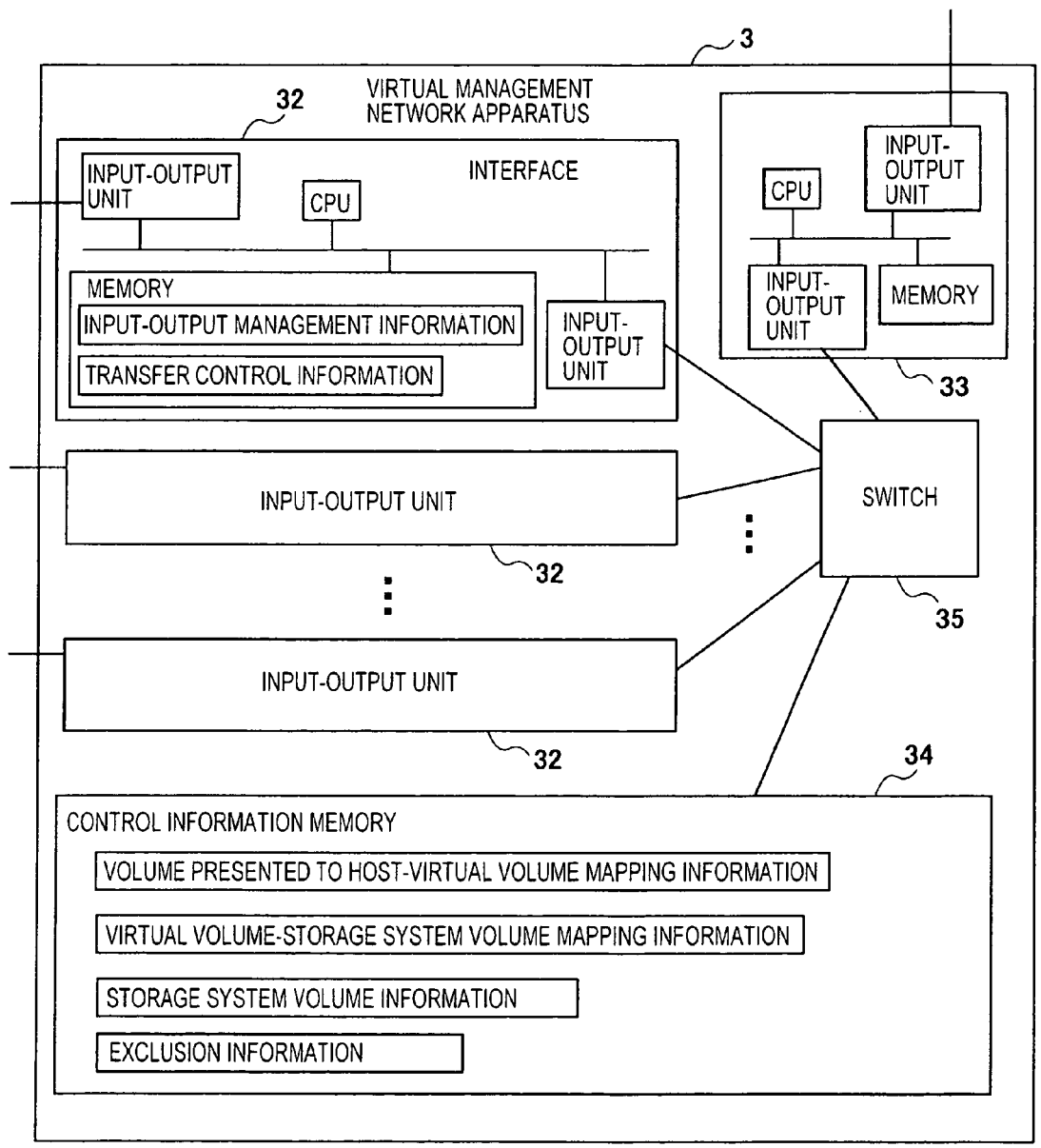
FIG. 2B is a diagram showing an example of a configuration of a virtual management network apparatus in the first embodiment.

FIG. 2B shows an example of a configuration of a virtual management network apparatus 3, although this example does not limit the present invention.

A virtual management network apparatus 3 comprises interfaces 32, a control module 33 and a control information memory 34, each being connected with another through a switch 35. The connection may be switch connection or bus connection, and this does not limit the present invention. There exist a plurality of interfaces 32. Further, the control information memory 34 has dual structure.

The interfaces 32 are each connected with the host 1, the storage systems 2 and the global network N1. A memory of each interface 32 stores input-output management information, transfer control information, and the like. The input-output management information is used for management of read/write requests, data, status, and the like, and the transfer control information (inside/outside of the virtual management network apparatus) specifies transfer targets of those inputs/outputs.

The control module 33 performs configuration change of the virtual management network apparatus 3 and monitors the internal state of the virtual management network apparatus 3. Or, the virtual management network apparatus 3 may be connected to the virtual management terminal 31 or the like such that the virtual management network apparatus 3 operates according to instructions from the outside such as the virtual management terminal 31.

The control information memory 34 holds: exclusion information, used for exclusively controlling update of data stored in the control information memory 34; storage system volume information, i.e., information on a volume of a storage system 2 detected by the virtual management network apparatus 3 (the storage system volume information includes inherent information, address information and volume numbers of the storage system 2); virtual volume-storage system volume mapping information, which indicates correspondence between the detected storage system volume and a virtual volume constituted by that volume; and volume presented to host-virtual volume mapping information, used for managing how a virtual volume is presented to the host 1 (namely, how a virtual volume is allowed to be accessed by the host 1); and the like.

The host 1 can access a virtual volume that is made to correspond to the host 1 itself in the volume presented to host-virtual volume mapping information. The host 1 accesses a virtual volume, by sending an access request that includes identification information of that virtual volume. Receiving the access request, the virtual management network apparatus 3 refers to the virtual volume-storage system volume mapping information, to find out the storage system 2 made to correspond to the virtual volume shown by the identification information of the access request and the volume number of that storage system 2. Then, the virtual management network apparatus 3 converts the access request received from the host 1 into an access request that includes the found-out volume number (or, the identification information of the found-out volume), to send the converted access request to the found-out storage system 2.

When the primary volume for remote copying is migrated from the migration source primary volume V1 to the migration target primary volume V2, the virtual management network apparatus 3 rewrites the virtual volume-storage system volume mapping information, based on a path switching instruction from the virtual management terminal 31. Namely, the virtual management network apparatus 3 rewrites the storage system volume corresponding to a primary virtual volume that is designated as the access target when the host 1 accesses the primary volume, from the migration source primary volume V1 to the migration target primary volume V2. As a result, even when the primary volume is changed from the migration source primary volume V1 to the migration target primary volume V2, the host 1 can continue to use the identification information of the primary virtual volume to access the migration target primary volume V2 after the change of the primary volume. Such rewriting of the virtual volume-storage system volume mapping information and sending of an access request according to the mapping information are performed when the CPU in the virtual management network apparatus 3 executes programs stored in the memory of the virtual management network apparatus 3.

FIGS. 3A and 3B show an example of contents of sequence management information. In the following, each line in FIG. 3A is called a sequence management information entry. The sequence management information is information used in asynchronous remote copying, for writing data into the secondary storage system 2 in the order (hereinafter, referred to as write order) in which the host 1 wrote the data into the primary storage system, namely for data formalization. The sequence management information includes a sequence number, transfer/formalization object information, a cache memory management information addresses, a sequence number counter, transfer object management information, and formalization object management information. The sequence management information includes a plurality of sequence numbers, pieces of the transfer/formalization object information, and a plurality of cache memory management information addresses, as information stored in sequence management information entry.

A sequence number is a number given according to the write order, for each unit of data inputted from the host 1.

In the case where the transfer/formalization object information is used as transfer object information, the transfer/formalization object information is information used for managing data transferred from the storage system 2 to another storage system 2, in a queue structure using sequence management information entries. In detail, a piece of transfer/formalization object information is addresses showing locations of other pieces of sequence management information entries, or addresses showing locations of the below-described transfer object management information, and these addresses are stored in the corresponding areas of the sequence management information entry concerned. Using the mentioned information, the storage system 2 can search for data to transfer, for example, next to the data corresponding to the sequence management information entry in question.

Further, in the case where the transfer/formalization object information is used as formalization object information, the transfer/formalization object information is information used for managing data that is an object of formalization, in the queue structure using sequence management information entries. In detail, a piece of transfer/formalization object information is addresses of other pieces of sequence management information entries, or addresses of the below-described formalization object management information, and these addresses are stored in the corresponding areas of the sequence management information entry concerned. Using the mentioned information, the storage system 2 can search for data to formalize, for example, next to the data corresponding to the sequence management information entry in question.

A cache memory management information address is information on the storage location (in the cache memory 26) of the data that is inputted from the host 1 and given with the sequence number concerned. Information (hereinafter, referred to as cache memory management information) used for management of allocation of the cache memory 26 is stored in the management information memory 27, which is usually used at the time of read/write processing from the host 1. A cache memory management information address is information indicating storage location of data in this cache memory management information. By referring to data in the cache memory management information, which is indicated by a cache memory management information address, the data written from the host 1 can be specified with respect to its address on the cache memory 26. Instead of a cache memory management information address, an address on the cache memory 26 may be directly stored in the sequence management information.

The sequence number counter is information used for recording the order of write from the host 1.

The transfer object management information is information used in the copy source of asynchronous remote copying, for managing the order of data transfer to the copy target, and is used as a queue header in the queue structure comprising sequence management information entries, as follows.

First, with respect to new-written data, the CPU 28 reserves a sequence management information entry. Next, the CPU 28 obtains a sequence number of the written data, from the sequence number counter. Then, the CPU 28 writes the obtained sequence number into the reserved sequence management information entry. Here, the CPU 28 updates the value of the sequence number counter. Further, a cache memory management information address is set, to specify the storage location of the written data in the cache memory 26.

Figure 3C:
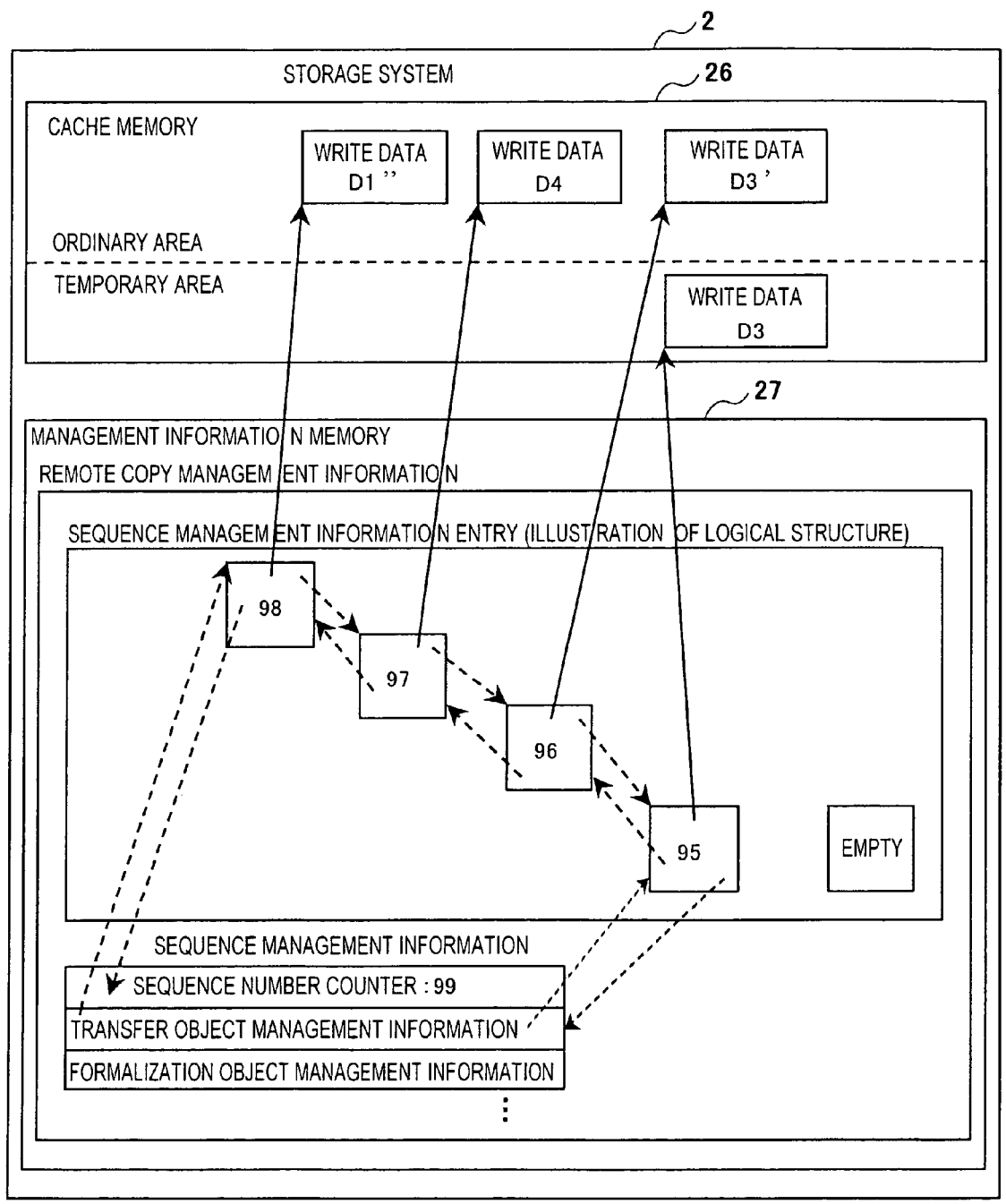
FIGS. 3C and 3D are diagrams showing relations between sequence management information and a cache memory in the first embodiment.
Figure 3D:
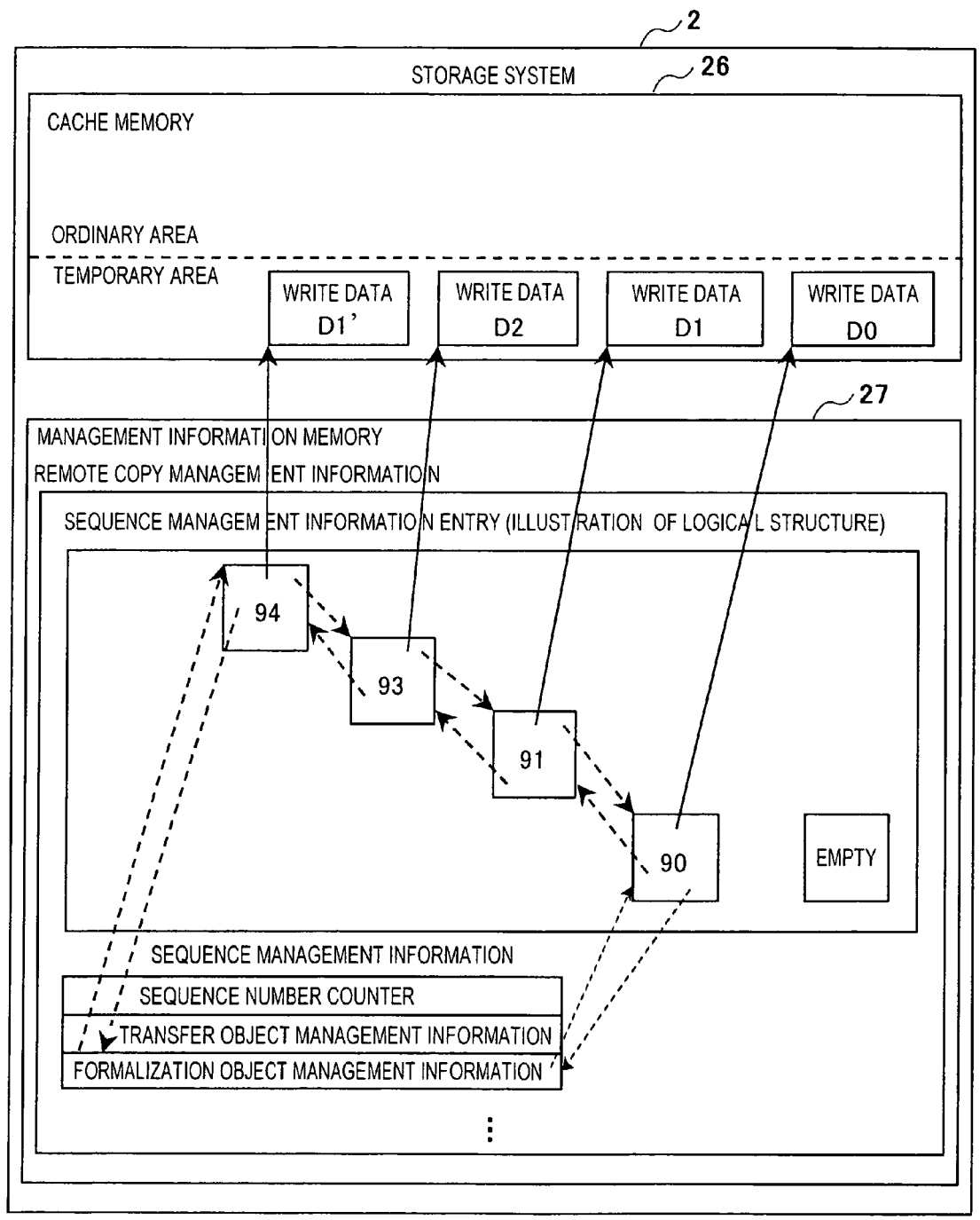

The CPU 28 refers to the queue of sequence management information entries with the transfer object management information as the queue header, from the top of the queue, and connects the new-generated sequence management information entry to the queue structure such that the sequence numbers are arranged in the advancing order (i.e., ascending order) (See FIG. 3C). The reason for this is as follows. Namely, the smaller the sequence number is, the earlier the data corresponding to that sequence number was written from the host 1, and transfer to the copy target is scheduled in the order of sequence numbers, starting from the data corresponding to the sequence management information entry at the top of the queue Here, in FIG. 3B, the upper column of the transfer object management information shows the address of the sequence management information entry at the top of the queue, and the lower column shows the address of the sequence management information entry at the end of the queue. Accordingly, when the new-written data is given with the newest sequence number, then, the lower column of the transfer object management information registers the address at which the sequence management information entry corresponding to that data is stored.

Hereinafter, data corresponding to the sequence management information entries connected to the queue structure having the transfer object management information as the queue header is called transfer object data. Further, an expression "registration of data to the transfer object data" means that the above-described operation is performed.

The formalization object management information is information used in the copy target of asynchronous remote copying, for managing write order of data that is received from the copy source but has not been formalized. The formalization object management information is used as a queue header of a queue structure comprising sequence management information entries.

With respect to non-formalized data also, operation similar to "registration of data to the transfer object data" is performed (See 3D). This is because, to secure the order of write from the host 1, formalization should be performed in the order of the sequence numbers, starting from the sequence management information entry at the top of the queue. Hereinafter, data corresponding to the sequence management information entries connected to the queue with the formalization object management information as the queue header is called formalization object data. Further, an expression "registration of data to the formalization object data" means that thus-described operation is performed.

As a sequence number used when data is registered to the formalization object data, the sequence number obtained by the CPU 28 from the sequence number counter is not used, but the sequence number given to the data subjected to remote copying from the storage system 2 locating at the local site is used. When data is sent from the local site to the remote site, write data received by the storage system 2_3 in the remote site is not received always in the order in which the host 1 wrote the data to the storage system 2 in the local site. In that case, the write order is not secured even if, each time when write data is received, the storage system 2_3 in the remote site obtains a sequence number from the sequence number counter to register the data to the formalization object data. Thus, in that case, it is necessary that the storage system 2 of the local site sends data together with the sequence number to the remote site, and the storage system 2_3 of the remote site registers the data to the formalization object, using the sequence number given to the data. However, in the case where sending of data from the local site to the remote site is not multiplex, but synchronous with respect to each sequence number (namely, data of a certain sequence number is sent, a reception report is received from the remote site, and thereafter, data of the next sequence number is sent), a new sequence number may be obtained from the sequence number counter in the remote site, to register data to the formalization object data.

FIGS. 4A and 4B show an example of volume management information.

Volume management information includes a remote copy object flag, a sequence management information number, the newest sequence number, a pair state, a differential bit map, copy source information, a copy source valid flag, copy target information, a read/write mode, data migration source information, data migration target information, and a data migration completion bit map.

Here, the volume management information may exist for each volume or for each storage area (for example, a plurality of volumes). A storage controller 21 can have volume management information for any unit of storage area sharable between storage systems 2, and can perform remote copying for each unit of storage area.

The remote copy object flag is information indicating whether the object volume is a remote copy object or not, and further, in the case of a remote copy object, whether the volume is the copy source or the copy target. In detail, the remote copy object flag shows OFF when the volume in question is not a remote copy object. In the case where the volume is a remote copy object, the remote copy object flag shows COPY SOURCE when the volume is the copy source, and COPY TARGET when the volume is the copy target.

The sequence management information number is a number that designates sequence management information corresponding to the volume managed by the volume management information.

The newest sequence number indicates the most advanced sequence number (i.e., the sequence number having the largest value) among the formalized data in the copy target volume of asynchronous remote copying.

The pair state is information showing a state of reflecting the contents of the copy source volume onto the copy target volume. The pair state can have three states. The first is a duplicated state in which the contents of the copy source volume coincides with the contents of the copy target, and only new update data sent from the host 1 to the copy source volume is in the course of copying. The second is a copying state in which the contents of the copy source volume and the contents of the copy target volume do not coincide, and, not only new update data sent from the host 1 to the copy source volume, but also data corresponding to nonconformity parts indicated by the differential bit map is in the course of being reflected onto the copy target volume. And, the third is a suspending state in which copying is not performed, and, when update data is sent from the host 1 to the copy source volume, a storage location of the update data is recorded in the differential bit map.

The differential bit map is information used for managing information (hereinafter, referred to as differential information) that records update locations in the volume (i.e., storage locations of data that is updated in the copy source volume only and has not been copied to the copy target volume). The differential bit map is used when volume contents should be coincided with another site as a result of, for example, disaster striking at a site.

In fact, remote copying itself can be performed also between different storage systems 2 within a same site.

The copy source information is information on a copy source registered as the copy source of the volume corresponding to the volume management information, and in detail, includes address information, a storage system manufacturer's number, a port number, a volume number, and the like (See FIG. 4B). Each line of FIG. 4B is called a copy source information entry. The copy source information may include a plurality of copy source information entries. The address information depends on the protocol of the network, and indicates the address of the copy source. The storage system manufacturer's number is a number specifying a storage system 2 on the network. The port number is a number specifying an external connection path of a channel interface 24 in the storage system 2. The volume number is the number of the copy source that stores data to be copied to the volume corresponding to the volume management information.

The copy source valid flag is information indicating which copy source is the current copy source among the copy sources registered in the copy source information. In the example shown in FIG. 4A, either of three kinds of information, i.e., "the copy source 1 is valid", "the copy source 2 is valid", and "transitional (temporarily both the copy source 1 and the copy source 2 are valid)" can be registered. In the case where there are N (N>=3; N:natural number) kinds of copy source information, the copy source valid flag indicates either "a copy source M (M=1~N; M:natural number) is valid" or "transitional (data is under migration from a copy source J to a copy source K (J≠K, J,K<=N, J,K: natural number))".

The copy target information is information on a copy target that is registered as the copy target of the volume corresponding to the volume management information, and the configuration of the copy target information is similar to the copy source information. Similarly to the copy source information, there may be a plurality of copy target information entries, but the description is omitted for the sake of simplification.

The read/write mode is information indicating a method of processing read/write. For example, in FIG. 1, seen from the storage system 2_2 having the migration target primary volume V2, there are four modes with respect to read/write requests from the host 1 to the migration target primary volume 2, namely: a normal mode in which the storage system 2_2 having the migration target primary volume V2 processes requests; a through mode in which requests are delivered to the storage system 2_1 having the migration source primary volume V1, and the storage system 2_2 relays the processing; a pending mode in which requests are temporarily retained in the storage system 2_2; and a data migrating mode in which the storage system 2_2 processes requests while migrating necessary data from the migration source primary volume V1 to the migration target primary volume V2. The read/write modes of the migration source primary volume V1 and the secondary volume V3 are set at the normal mode.

The data migration source information is information on a data migration source registered as the data migration source of the volume corresponding to the volume management information, and the configuration of the data migration source information is similar to the copy source information.

The data migration target information is information on a data migration target registered as the data migration target of the volume corresponding to the volume management information, and the configuration of the data migration target information is similar to the copy source information.

The data migration completion bit map is information used for managing information (hereinafter, referred to as differential information) that records locations for which data migration is completed in the migration source primary volume V1 and the migration target primary volume V2 (namely, storage locations of data that has been already migrated from the volume V1 to the volume V2).

Registration of the copy source information, the copy target information, the data migration source information and the data migration target information is performed by a user himself or a maintenance operator or the like.

The sequence management information is set in advance in a plurality of pieces so that each piece corresponds to one or a plurality of volumes, and each piece of sequence management information is associated with a piece of volume management information or a pieces of volume management information. The sequence management information corresponding to volume management information is specified by the sequence management information number included in the volume management information. Such setting and association are performed by a user himself or a maintenance operator or the like.

Figure 5:
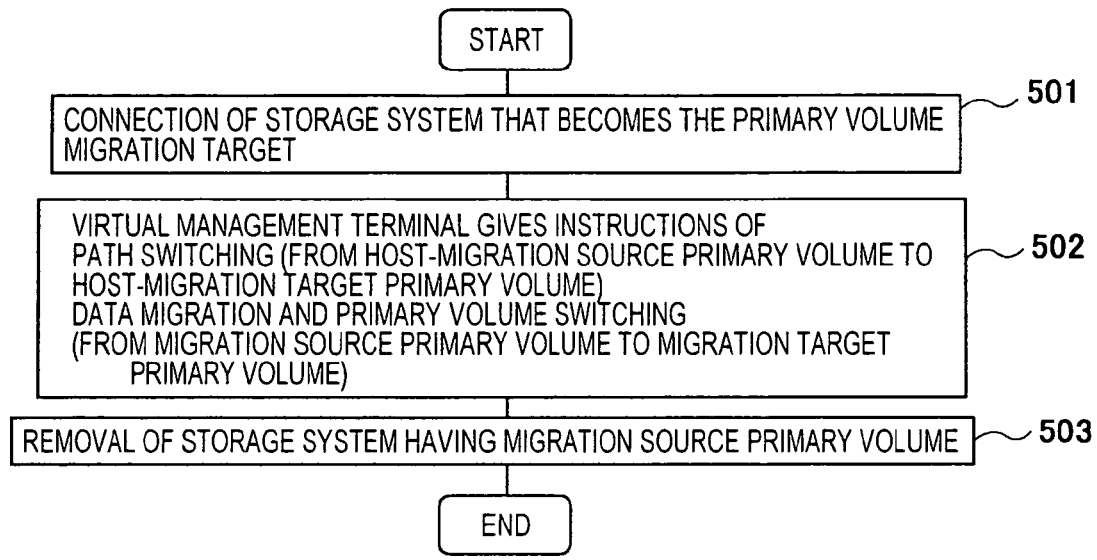
FIG. 5 is a chart showing an outlined example of a primary volume migration procedure in the first embodiment.

FIG. 5 shows an example of a migration procedure for the primary volume of the remote copying. Generally speaking, a primary volume migration procedure is divided into: connection of the storage system 2_2 that becomes a data migration target for the data in the primary volume (Step 501); a path switching instruction and a data migration and remote copy primary volume switching instruction from the virtual management terminal 31 (Step 502); and removal of the storage system 2_1 having the migration source primary volume V1 (Step 503). In the following, details of each step will be described.

Figure 6:
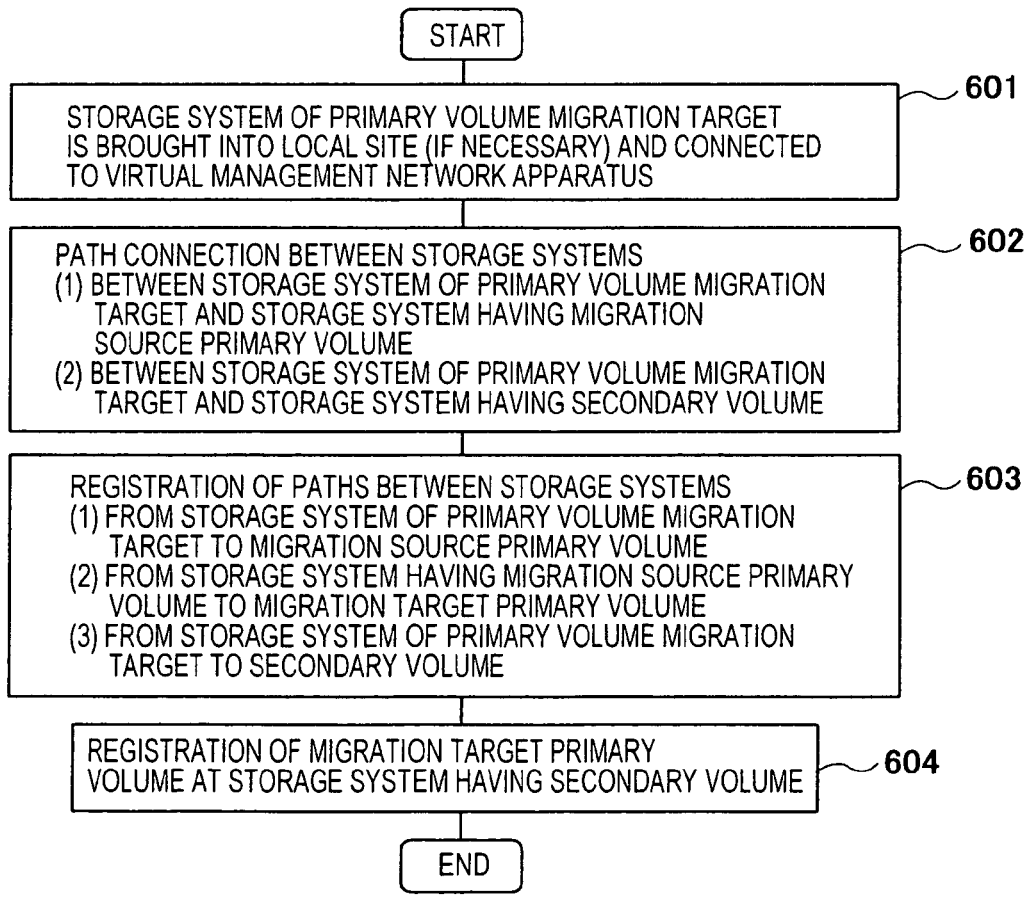
FIG. 6 is a chart showing an example of a connection procedure for a storage system as a primary volume migration target in the first embodiment.

Referring to FIG. 6, will be described a procedure of connecting the storage system 2_2 that becomes the data migration target for the data in the primary volume of the remote copying in step 501 of FIG. 5

First, in the case where a storage system 2_2 that is to be the migration target of the primary volume is not prepared in the local site, the administrator brings the storage system 2_2 into the local site, and connects the storage system 2_2 to the virtual management network apparatus 3 (Step 601). In the case where the storage system 2_2 has been already connected, Step 601 is not required. A state of volumes mounted in the storage system 2_2 connected to the virtual management network apparatus 3 may be confirmed by the virtual management network apparatus 3 automatically at the time of connection.

Next, the administrator connects paths between the storage systems 2 (Step 602). The paths to connect are paths between the storage system 2_2 that becomes the primary volume migration target and the storage system 2_1 that has the migration source primary volume V1, and a path between the storage system 2_2 that becomes the primary volume migration target and the storage system 2_3 that has the secondary volume V3 as the copy target of remote copying. When the paths are connected, those paths may be connected separately from paths connected to the virtual management network apparatus 3.

Next, the virtual management terminal 31 accesses the volume management information in each storage system 2, to register the paths between storage systems 2 (Step 603). The paths to be registered are (1) a path from the storage system 2_2 that becomes the primary volume migration target to the storage system 2_1 that has the migration source primary volume V1, (2) a path in the reverse direction to the above-mentioned path, and (3) the path from the storage system 2_2 that becomes the primary volume migration target to the storage system 2_3 that has the secondary volume V3 as the copy target of remote copying. In detail, as shown in FIGS. 4A and 4B, the virtual management terminal 31 registers the following information. Namely, in the case of (1), as the data migration source information of the volume management information of the migration target primary volume V2, are registered the address information, the storage system number and the port number of the storage system 2_1 that becomes the primary volume migration source and the number of volume V1 that is the primary volume migration source volume. In the case of (2), as the data migration target information of the volume management information of the migration source primary volume V1, are registered the address information, the storage system number and the port number of the storage system 2_2 that becomes the primary volume migration target and the number of the volume V2 that is the primary volume migration target. And, in the case of (3), as the copy target information of the volume management information of the migration target volume V2, are registered the address information, the storage system number and the port number of the storage system 2_3 that has the secondary volume V3 and the volume number of the secondary volume V3.

The path of (1) is used when a read/write request from the host 1 is relayed at the storage system 2_2 of the data migration target. Or, the path of (1) is used for migrating object data when the object data does not exist in the storage system 2_2 that becomes the primary volume migration target at the time of differential copying or requesting of read/write from the host 1. The path of (2) is used for data migration from the migration source primary volume V1 to the migration target primary volume V2. The path of (3) is used after switching the remote copy primary volume from V1 to V2, to perform remote copying from the migration target primary volume V2 to the secondary volume V3.

Last, the virtual management terminal 31 registers the migration target primary volume V2 with the storage system 2_3 having the secondary volume V2 (Step 604). In detail, as shown in FIGS. 4A and 4B, as the copy source information of the volume management information of the volume V3, are registered the address information, the storage system number and the port number of the storage system 2_2 that becomes the primary volume migration target, and the volume number of the migration target primary volume V2. Then, the processing is ended.

Figure 7:
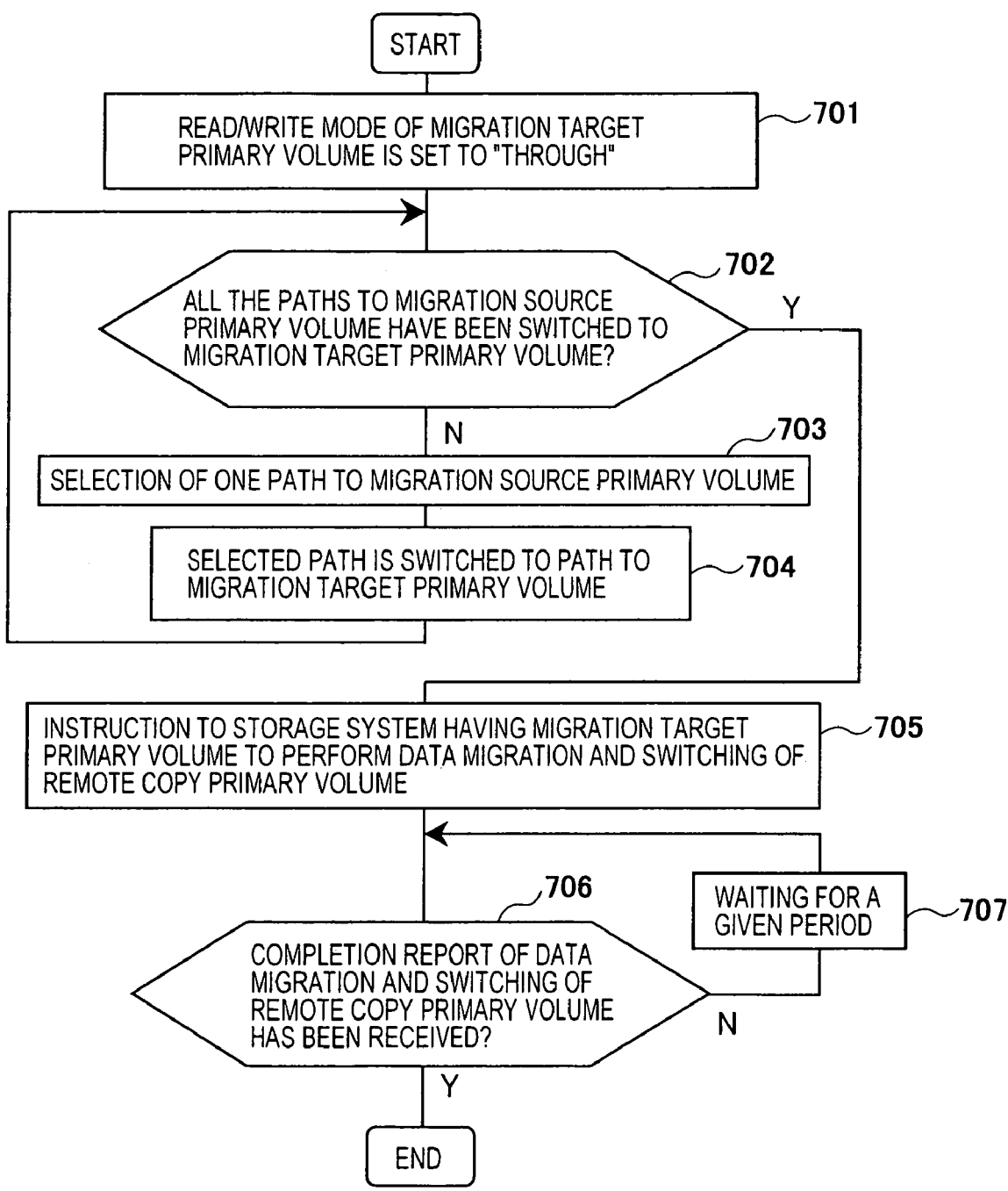
FIG. 7 is a chart showing an example of a path switching instruction and a data migration and remote copy primary volume switching instruction from a virtual management terminal in the first embodiment.

Referring to FIG. 7, will be described instructions corresponding to Step 502 shown in FIG. 5, i.e., a path switching instruction, and an instruction of data migration and remote copy primary volume switching to the storage system 2_2 having the migration target volume V2. These instructions are given from the virtual management terminal 31 to the virtual management network apparatus 3.

First, the virtual management terminal 31 accesses the volume management information of the migration target storage system 2_2, to set the read/write mode of the migration target primary volume V2 at the through mode (Step 701). As a result, all commands issued from the host 1 to the migration target primary volume V2 are transferred to the migration source primary volume V1.

Next, the virtual management terminal 31 judges whether all the paths from the host 1 to the migration source primary volume V1 have been switched to paths from the host 1 to the migration target primary volume V2 (Step 702).

In the case where all the path to the migration source primary volume V1 have not been switched to the migration target primary volume V2 (N in Step 702), the virtual management terminal 31 selects one of the paths from the host 1 to the migration source primary volume V1 (Step 703), and instructs the virtual management network apparatus 3 to switch the selected path to a path from the host 1 to the migration target primary volume V2 (Step 704). When a path is in use to perform requests from the host 1 at the time of switching the path, the following countermeasures, for example, may be employed depending on the functions of the virtual management network apparatus 3. Namely, (1) the current requests from the host 1 are processed with respect to the migration source primary volume V1, while newly-received requests from the host 1 are transferred to the migration target primary volume V2; (2) the current requests from the host 1 are processed with respect to the migration source primary volume V14 and newly-received requests from the host 1 are retained in the virtual management network apparatus 3, and, after completion of all the current requests from the host 1, the path is switched, and the retained requests from the host 1 are transferred to the migration target primary volume V2; or (3) all the current requests from the host 1 are once made to end in errors, and, in the mean time, the path is switched so that, when those requests are retried from the host 1, the retried requests are issued into the path to the migration target volume V2. Further, in the case where there exist a plurality of paths to the migration source primary volume V1, the virtual management terminal 31 may instruct the virtual management network apparatus 3 to switch the plurality of paths at the same time, instead of Steps 702-704.

Receiving the path switching instruction from the virtual management terminal 31, the virtual management network apparatus 3 rewrites the virtual volume-storage system volume mapping information so that the migration target primary volume V2 after the change can be accessed using the same virtual volume identification information used by the host 1 for accessing the primary volume of the remote copying, without changing the identification information of the virtual volume, as described above.

The above-described method of path switching is an example, and does not limit the present invention.

In the case where all the paths from the host to the migration source primary volume V1 have been switched to the migration target primary volume V2 (Y in Step 702), the procedure proceeds to Step 705.

Then, the virtual management terminal 31 instructs the storage system 2_2 having the migration target primary volume V2 to perform data migration and switching of the remote copy primary volume (Step 705).

Next, the virtual management terminal 31 judges whether a completion report with respect to data migration and switching of the remote copy primary volume has been received from the storage system 2_2 having the migration target primary volume V2 (Step 706). In the case where the completion report with respect to data migration and switching of the remote copy primary volume has not been received (N in Step 706), the virtual management terminal 31 waits for a given period (Step 707), and performs the process of Step 706 again. In the case where the completion report with respect to data migration and switching of the remote copy primary volume has been received (Y in Step 706), the virtual management terminal 31 ends the processing.

Figure 8A:
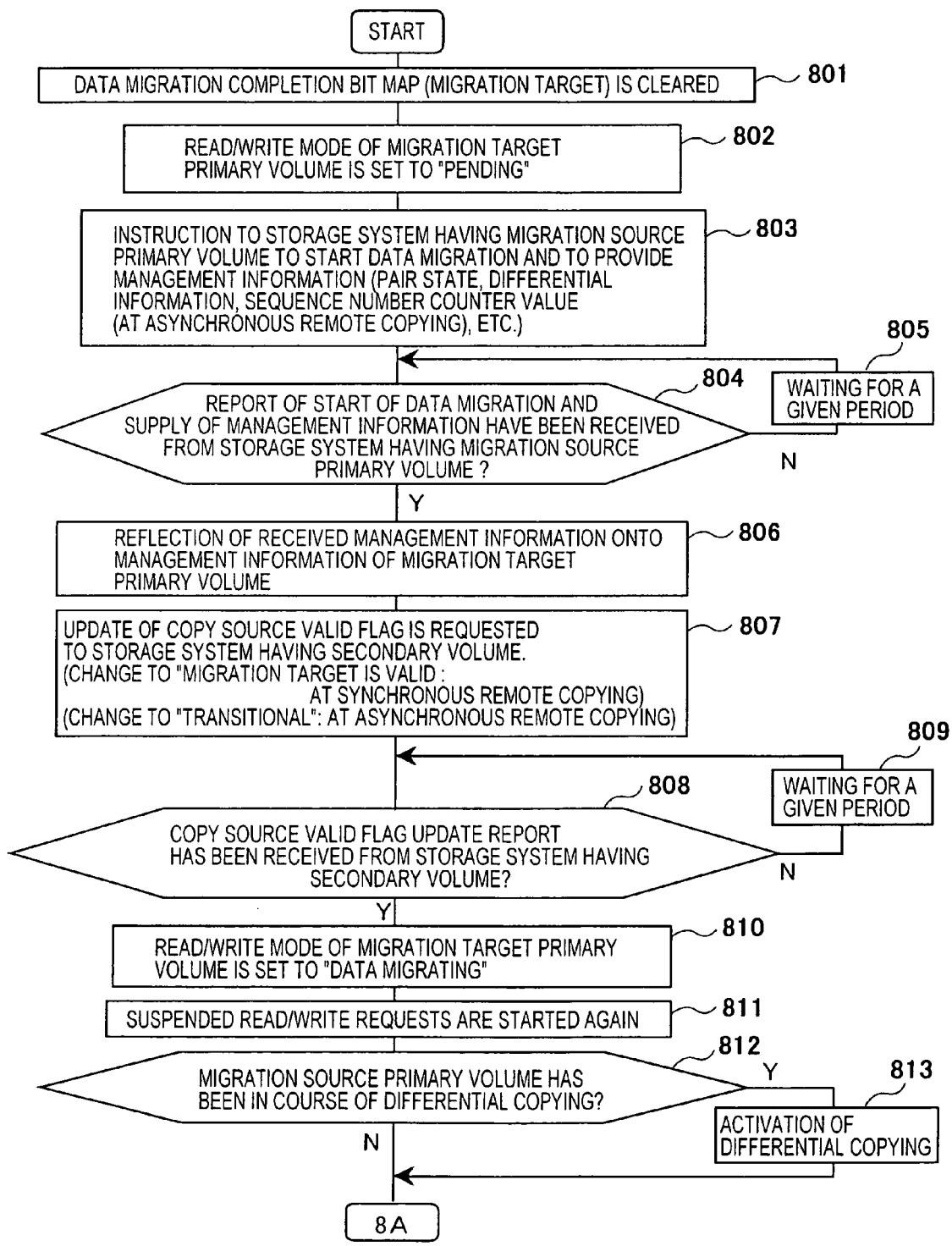
FIGS. 8A and 8B are charts showing an example of processes performed by a data migration control program in the first embodiment.
Figure 8B:
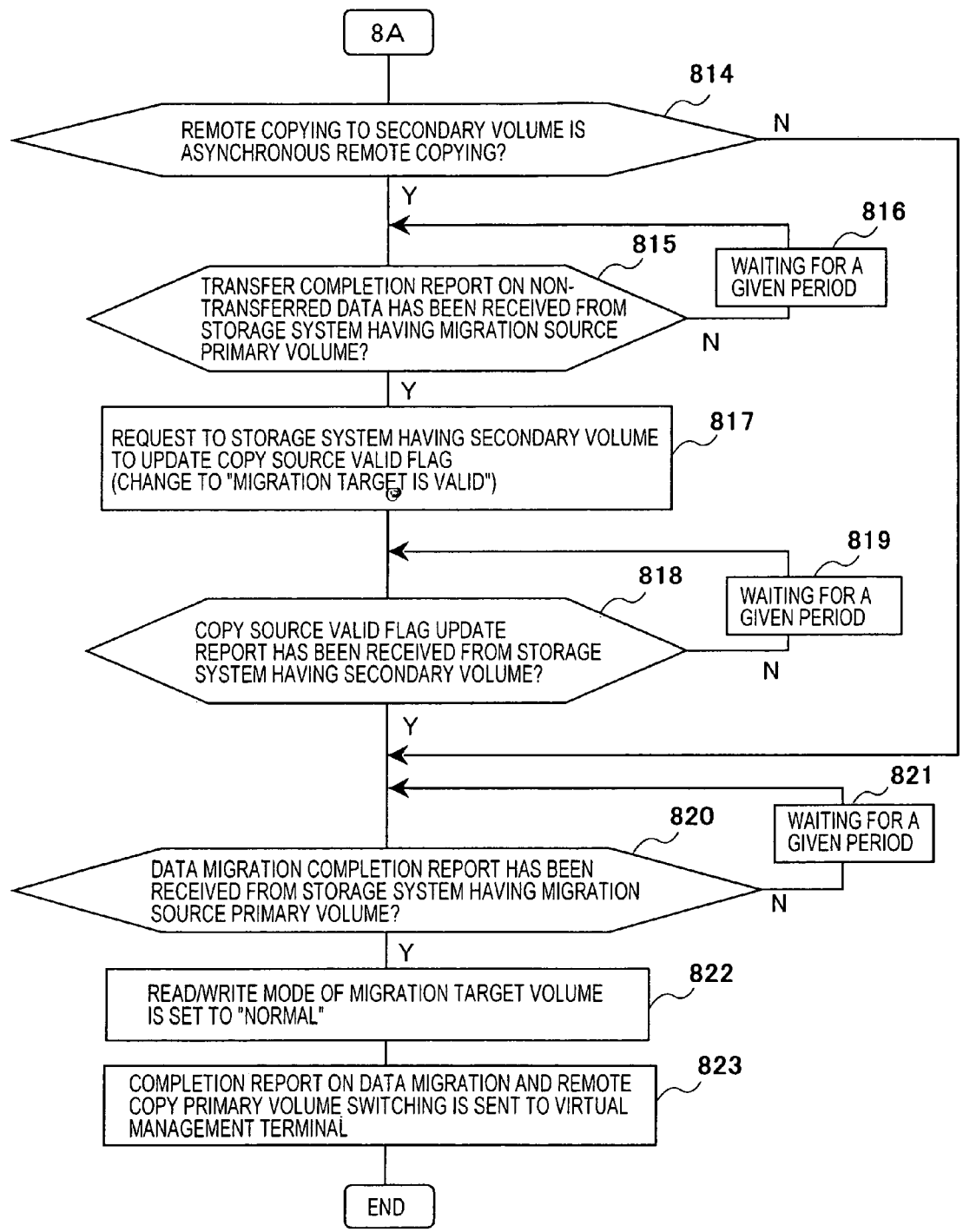

Referring to FIGS. 8A and 8B, will be described an example of the data migration control program 203 activated by the virtual management terminal 31 in Step 705 of FIG. 7 and executed in the storage system 2_2 having the migration target primary volume V2. The data migration control program 203 is executed by the CPU 28 in the channel interface 24 of the storage system 2_2. FIGS. 8A and 8B show an example of processes performed when the data migration control program 203 is executed.

First, to perform data migration from the migration source primary volume V1 to the migration target primary volume V2, the data migration control program 203 clears the data migration completion bit map in the volume management information of the migration target primary volume V2 (Step 801). For example, 0 is set to every bit.

Next, the data migration control program 203 sets the read/write mode of the migration target primary volume V2 at the pending mode (Step 802). When the read/write mode is changed from the through mode to the pending mode, then, thereafter, request (from the host 1) transferred to the migration source primary volume V1 are temporarily retained in the storage system 2_2 having the migration target primary volume V2.

Next, the data migration control program 203 instructs the storage system 2_1 having the migration source primary volume V1 to start data migration and to provide management information (Step 803). The management information includes the volume management information such as the pair state, the differential information (the differential bit map) and (at the time of asynchronous remote copying) the sequence management information such as the sequence number counter value.

Next, it is judged whether a response to the data migration start instruction has been received and the management information has been provided from the storage system 2_1 having the migration source primary volume V1 (Step 804). In the case where a response to the data migration start instruction and supply of the management information have not been received (N in Step 804), the data migration control program 203 waits for a given period (Step 805), and returns to Step 804 again to perform the process. In the case where a response to the data migration start instruction and supply of the management information have been received (Y in Step 804), the data migration control program 203 proceeds to Step 806.

Next, the data migration control program 203 reflects the management information provided from the storage system 2_1 of the data migration source onto the volume management information of the migration target volume V2 and the sequence management information of the migration target storage system 2_2 (Step 806). As a result, even after switching of the primary volume to the migration target volume V2, remote copying to the secondary volume V3 can be continued without suspending the remote copying.

Next, the data migration control program 203 requests the storage system 2_3 having the secondary volume V3 to update the copy source valid flag (Step 807). In the case where the remote copying to the secondary volume is synchronous remote copying, the data migration control program 203 instructs the storage system 2_3 to register information indicating the volume V2 into the copy source valid flag in the volume management information, in order to make the copy source information indicating the migration target primary volume V2 valid. Further, in the case where the remote copying to the secondary volume is asynchronous remote copying, the data migration control program 203 instructs the storage system 2_3 to set the copy source valid flag at "transitional" in order to make both the copy source information indicating the migration source primary volume V1 and the copy source information indicating the migration target primary volume V2 valid temporarily. Next, the data migration control program 203 judges whether a copy source valid flag update report has been received from the storage system 2_3 having the secondary volume V3 (Step 808). In the case where the copy source valid flag update report has not been received (N in Step 808), the data migration control program 203 waits for a given period (Step 809), and performs Step 808 again. In the case where the copy source valid flag update report has been received (Y in Step 808), the data migration control program 203 proceeds to Step 810.

Next, the data migration control program 203 sets the read/write mode of the migration target primary volume V2 at the data migrating mode (Step 810). After the read/write mode is changed from the pending mode to the data migrating mode, the storage system 2_2 resumes the processing of the requests (from the host 1) that have been temporarily retained in the storage system 2_2 having the migration target primary volume V2 (Step 811). At that time, the requests from the host 1 are processed in the storage system 2_2 having the migration target primary volume V2, while migrating data that has not been migrated from the migration source primary volume V1 to the migration target primary volume V2.

Next, the data migration control program 203 judges whether the storage system 2_1 has been in the course of differential copying to the storage system 2_3, with respect to the migration source primary volume V1 (Step 812). Whether differential copying is under processing is judged from whether the pair state received from the storage system 2_1 in the Step 803 and Step 804 indicates the copying state. In the case where the storage system 2_1 has been in the course of differential copying (i.e., the pair state shows the copying state), the differential copy program 205 is activated also in the storage system 2_2 having the migration target primary volume V2 (Step 813).

Next, proceeding to Step 814 in FIG. 8B, the data migration control program 203 judges whether the remote copying to the secondary volume V3 is asynchronous remote copying (Step 814).

In the case where the remote copying to the secondary volume V3 is not asynchronous remote copying (but synchronous remote copying) (N in Step 814), the data migration control program 203 proceeds to Step 820.

In the case where the remote copying to the secondary volume V3 is asynchronous remote copying (Y in Step 814), the data migration control program 203 judges whether a transfer completion report has been sent from the storage system 2_1 to the storage system 2_2 with respect to non-transferred data that is to be transferred from the storage system 2_1 having the migration source primary volume V1 to the storage system 2_3 having the secondary volume V3 (Step 815). In the case where the transfer report with respect to the non-transferred data has not been sent (N in Step 815), the data migration control program 203 waits for a given period (Step 816) and thereafter performs Step 815 again. In the case where the transfer report with respect to the non-transferred data has been sent (Y in Step 815), the data migration control program 203 proceeds to Step 817.

Next, the data migration control program 203 requests the storage system 2_3 having the secondary volume V3 to update the copy source valid flag (Step 817). Namely, an instruction is given to make the copy source information indicating the migration target volume V2 valid. Next, the data migration control program 203 judges whether a copy source valid flag update report has been received from the storage system 2_3 having the secondary volume V3 (Step 818). In the case the copy source valid flag update report has not been received (N in Step 818), the data migration control program 203 waits for a given period (Step 819) and thereafter performs Step 818 again. In the case where the copy source valid flag update report has been received (Y in Step 818), the data migration control program 203 proceeds to Step 820.

Next, the data migration control program 203 judges whether a data migration completion report has been received from the storage system 2_1 having the migration source primary volume V1 (Step 820). In the case where the data migration completion report has not been received (N in Step 820), the data migration control program 203 waits for a given period (Step 821) and thereafter performs Step 820 again. In the case where the data migration completion report has been received (Y in Step 821), the data migration control program 203 proceeds to Step 822.

Next, the data migration control program 203 sets the read/write mode of the migration target primary volume V2 at the normal mode (step 822). When the read/write mode is changed from the data migrating mode to the normal mode, thereafter the storage system 2_2 processes requests from the host 1 at the storage system 2_2, regardless of data migration.

Last, the data migration control program 203 sends a complete report with respect to data migration and switching of the remote copy primary volume, to the virtual management terminal 31 and ends the processing.

Referring FIG. 9, will be described the data migration program 204 that is activated in Step 803 by the data migration control program 203 of the storage system 2_2 having the migration target primary volume V2, and executed in the storage system 2_1 having the migration source primary volume V1. The data migration program 204 is executed by the CPU 28, and FIG. 9 shows an example of processes performed by executing the data migration program 204.

First, the data migration program 204 judges whether the storage system 2_1 is in the course of differential copying to the secondary volume V3 of the storage system 2_3, with respect to the migration source primary volume V1 (Step 901). Whether differential copying is under processing is judged from whether the pair state indicates the copying state. In the case where differential copying is under processing (i.e., the pair state indicates the copying state) (Y in Step 901), the data migration program 204 suspends the differential copying (Step 902). This inhibits update of the volume management information of the migration source primary volume V1 owing to the differential copying.

Further, the data migration program 204 judges whether all read/write requests with respect to the migration target primary volume V1, received from the storage system 2_2 having the migration target primary volume V2, have been processed (Step 903). In the case where there is a read/write request that has not been processed (N in Step 903), the data migration program 204 waits for a given period (Step 904) and performs Step 903 again. In the case where all the read/write requests have been processed (Y in Step 903), the data migration program 204 proceeds to Step 905. Steps 903 and 904 are repeated until all read/write requests with respect to the migration source primary volume V1 have been processed. As a result, in Step 905 and thereafter, there does not occur update of the sequence management information and the volume management information of the migration source primary volume V1 owing to a read/write request on the volume V1 received from the storage system 2_2 having the migration target primary volume V2.

Next, the data migration program 204 obtains the management information on the migration source primary volume V1 (i.e., the volume management information and the sequence management information required from the storage system 2_2 in Step 803 of FIG. 8A) (Step 905), and sends a response to the data migration start instruction and the obtained management information to the storage system 2_2 having the migration target primary volume V2 (Step 906).

Next, the data migration program 204 judges whether the storage system 2_1 has been performed asynchronous remote copying between the migration source primary volume V1 and the secondary volume V3 (Step 907).

In the case where the remote copying between the migration source primary volume V1 and the secondary volume V3 is not asynchronous remote copying (but synchronous remote copying) (N in Step 907), the data migration program 204 proceeds to Step 911.

In the case where the remote copying between the migration source primary volume V1 and the secondary volume V3 is asynchronous copying (Y in Step 907), the data migration program 204 judges whether all data to be transferred from the migration source primary volume V1 to the secondary volume V3 has been transferred (Step 908). In the case where there remains non-transferred data (N in Step 908), the data migration program 204 waits for a given period (Step 909) and performs Step 908 again. In the case where all the data to be copied from the migration source primary volume V1 to the secondary volume V3 has been transferred (Y in Step 908), the data migration program 204 proceeds to Step 910.

Next, the data migration program 204 sends a completion report of transfer of non-transferred data, to the storage system 2_2 having the migration target primary volume V2 (Step 910). Thereafter, data migration between the migration source primary volume V1 and the migration target primary volume V2 is started.

The data migration program 204 clears the data migration completion bit map of the volume management information of the migration source primary volume V1, to perform data migration from the migration source primary volume V1 to the migration target primary volume V2 (Step 911). For example, 0 is set to every bit of the bit map.

Next, the data migration program 204 refers to the above-mentioned bit map, to judge whether there is an area storing data that has not been migrated from the migration source primary volume V1 to the migration target primary volume V2 (Step 912). In the case where there is an area storing data that has not been migrated (Y in Step 912), the data migration program 204 refers to the data migration completion bit map, to select an area of which data has not been migrated (Step 913). For example, among the bits corresponding to the data constituting the migration source primary volume V1, the data migration program 204 may select the bit that is closest to the top of the bit map among bits indicating non-migrated data, and select the area indicated by this selected bit, as a data migration object area.

Next, the data migration program 204 copies the data stored in the selected area to the migration target primary volume V2. At that time, in the storage system 2_2 having the migration target primary volume V2, the data migration completion bit map of the volume management information of the migration target primary volume V2 is updated (Step 914). For example, 1 is set to the bit corresponding to the migrated data in the bit map.

Next, the data migration program 204 updates the data migration completion bit map of the volume management information of the migration source primary volume V1 (Step 915). For example, 1 is set to the bit corresponding to the migrated data in the bit map. Thereafter, the data migration program 204 proceeds to Step 912.

In Step 912, in the case where there is no area whose data has not been migrated (i.e., the data migration from the migration source primary volume V1 to the migration target primary volume V2 has been completed), (N in Step 912), the data migration program 204 proceeds to Step 916.

Last, the data migration program 204 sends a data migration completion report to the storage system 2_2 having the migration target primary volume V2 (Step 916), and ends the processing.

Figure 11:
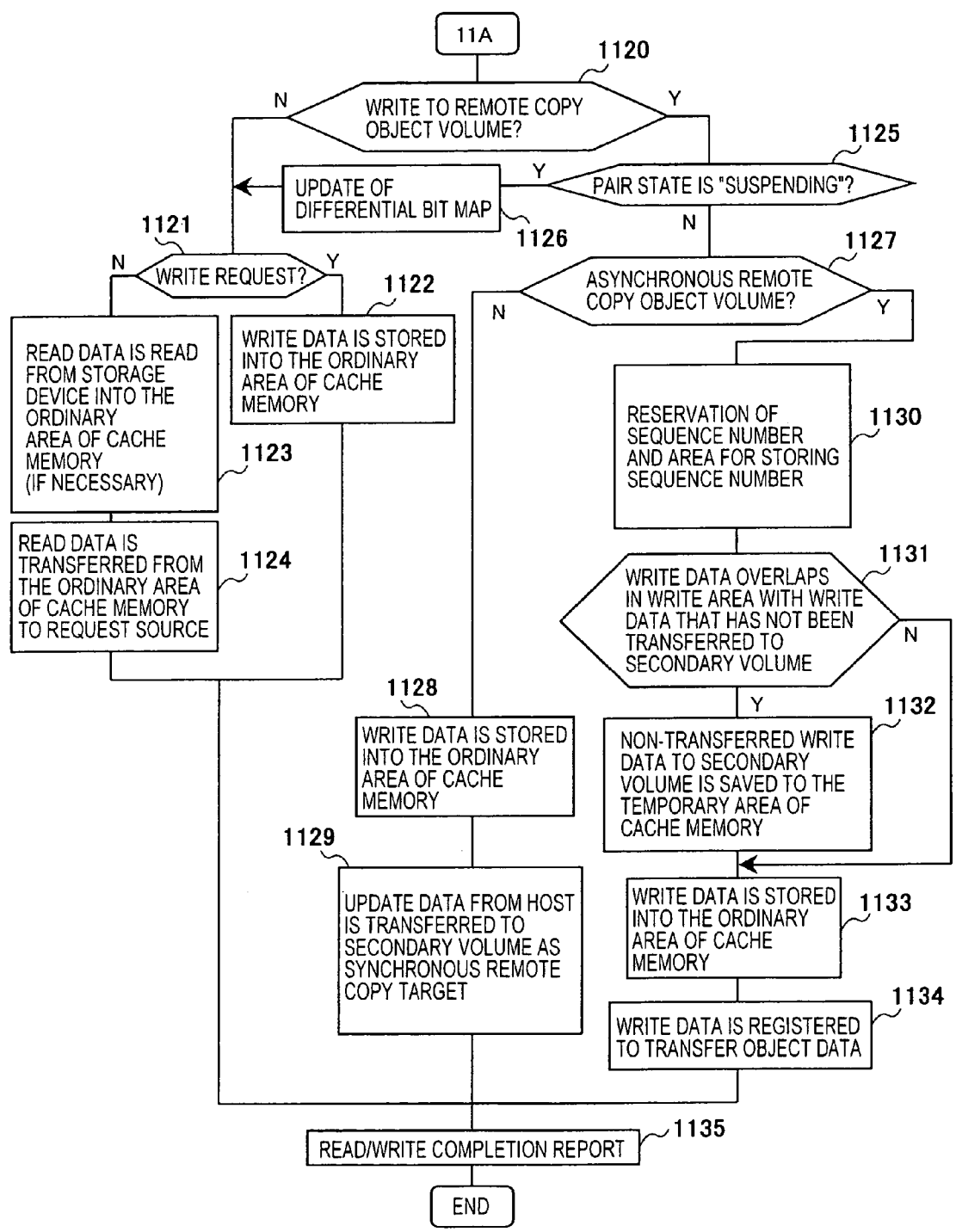
FIG. 11 is a chart showing an example of processes performed by a read/write program (primary) in the first embodiment.

Referring to FIGS. 10 and 11, will be described the read/write program (primary) 201 executed in the storage system 2_2 having the migration target primary volume V2 and the storage system 2_1 having the migration source primary volume V1. The read/write program (primary) 201 is executed by the CPU 28. Read/write to the migration source primary volume V1 is performed always in the normal mode.

First, in Steps 1101-1103, the read/write program (primary) 201 receives a read or write request from the host 1, and judges which of the normal mode, the through mode, the pending mode and the data migrating mode is the read/write mode to the volume as a write or read object.

In the case where the read/write mode is the normal mode (Y in Step 1101), the read/write program (primary) 201 proceeds to 11A of FIG. 11.

In the case where the read/write mode is the through mode (Y in Step 1102), the read/write program (primary) 201 issues a read/write request from the host 1 to the migration source primary volume V1 (namely, the read/write request received from the host 1 is sent to the storage system 2_1 having the migration source primary volume V1) (Step 1104). Next, it is judged whether the request from the host 1 is a write request (Step 1105). In the case of a write request (Y in Step 1105), the read/write program (primary) 201 relays write data from the host 1 to the migration source primary volume V1 (Step 1106). In the case where the request is not a write request but a read request (N in Step 1105), the read/write program (primary) 201 receives read data of the migration source primary volume V1 from the storage system having the migration source primary volume V1, and relays the data to the host 1 (Step 1107). Thereafter, the read/write program (primary) 201 relays an ending status from the migration source primary volume V1 to the host 1 (Step 1108), and ends the processing.

In the case where the read/write mode is the pending mode (Y in Step 1103), the read/write program (primary) 201 retains processing of the read/write request temporarily (Step 1109), sets a flag or the like (not shown) such that the read/write program (primary) 201 is activated again at the time of a change of the read/write mode (Step 1110), and ends the processing. At the moment when the read/write mode is changed from the pending mode to the data migrating mode in Step 811 of FIG. 8A, the read/write program (primary) 201 is activated again, refers to the above-mentioned flag or the like, and performs the temporarily-retained read/write request.

In the case where the read/write mode is the data migrating mode (N in Step 1103), the read/write program (primary) 201 refers to the data migration completion bit map (Step 1111) to judge whether the read/write object area is a storage area whose data has been migrated (Step 1112). In the case where the data in that area has been migrated (Y in Step 1112), the read/write program (primary) 201 proceeds to 11A of FIG. 11. In the case where the data in that area has not been migrated (N in Step 1112), the read/write program (primary) 201 copies the data required for processing the read/write request, from the migration source primary volume V1 to the migration target primary volume V2. As a result of the copying, in the storage system 2_1 having the migration source primary volume V1, the data migration completion bit map in the volume management information of the migration source primary volume V1 is updated (Step 1113). For example, 1 is set to the bit corresponding to the migrated data in the bit map. Next, the read/write program (primary) 201 updates the data migration completion bit map in the volume management information of the migration target primary volume V2 (Step 1114). For example, 1 is set to the bit corresponding to the migrated data in the bit map. Thereafter, the read/write program (primary) 201 proceeds to Step 11A of FIG. 11.

In 11A of FIG. 11, first, the read/write program (primary) 201 judges whether the read/write request is a write request to the remote copy object volume (Step 1120). Here, it is possible that the storage system 2_2 having the migration target primary volume V2 receives a write request to the remote copy object volume, from the host 1, and that the storage system 2_1 having the migration source primary volume V1 receives a write request to the remote copy object volume, from the host 1 or the storage system 2_2 having the migration target primary volume V2 (at the time of the through mode).

In the case where the read/write request is not a write request to the remote copy object volume (namely, a read/write request to a volume that is not the remote copy object volume, or a read request to the remote copy object volume) (N in Step 1120), the read/write program (primary) 201 judges whether the received request is a write request (Step 1121). In the case of a write request (Y in Step 1121), the read/write program (primary) 201 stores the write data into the ordinary area of the cache memory 26 (Step 1122), and sends a write process completion report to the sender of the write request (Step 1135). In the case of not a write request but a read request (N in Step 1121), the read/write program (primary) 201 reads the read data from the storage device into the ordinary area of the cache memory 26 if necessary (namely, if all of the read data has not been stored in the cache memory 26) (Step 1123), transfers the read data from the ordinary area of the cache memory 26 to the source of the read request (Step 1124), and sends a read process completion report to the sender of the read request (Step 1135).

In the case of a write request to the remote copy object volume (Y in Step 1120), the read/write program (primary) 201 judges whether the pair state is the suspending state (Step 1125).

In the case where the pair state is the suspending state (Y in Step 1125), the read/write program (primary) 201 does not transfers the write data to the storage system 2_3 having the secondary volume V3, and updates the differential bit map at the bit corresponding to the write data (Step 1126). For example, 1 is set to the differential bit map at the bit corresponding to the write data. Thereafter, the read/write program (primary) 201 proceeds to Step 1121.

In the case where the pair state is not the suspending state (i.e., the pair state is the copying state or the duplicated state (N in Step 1125), the read/write program (primary) 201 judges whether the volume as the write object is an object volume of asynchronous remote copying (Step 1127).

In the case where the volume is not an object volume of asynchronous remote copying (i.e., the volume is an object volume of synchronous remote copying) (N in Step 1127), the read/write program (primary) 201 stores the write data into the ordinary area of the cache memory 26 (Step 1128), transfers the update data (i.e., the write data) from the host 1 to the secondary volume V3 as the target of synchronous remote copying (Step 1129), and sends a write process completion report to the sender of the write request (Step 1135).

In the case of an object volume of asynchronous remote copying (Y in Step 1127), the read/write program (primary) 201 reserves a sequence number to the write data and an area for storing the sequence number (Step 1130). Namely, the read/write program (primary) 201 refers to the sequence management information number indicated in the volume management information of the write object volume, and reserves the counter value of the sequence number counter of the sequence management information indicated by the number, as the sequence number. Then, the read/write program (primary) 201 increments the sequence number counter, reserves an empty sequence management information entry, and sets the reserved sequence number into that sequence management information entry. Next, the read/write program (primary) 201 judges whether a write area of the write data in question overlaps a write area of write data that has not yet transferred to the secondary volume V3 (Step 1131). In the case of overlap (Y in Step 1131), the write data that has not yet transferred to the secondary volume V3 is saved to the temporary area of the cache memory 26 (Step 1132). Then, the read/write program (primary) 201 stores the write data in question to the ordinary area of the cache memory 26 (Step 1133), and registers the write data to the transfer object data (Step 1134). Then, the read/write program (primary) 201 sends a write process completion report to the sender of the write request (Step 1135).

In Steps 1127-1134, in the data migrating mode, write data is reflected on the migration target primary volume V2 only. However, write data may be reflected not only on the migration target primary volume V2 but also on the migration source primary volume V1 (although, in that case of update of the migration source primary volume V1, remote copying from the migration source primary volume V1 to the secondary volume V3 is not performed). In the case where write data is reflected on both the migration target primary volume V2 and the migration source primary volume V1, the whole primary volume can be reproduced from the migration source primary volume V1 even when a failure occurs in the migration target primary volume V2 or the storage system 2_2 having the migration target primary volume V2.

Figure 12:
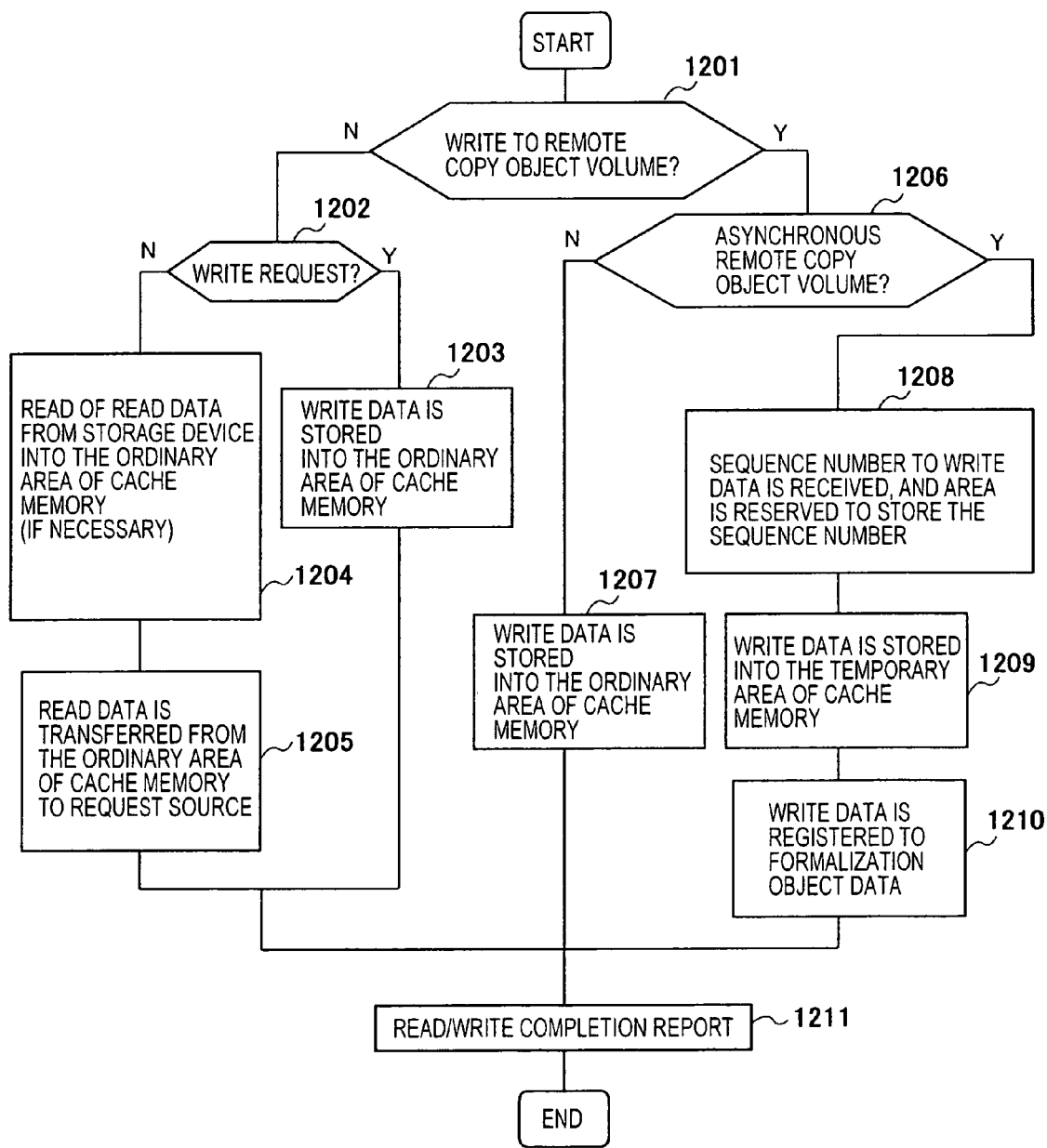
FIG. 12 is a chart showing an example of processes performed by a read/write program (secondary) in the first embodiment.

Referring to FIG. 12, will be described the read/write program (secondary) 202 executed in the storage system 2_3 having the secondary volume V3. The read/write program (secondary) 202 is executed by the CPU 28.

First, the read/write program (secondary) 202 judges whether the read/write request concerned is a write request to the remote copy object volume (Step 1201). Here, it is possible that the storage system 2_3 in the remote site receives a write request to the remote copy object volume, from the storage system 2_1 having the migration source primary volume V1 or the storage system 2_2 having the migration target primary volume V2.

In the case where the read/write request is not a write request to the remote copy object volume (namely, a read/write request to a volume that is not the remote copy object volume, or a read request to the remote copy object volume) (N in Step 1201), the read/write program (secondary) 202 judges whether the received request is a write request (Step 1202). In the case of a write request (Y in Step 1202), the read/write program (secondary) 202 stores the write data into the ordinary area of the cache memory 26 (Step 1203), and sends a write process completion report to the sender of the write request (Step 1211). In the case where the received request is not a write request but a read request (N in Step 1202), the read/write program (secondary) 202 reads the read data from storage device into the ordinary area of the cache memory 26 if necessary (namely, if all of the read data has not been stored in the cache memory 26) (Step 1204), transfers the read data from the ordinary area of the cache memory 26 to the source of the read request (Step 1205), and sends a read process completion report to the sender of the read request (Step 1211).

In the case of a write request to the remote copy object volume (Y in Step 1201), the read/write program (secondary) 202 judges whether the volume as the write object is an object volume of asynchronous remote copying (Step 1206).

In the case where the volume is not an object volume of asynchronous remote copying (i.e., the volume is an object volume of synchronous remote copying) (N in Step 1206), the read/write program (secondary) 202 stores the write data into the ordinary area of the cache memory 26 (Step 1207), and sends a write process completion report to the sender of the write request (Step 1211).

In the case of an object volume of asynchronous remote copying (Y in Step 1206), the read/write program (secondary) 202 receives a sequence number for the write data, and reserves an area for storing that sequence number (Step 1208). Namely, the read/write program (secondary) 202 refers to the sequence management information number indicated in the volume management information of the write object volume, and reserves an empty sequence management information entry, to store the sequence number received together with the write data from the source of the write request. Next, the read/write program (secondary) 202 stores the write data into the temporary area of the cache memory 26 (Step 1209), and registers the write data to the formalization object data (Step 1132). Then, the read/write program (secondary) 202 sends a write process completion report to the sender of the write request (Step 1211).

Referring to FIG. 13, will be described an example of processes performed when the asynchronous transfer program 206 is executed in the case where the migration source primary volume V1 or the migration target primary volume V2 is the copy source of asynchronous remote copying. The asynchronous transfer program 206 may be executed for each unit of the sequence management information, or may be executed at given intervals or depending on quantity of object data. According to the present processing, contents of data updated in the copy source of the asynchronous remote copying are transferred at any time from the copy source to the copy target asynchronously with write requests to the copy source. The asynchronous transfer program 206 is executed by the CPU 28.

First, the asynchronous transfer program 206 selects data registered in the transfer object data (Step 1301).

Next, the asynchronous transfer program 206 transfers the selected data to the copy target of the asynchronous remote copying (Step 1302), and cancels registration of the transferred data from the transfer object data (Step 1303).

Next, the asynchronous transfer program 206 frees the storage area of the sequence management information entry corresponding to the transferred data, since it becomes unnecessary to manage the transferred data (Step 1304). Then, in the case where the transferred data is using the temporary area of the cache memory 26, the asynchronous transfer program 206 frees the temporary area also (Step 1305), and ends the processing.

Referring to FIG. 14, will be described an example of processes performed by the asynchronous formalization program 207 when the secondary volume V3 is the copy target of the asynchronous remote copying. These processes may be performed for each unit of the sequence management information, or may be performed at given intervals or depending on quantity of object data. According to these processes, data is formalized and stored into the ordinary area of the cache memory 26. The asynchronous formalization program 207 is executed by the CPU 29. In the present embodiment, processes of transferring and storing data stored in the cache memory 26 into the storage device 22 is not described. These processes are performed by the CPU 29 according to the publicly known techniques.

First, the asynchronous formalization program 207 selects data registered in the formalization object data (Step 1401). As an example of a method of selection, may be mentioned a method in which, among pieces of data having consecutive sequence numbers, pieces of data are selected successively from data corresponding to the smallest number to data corresponding to the most advanced number in the consecutive numbers. In the case where, as a result of the selection, all the currently-registered formalization object data is selected, the asynchronous formalization program 207 stores the most advanced sequence number with respect to the selected formalization object data, into another area, so that it is possible to judge consecutiveness of sequence numbers between the data to formalize this time and data to formalize next time, at the time of next selection of formalization object data.

Next, the asynchronous formalization program 207 judges whether all the formalization object data selected has been already formalized (Step 1402). In the case where there exists non-formalized data (N in Step 1402), the asynchronous formalization program 207 formalizes data corresponding to the oldest sequence number among the data selected as the formalization object data (Step 1403).

Next, the asynchronous formalization program 207 cancels registration of the formalized data in the formalization object data (Step 1404), and returns to Step 1402.

In the case where it is judged in Step 1402 that all the data has been already formalized (Y in Step 1402), it becomes unnecessary to manage the formalized data, and the asynchronous formalization program 207 frees the sequence management information entries corresponding to the formalized data (Step 1405), frees the temporary area of the cache memory 26 used by the formalized data (Step 1406) and ends the processing.

Figure 15:
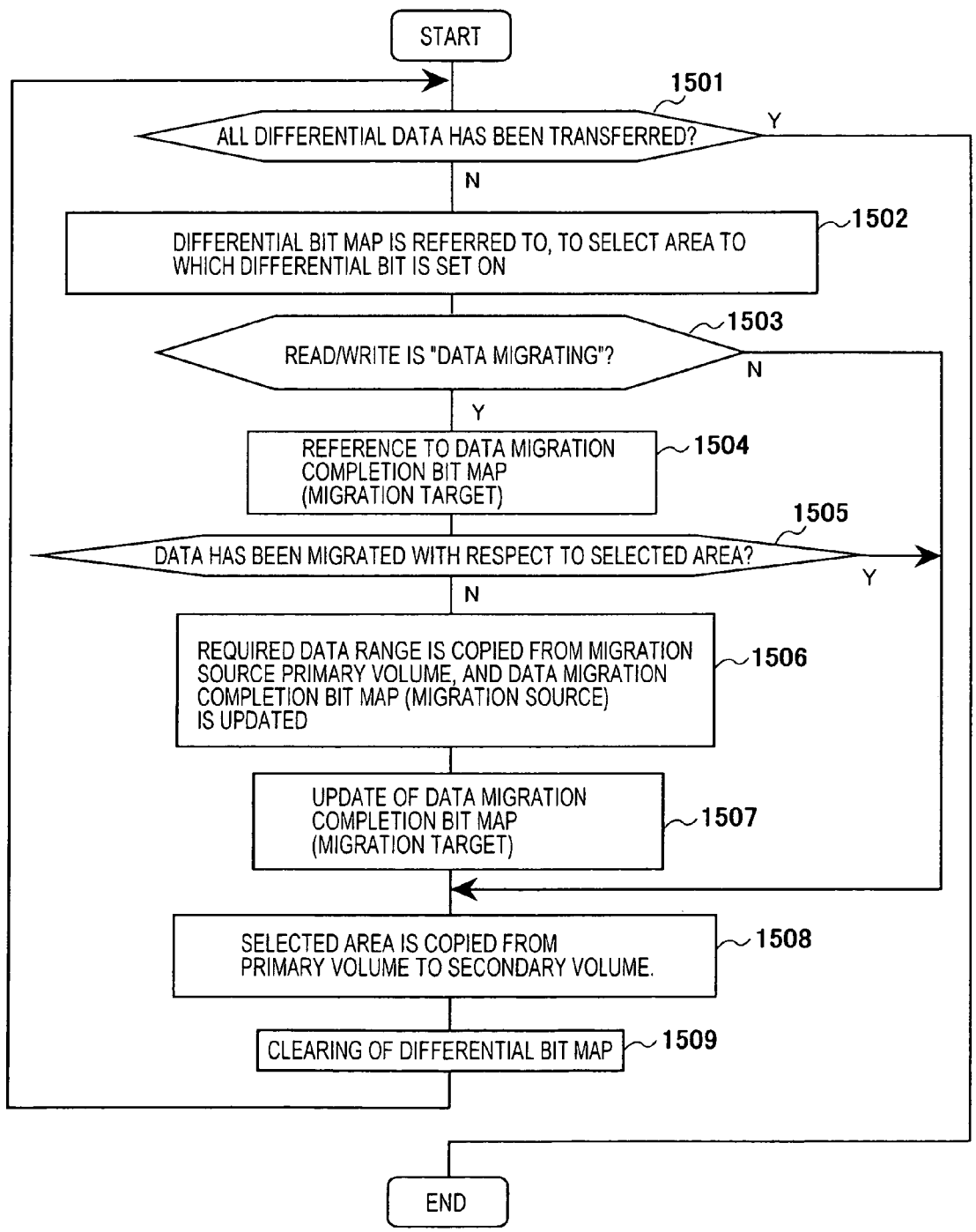
FIG. 15 is a chart showing an example of processes performed by a differential copy program in the first embodiment.

Referring to FIG. 15, will be described the differential copy program 205 executed in the storage system 2_2 having the migration target primary volume V2 or the storage system 2_1 having the migration source primary volume V1. In the case where differential copying is performed in the storage system 2_1 having the migration source primary volume V1 at the time of migration of the primary volume, execution of the differential copy processing is suspended once at Step 902 of FIG. 9, and the differential copying is started again in the storage system 2_2 having the migration target primary volume V2 at Step 813 of FIG. 8. The differential copy program 205 may be executed for each volume.

Further, as a form of asynchronous remote copying, it is also possible that the primary volume and the secondary volume are made to coincide in their contents by performing a series of the following operations at a certain frequency, namely: synchronous remote copying is suspended temporarily; during the suspending of the synchronous remote copying, update from the host 1 to the primary volume is recorded in the differential bit map; when the synchronous remote copying is started again, differential copying from the primary volume to the secondary volume is performed according to the information recorded in the differential bit map. This form of remote copying may be realized by using the differential bit map and the differential copy program 205.

First, the differential copy program 205 judges whether all differential data has been already transferred to the secondary volume V2 (Step 1501). In the case where all the differential data has been already transferred to the secondary volume V3 (Y in Step 1501), the processing is ended.

In the case where there is differential data that has not been transferred to the secondary volume V3 (N in Step 1501), the differential copy program 205 refers to the differential bit map to select an area to which a bit value indicating storing non-transferred data is set (Step 1502). For example, among the areas to which the bit indicating storing of non-transferred data, the area having an address nearest to the top may be selected as a differential copy object area.

Next, the differential copy program 205 judges whether the read/write mode of the selected differential copy object area is the data migrating mode (Step 1503). In the case of not the data migrating mode (N in Step 1503), the differential copy program 205 proceeds to Step 1508.

In the case of the data migrating mode (Y in Step), the differential copy program 205 refers to the data migration completion bit map of the migration target primary volume V2 (Step 1504), to judge whether data migration has been performed with respect to the area selected as the differential copy object (Step 1505).

In the case where data migration has been performed (Y in Step 1505), the differential copy program 205 proceeds to Step 1508.

In the case where data migration has not been performed yet (N in Step 1505), the differential copy program 205 migrates data stored in the area for which data migration has not been performed although selected as the differential copy object, from the migration source primary volume V1 to the migration target primary volume V2, and the storage system 2_1 having the migration source primary volume V1 updates the data migration completion bit map of the migration source primary volume V1 (Step 1506). For example, 1 is set to the bit corresponding to the migrated data, in the bit map. Further, the differential copy program 205 updates the data migration completion bit map of the migration target primary volume V2 (Step 1507). For example, 1 is set to the bit corresponding to the migrated data, in the bit map.

Next, the differential copy program 205 copies the area selected as the differential copy object, from the primary volume to the secondary volume V3 (Step 1508), and clears the differential bit map at the bit corresponding to the copied area (Step 1509). For example, 0 is set to the bit corresponding to the data subjected to the differential copying, in the bit map.

Figure 16:
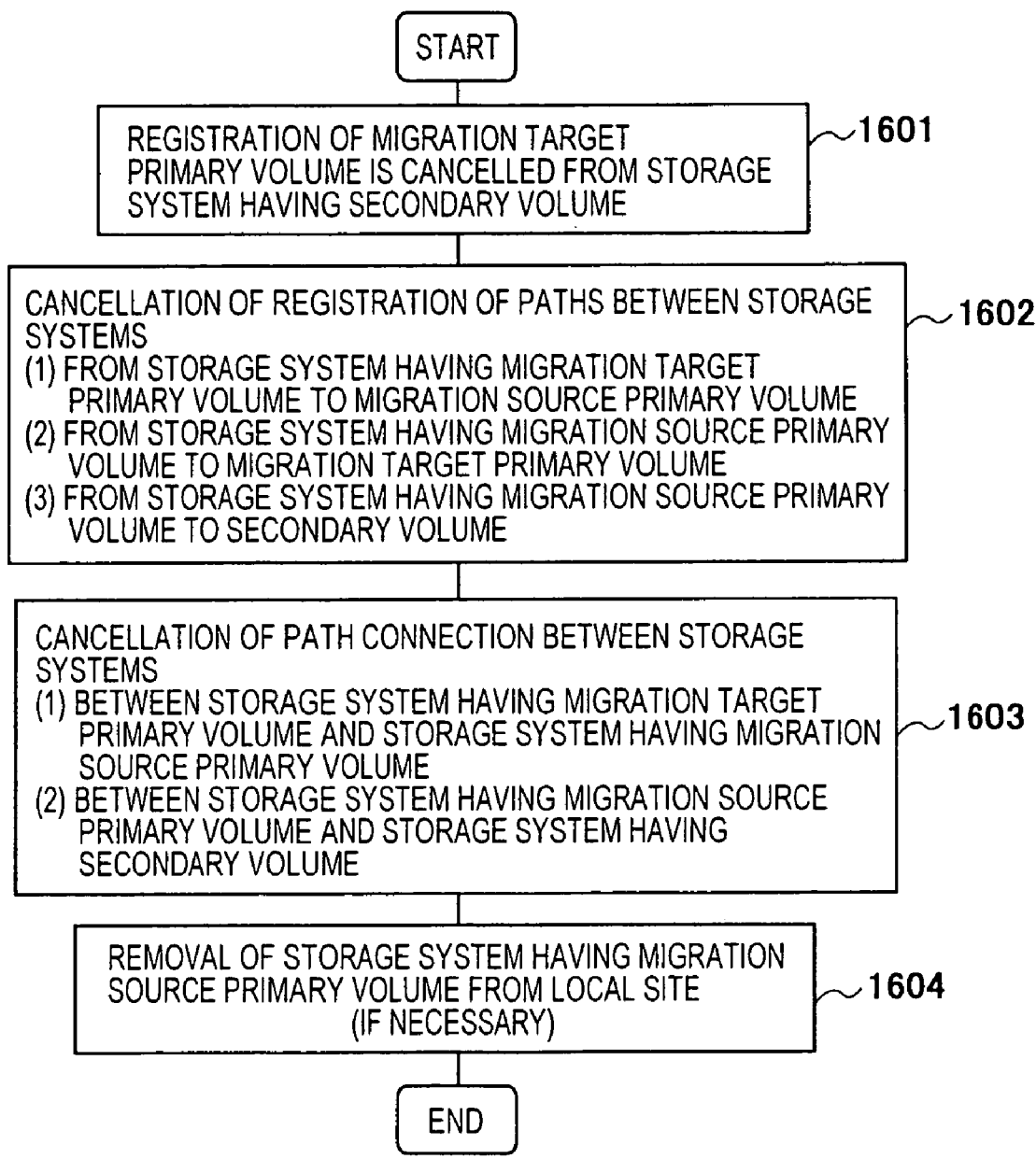
FIG. 16 is a chart showing an example of a removal procedure for removing a storage system that becomes a primary volume migration source in the first embodiment.

Referring to FIG. 16, will be described an example of a removal procedure for removing the storage system 2_1 having the migration source primary volume V1 in Step 503 of FIG. 5.

First, according to an instruction from the virtual management terminal 31, registration of the migration source primary volume V1 is cancelled in the storage system 2_3 having the secondary volume V3 (Step 1601). In detail, receiving an instruction from the virtual management terminal 31, the storage system 2_3 cancels the address information, the storage system number and the port number of the storage system 2_1 having the migration source primary volume V1 and the volume number of the migration source primary volume V1, from the copy source information in the volume management information shown in FIGS. 4A and 4B.

Next, according to an instruction from the virtual management terminal 31, registration of paths between the storage systems 2 is cancelled (Step 1602). The paths whose registration is cancelled are: (1) the path from the storage system 2_2 having the migration target primary volume V2 to the storage system 2_1 having the migration source primary volume V1; (2) the path in the reverse direction; and (3) the path from the storage system 2_1 having the migration source primary volume V1 to the storage system 2_3 having the secondary volume V3 as the copy target of the remote copying. In detail, with respect to the path of (1), according to an instruction from the virtual management terminal 31, the storage system 2_2 cancels registration of the address information, the storage system number and the port number of the storage system 2_1 as the primary volume migration source and the volume number of the migration source primary volume V1, from the data migration source information in the volume management information of the migration target primary volume V2 shown in FIG. 4A. With respect to the path of (2), according to an instruction from the virtual management terminal 31 similarly, the storage system 2_1 cancels registration of the address information, the storage system number and the port number of the storage system 2_2 having the migration target primary volume V2 and the volume number of the migration target primary volume V2, from the data migration target information in the volume management information of the migration source primary volume V1. With respect to the path of (3), the storage system 2_1 cancels registration of the address information, the storage system number and the port number of the storage system 2_3 having the secondary volume V3 and the volume number of the secondary volume V3, from the copy target information in the volume management information of the migration source primary volume V1.

Next, the path connection between the storage systems 2 is released (Step 1603). The paths whose connection is released are the path between the storage system 2_2 having the migration target primary volume V2 and the storage system 2_1 having the migration source primary volume V1, and the path between the storage system 2_1 having the migration source primary volume V1 and the storage system 2_3 having the secondary volume V3 as the copy target of the remote copying.

Last, in the case where the storage system 2_1 having the migration source primary volume V1 is not necessary for the local site, the administrator releases the connection between the storage system 2_1 having the migration source primary volume V1 and the virtual management network apparatus 3, and removes the storage system 2_1 from the local site (Step 1604). In the case where the storage system 2_1 having the migration source primary volume V1 is still used for another purpose, Step 1604 is not necessary.

Figure 17:
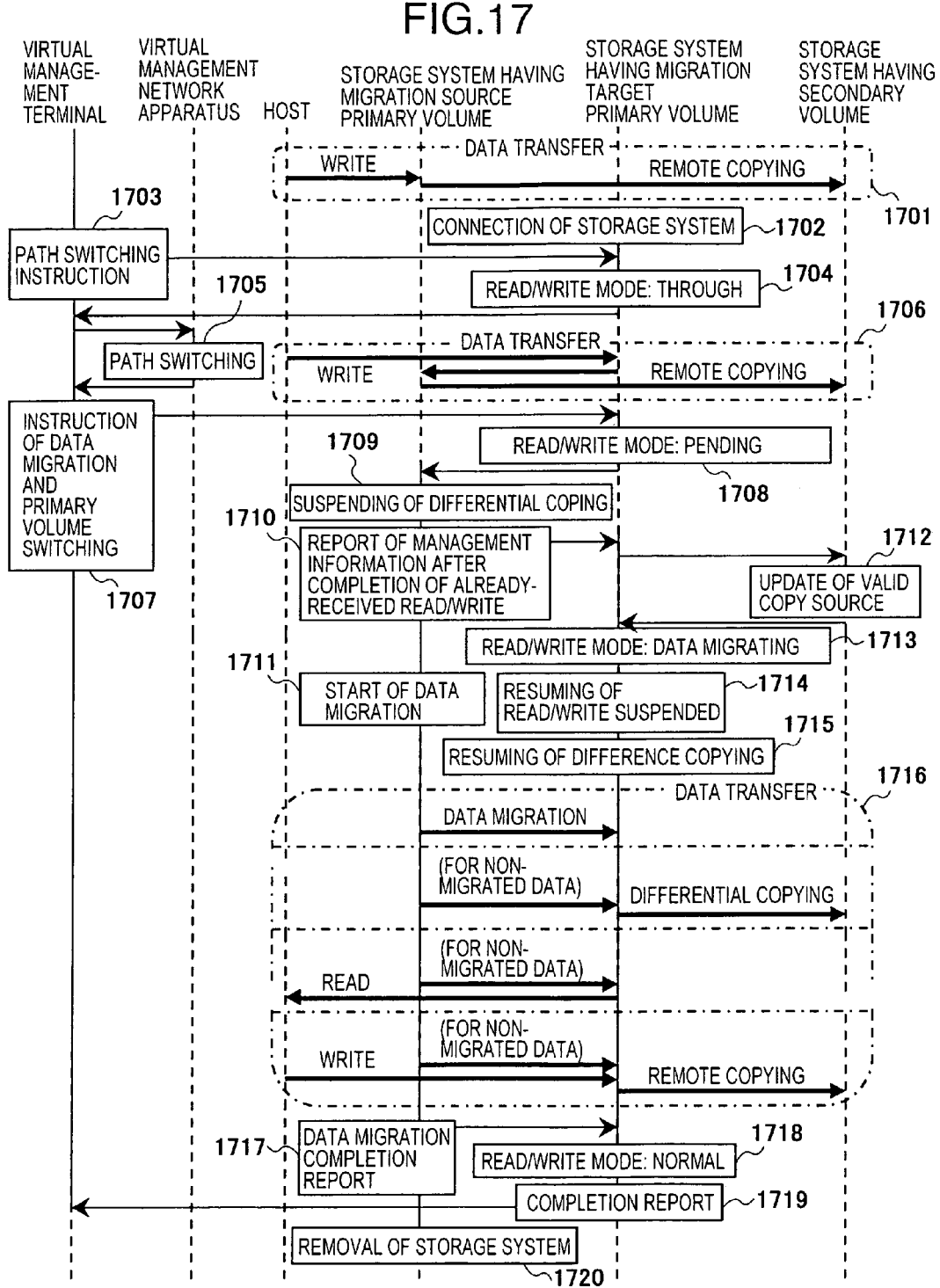
FIG. 17 is a chart showing an example of a primary volume migration flow in the first embodiment.

Referring to FIG. 17 shows an outline of the entire flow of the path switching—the data migration—the primary volume switching, i.e., the procedure for performing the remote copying while migrating data, which is stored in the primary volume of the remote copying, to a new primary volume.

As shown in a data transfer step 1701, before migration of the primary volume, the remote copying is performed as follows, namely: the storage system 2_1 having the migration source primary volume V1 receives write data from the host 1; and the storage system 2_1 transfers that data to the storage system 2_3 having the secondary volume V3.

First, the storage system 2_2 having the migration target primary volume V2 is connected to the virtual management network apparatus 3 (Step 1702).

Next, the virtual management terminal 31 gives a path switching instruction (Step 1703). As a result, first, the storage system 2_2 having the migration target primary volume V2 changes the read/write mode to the through mode (Step 1704). Next, the virtual management terminal 31 instructs the virtual management network apparatus 3 to switch the path from the host 1 to the migration source primary volume V1 to the path from the host 1 to the migration target primary volume V2 (Step 1705).

In this state, a read/write request from the host 1 to the migration target primary volume V2 is transferred as it is to the storage system 2_1 having the migration source primary volume V1. Thus, the storage system 2_2 having the migration target primary volume V2 relays a read/write request received from the host 1 to the storage system 2_1. Further, with respect to the remote copying, as shown in a data transfer step 1706, write data from the host 1 is received once by the storage system 2_2 having the migration target primary volume V2, and thereafter, transferred to the storage system 2_1 having the migration source primary volume V1. The storage system 2_1 having the migration source primary volume V1 transfers that write data to the storage system 2_3 having the secondary volume V3.

Next, the virtual management terminal 31 instructs the storage system 2_2 having the migration target primary volume V2 to perform data migration and switching of the primary volume (Step 1707).

Then, the storage system 2_2 having the migration target primary volume V2 changes the read/write mode to the pending mode (Step 1708), to temporarily retain read/write requests received from the host 1, and thereafter, requests the storage system 2_1 having the migration source primary volume V1 to start data migration and to provide the management information.

Next, the storage system 2_1 having the migration source primary volume V1 suspends differential copying (if in the course of differential copying) (Step 1709), ends read/write processing with respect to already-received read/write requests, and thereafter starts data migration and sends the management information to the storage system 2_2 having the migration target primary volume V2 (Step 1710). Using the management information received from the storage system 2_1, the storage system 2_2 having the migration target primary volume V2 can inherit the remote copying to the secondary volume V3 from the storage system 2_1 to perform the remote copying continuously. Further, the storage system 2_1 starts data migration (Step 1711).

Next, the storage system 2_2 having the migration target primary volume V2 receives a data migration start report and the management information from the storage system 2_1 having the migration source primary volume V1, and requests the storage system 2_3 having the secondary volume V3 to change the valid copy source (Step 1712). Receiving the request, the storage system 2_3 having the secondary volume V3 rewrites the copy source valid flag so that recognition of the primary volume in the storage system 2_3 is switched from the migration source primary volume V1 to the migration target primary volume V2 (in the case of synchronous remote copying). In the case of asynchronous remote copying, the storage system 2_3 sets "transitional" to the copy source valid flag temporarily so that both the migration source primary volume V1 and the migration target primary volume V2 become the valid copy source volumes. Awaiting reception of a transfer completion report with respect to transfer of non-transferred data from the storage system 2_1 having the migration source primary volume V1 to the secondary volume V3, the storage system 2_3 duly changes the valid copy source to the migration target primary volume V2.

Next, the storage system 2_2 having the migration target primary volume V2 changes the read/write mode to the data migrating mode (Step 1713). While performing the data migration processing, the storage system 2_2 starts again the processing of read/write requests received from the host 1 (Step 1714) and the processing of the differential copying (Step 1715). As shown in the data transfer step 1716, as methods of data migration processing, there are, for example: a method in which data migration is triggered by differential copying; and a method in which data migration is triggered by performing read/write processing with respect to a read/write request; in addition to a method in which data migration is performed under the control of the storage system 2_1 having the migration source primary volume V1.

Next, the storage system 2_1 having the migration source primary volume V1 confirms completion of the data migration, and sends a data migration completion report to the storage system 2_2 having the migration target primary volume V2 (Step 1717).

Receiving the data migration completion report, the storage system 2_2 having the migration target primary volume V2 changes the read/write mode to the normal mode (Step 1718), and sends a completion report on the data migration and switching of the primary volume, to the virtual management terminal 31 (Step 1719).

Last, the storage system 2_1 having the migration source primary volume V1 is removed (Step 1720).

In the above-described first embodiment, when a plurality of primary volumes associated with the same sequence management information are to be migrated at the same time, the above-described processing with respect to a migration source primary volume and a migration target primary volume can be applied to a plurality of primary volumes. This will be outlined in the following.

Referring to FIG. 6, in Steps 603 and 604, registration is performed with respect to the plurality of primary volumes.

Referring to FIG. 7, in Step 701, the read/write modes of the plurality of primary volumes are changed, and in Step 702, it is judged whether the paths of all the plurality of primary volumes have been switched. In Steps 703 and 704, paths to the plurality of primary volumes are switched.

Referring to FIGS. 8A and 8B, in Steps 801-803, the data migration completion bit maps and the read/write modes of all the plurality of primary volumes are changed, and thereafter, an instruction is given to start migration of data of all the plurality of primary volumes and to provide the management information of all the plurality of primary volumes. In Step 804, starts of data migration and supply of the management information are awaited with respect to all the plurality of primary volumes, and in Step 806 the management information of all the plurality of primary volumes are updated. In Step 807, with respect to a secondary volume corresponding to each of the plurality of primary volumes, update of the copy source valid flag is requested, and in Step 808, update of the copy source valid flag is awaited with respect to a secondary volume corresponding to each of the plurality of primary volumes. In Step 810, the read/write modes of all the plurality of primary volumes are changed. In Step 811, the read/write processing at the pending mode is started again with respect to all the plurality of primary volumes. In Steps 812 and 813, differential copying suspended is started again with respect to all the plurality of primary volumes. In Step 817, update of the copy source valid flag is requested with respect to a secondary volume corresponding to each of the plurality of primary volumes. And in Step 818, completion of the update of the copy source valid flag is awaited with respect to a secondary volume corresponding to each of the plurality of primary volumes. In Step 822, the read/write modes of all the plurality of primary volumes are changed.

Referring to FIG. 9, in Step 901, differential copying with respect to all the plurality of primary volumes is suspended, and in Step 903, completion of reads/writes with respect to all the plurality of primary volumes are awaited. In Step 905, the management information of all the plurality of primary volumes is obtained, and in Step 906, starts of data migration and management information of all the plurality of primary volumes are reported. In Step 908, completion of transfer of non-transferred write data of the all the plurality of primary volumes to the respective secondary volumes is awaited, and in Step 910, the completion of transfer of the non-transferred write data of all the plurality of primary volumes is reported. In Step 911, the data migration completion bit maps of all the plurality of primary volumes are cleared, and in Steps 912-915, data migration is performed with respect to all the plurality of primary volumes.

Referring to FIG. 16, Steps 1601 and 1602, registrations relating to all the plurality of primary volumes are cancelled.

Figure 18:
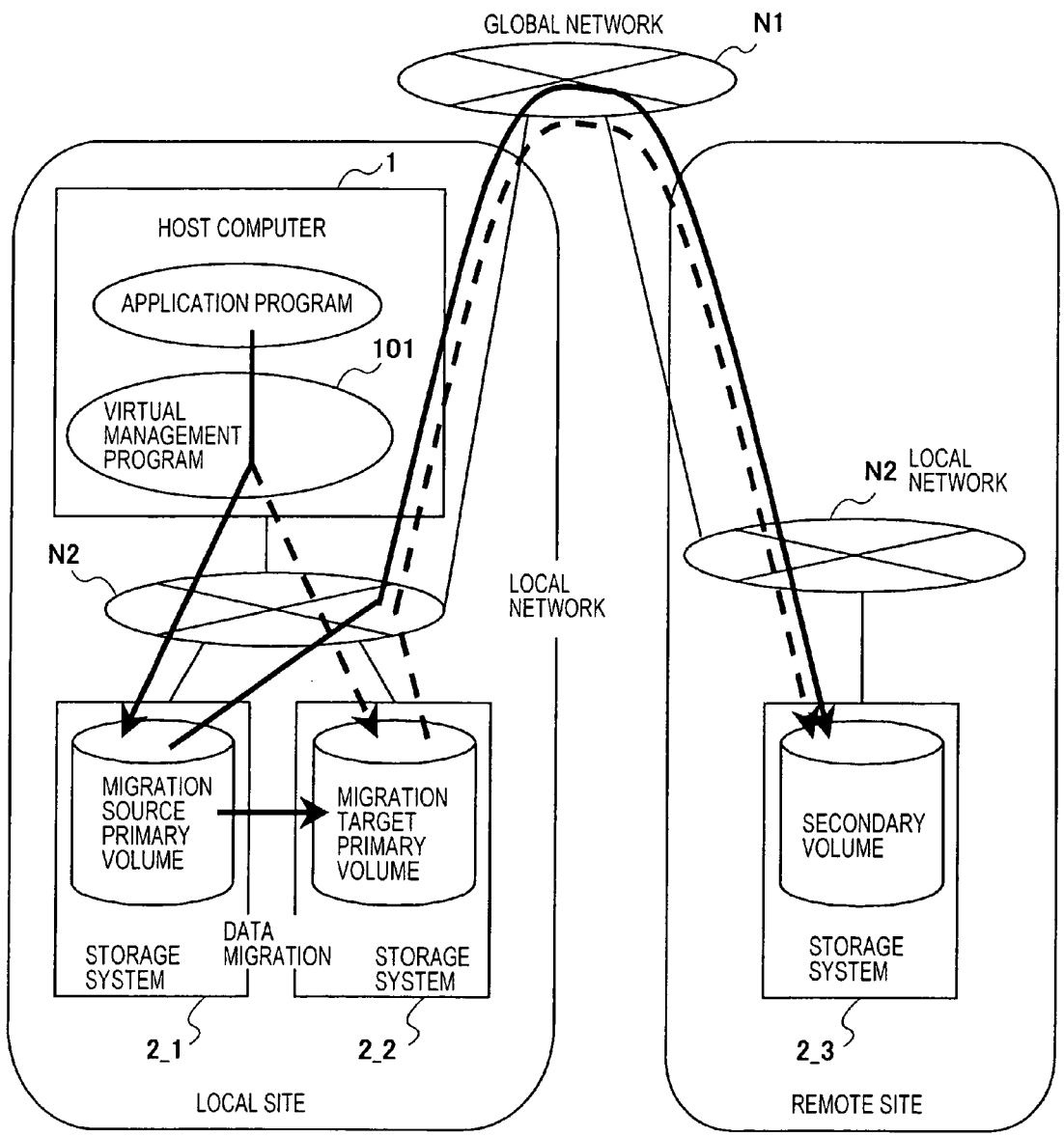
FIG. 18 is a diagram showing another example of the remote copy system.

FIG. 18 shows a variation of the first embodiment. To avoid repetition of description, only differences from the first embodiment will be described.

In FIG. 18, instead of the virtual management network 3 and the virtual management terminal 31 of FIG. 1, the host 1 has a virtual management program 101 executed by a processor of the host 1. The virtual management program 101 relays read/write requests from an application program that operates on the host 1 to the storage systems 2. Similarly to the virtual management network apparatus 3, the virtual management program 101 has a function of managing a group of volumes provided by one or a plurality of storage systems 2, as a volume pool, to assign any volume to the host 1. Further, similarly to the virtual management terminal 31, the virtual management program 101 can perform operations such as instruction of configuration change and monitoring of an internal state. Namely, in the present embodiment, the processes performed by the virtual management network apparatus 3 and the virtual management terminal 31 are performed by executing the virtual management program 101 in the host 1. Accordingly, when the virtual management program 101 receives a path switching instruction corresponding to Step 1705 of FIG. 17, for migration of the primary volume of remote copying, then, the virtual management program 101 associates the identification information of the primary virtual volume used by the application program to designate the primary volume with the identification information of the migration target primary volume V2. When the application program issues a read/write request having the identification information of the primary virtual volume, then, the virtual management program 101 converts the request into a read/write request having the identification information of the migration target primary volume V2, to send the converted request to the storage system 2_2.

A first difference between the present embodiment and the above-described first embodiment lies in that all the steps of FIG. 7 are performed not by the virtual management terminal 31 and the virtual management network 3, but by the virtual management program 101. Further, another difference lies in that the storage systems 2 are connected to and removed from not the virtual management network apparatus 3 (as in Step 601 of FIG. 6 and Step 1604 of FIG. 16) but the host 1.

Figure 19:
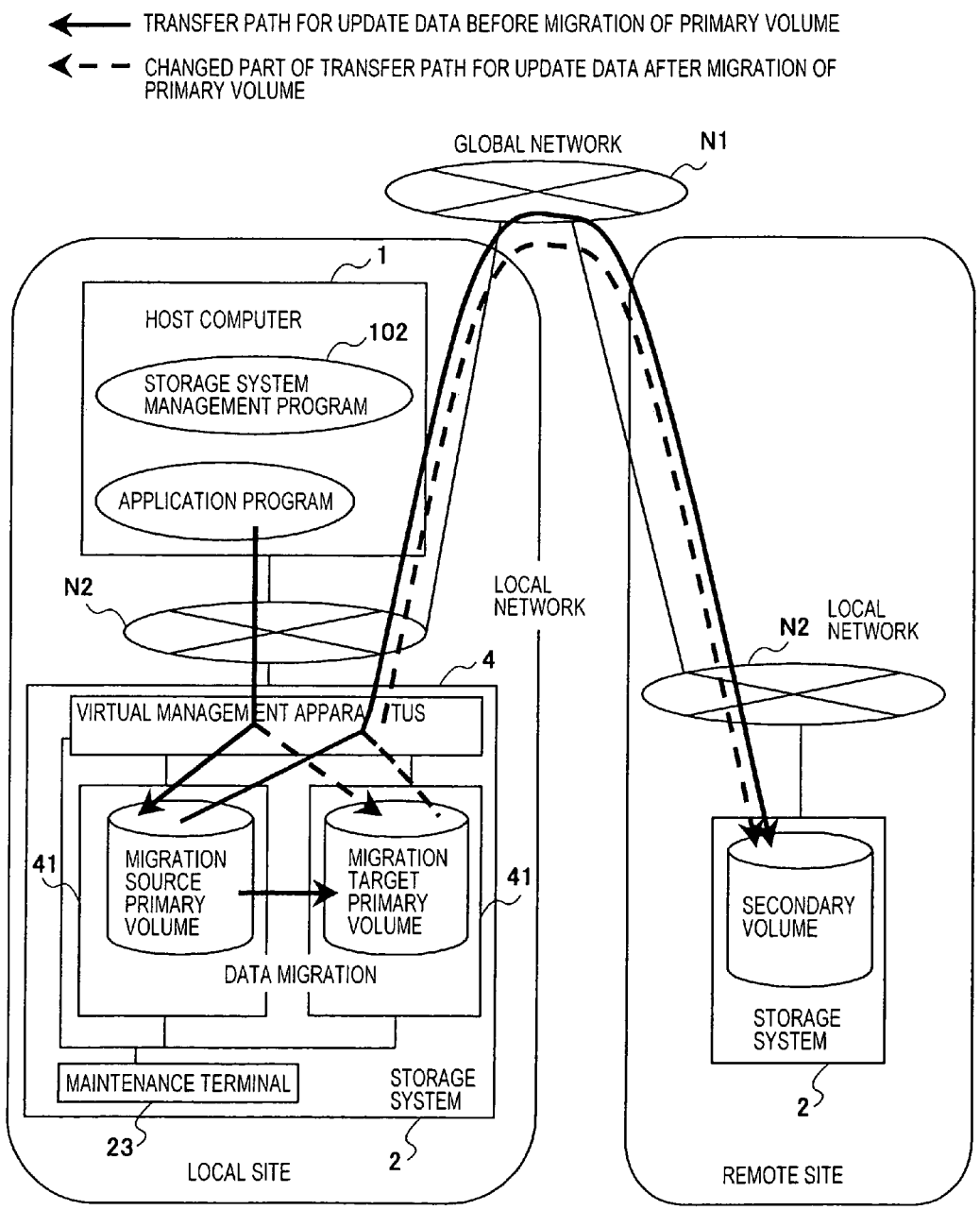
FIG. 19 is a diagram showing another example of the remote copy system.

FIG. 19 shows another variation of the first embodiment. To avoid repetition of description, only differences from the first embodiment will be described.

In FIG. 19, instead of the virtual management network apparatus 3 and the virtual management terminal 31 of FIG. 1, there exist a virtual management apparatus 4 and a maintenance terminal 23 in a storage system 2. Further, a plurality of storage system clusters 41 (also called storage subsystems) exist in the storage system 2, and each storage system cluster 41 is connected with the maintenance terminal 23. Further, the host 1 has a memory that stores a storage system management program 102.

In the present embodiment, the primary volume of remote copying is migrated from a migration source primary volume in a certain storage system cluster 41 to a migration target primary volume in another storage system cluster 41.

The virtual management apparatus 4 relays read/write requests received from the host 1 through a local network N2 to the storage system clusters 41. Similarly to the virtual management network apparatus 3, the virtual management apparatus 4 has a function of managing a group of volumes provided by one or a plurality of storage system clusters 41, as a volume pool, to assign any volume to the host 1. Namely, similarly to the virtual management network apparatus 3, the virtual management apparatus 4 converts the primary virtual volume identification information included in a read/write request received from the host 1 to the identification information of the migration source primary volume or the identification information of the migration target primary volume, and transfers the read/write request having the converted identification information to a certain storage system cluster 41. The virtual management apparatus 4 controls switching of paths between the host 1 and the primary volume, by controlling which identification information the primary virtual volume identification information is converted to Further, similarly to the virtual management terminal 31, the maintenance terminal 23 can perform operations such as instruction of configuration change and monitoring of an internal state. Further, a part or all of the functions of the maintenance terminal 23 can be performed from the storage system management program 102 of the host 1.

A first difference between the present embodiment and the above-described first embodiment lies in that the processes shown in FIG. 7 are performed not by the virtual management terminal 31 but by the virtual management apparatus 4 or the storage system clusters 41 according to instructions from the maintenance terminal 23 or the storage system management program 102. Further, in Steps 807 and 817 of FIGS. 8A and 8B, as a result of update of the copy source valid flag in the volume management information of the secondary volume V3, only the part of the volume number in the copy source address information changes. Further, another difference from the first embodiment lies in that the connection and removal of the storage systems 2 in Steps 601 and 602 of FIG. 6 and Steps 1603 and 1604 of FIG. 16 become unnecessary. Instead of the connection and removal of the storage systems 2 in Steps 1603 and 1604, a new storage system cluster 41 may be introduced into the storage system 2 and connected to the virtual management apparatus 4, or a storage system cluster 41 may be removed from the storage system 2.

Embodiment 2

Figure 20:
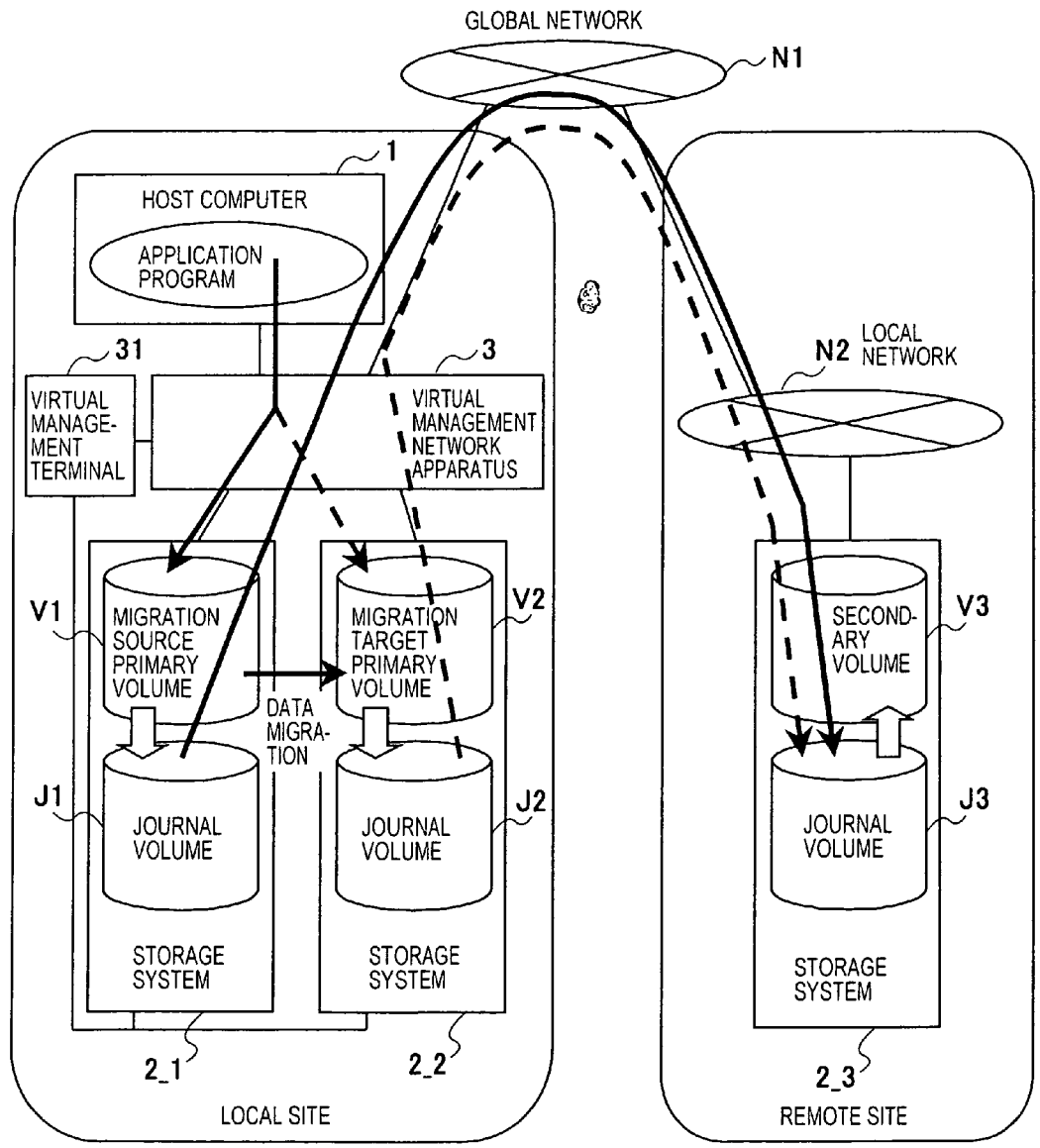
FIG. 20 is a diagram showing an example of a system configuration of a second embodiment.

FIG. 20 shows an outlined example of a system configuration of a second embodiment. To avoid repetition of description, only differences from the first embodiment will be described.

In the system shown in FIG. 20, in order to secure the write order of data written from the host 1 to the primary volume, for the secondary volume in asynchronous remote copying (i.e., in order to write the data to the secondary volume in the same order as the order of write to the primary volume), history information of write from the host 1 to the primary volume is used. The history information is stored in journal volumes J1, J2 and J3.

The journal volumes J1, J2 and J3 are used as follows. First, the copy source of asynchronous remote copying (i.e., the storage system 2_1 or the storage system 2_2) adds a sequence number to a pair of update data written from the host 1 to the primary volume and location information indicating a storage area of the update data written into the primary volume, to store the pair added with the sequence number into the journal volume J1 or J2. Next, the storage system 2_1 or 2_2 sends the contents of the journal volume to the storage system 2_3 as the copy target of the asynchronous remote copying. The storage system 2_3 stores the received data into the journal volume J3. Last, the storage system 2_3 as the copy target of the asynchronous remote copying updates the secondary volume according to the data stored in the journal volume J3, i.e., the sequence numbers indicating update order from the host 1, the update locations and the update data (hereinafter, update of the secondary volume based on data stored in the journal volume (i.e., based on the journal) is called "application of the journal").

The storage systems 2 in the second embodiment are similar to the storage systems 2 in the first embodiment shown in FIG. 2A in their configuration. However, configurations of the read/write program (primary) and the read/write program (secondary) stored in the memory 240 of a channel interface 24 are slightly different from the first embodiment. Further, the second embodiment is different from the first embodiment in that the memory 240 of a channel interface 24 stores an asynchronous transfer program (W) and an asynchronous transfer program (R) instead of the asynchronous transfer program 206 shown in FIG. 2A, and that the memory 250 of a disk interface 25 stores an asynchronous applying program instead of the asynchronous formalization program 207.

Figure 21:
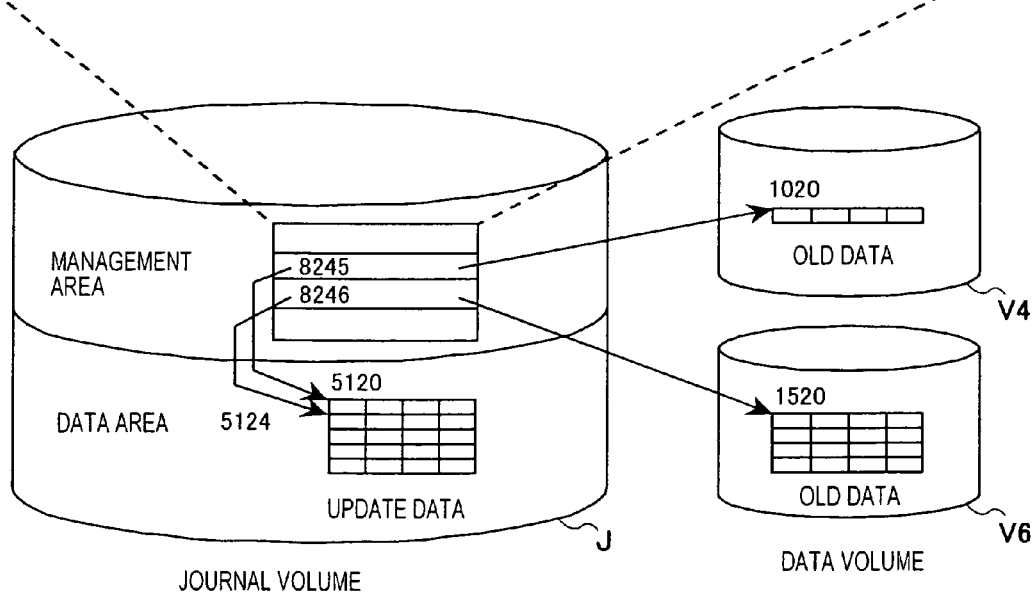
FIG. 21 is a diagram showing an example of a journal volume in the second embodiment.

FIG. 21 shows an example of contents of a journal volume.

A journal volume is generally divided into two areas, a management area and a data area. The management area stores a sequence number, volume update information (i.e., a volume number, an address, and a data length), and a data area address in the journal. Depending on the capacity of the management area at the time of initialization of the journal volume, there may exist a plurality of sequence numbers, pieces of volume update information (each piece including a volume number, an address, and a data length), and a plurality of data area addresses in the journal. Further, a plurality of primary volumes using the same journal volume may be newly set with volume numbers and addresses that are specially prepared in the journal, in order to separate the information stored in the journal from the physical state of the primary volumes, and to reduce the load of specifying a secondary volume corresponding to primary volume information recorded in the journal, at the time of applying the journal to the secondary volumes. Further, it is possible to prepare a correspondence table (not shown) that registers a correspondence relation between a volume number and an address specially prepared in the journal for a primary volume using the journal volume in question and an actual volume number and an actual address of that primary volume, to perform conversion of a volume number, an address, and the like at higher speed. Hereinafter, each line of FIG. 21 is called a journal entry.

A sequence number is a number given according to the write order, for each unit of data inputted from the host 1.

Volume update information is information used for managing a volume number updated from the host 1, the top address of the updated part, and an updated data length.

A data area address is information indicating the top address of a storage area that stores update contents from the host 1, in the data area of the journal volume.

FIG. 22A shows an example of contents of journal management information.

The journal management information is information including a sequence number counter, empty journal management information, and journal-in-use management information, and is stored in the management information memory 27 of a storage system 2.

The empty journal management information is information used for managing the top addresses and end addresses of an available management area and an available data area.

The journal-in-use management information includes information indicating a newest sequence number and a management area address for data in each of states: a "stored" state in which update from the host 1 is recorded; a "transferred" state in which data has been transferred to the copy target of the asynchronous remote copying; an "applied" state in which the copy target of the asynchronous remote copying has been updated according to the contents of the journal volume; and a "discarded" state in which the stored contents are nullified. In Step 906 of FIG. 9 in the second embodiment, the journal management information is included in the information reported from the storage system 2_1 having the migration source primary volume V1 to the storage system 2_2 having the migration target primary volume V2.

FIG. 22B shows an example of the journal volume management information.

The journal volume management information has a volume list for making up one journal volume from a plurality of volumes, and a management area address table and a data area address table used for quickly calculating which address and volume, an address of the management area or the data area of the journal volume corresponds to, among the volumes constituting the journal volume. The journal volume management information is also stored in the management information memory 27 of a storage system 2.

The volume list manages volume numbers of the volumes constituting the journal volume, and sizes of the management area and the data area assigned to each volume.

The management area address table records correspondence between a management area address that becomes a boundary of the volumes constituting the journal volume, and a volume number of the volume constituting the journal volume and an address (in that volume) corresponding to that management area address. Similarly, the data area address table records correspondence between a data area address that becomes a boundary of the volumes constituting the journal volume, and a volume number of the volume constituting the journal volume and an address (in that volume) corresponding to that data area address.

There may be a case where volumes constituting a journal volume are different between the copy source storage system 2 and the copy target storage system 2 of asynchronous remote copying. In that case, contents of journal volume management information may be different between the copy source and the copy target of the asynchronous remote copying. Further, to transfer contents of a journal volume, it is desirable to share the management information of the journal volume between the copy source and the copy target of the asynchronous remote copying.

FIG. 23 shows an example of the volume management information in the second embodiment, and differences from the volume management information shown in FIG. 4A of the first embodiment will be described. In comparison with the information shown in FIG. 4A, the volume management information shown in FIG. 23 is added with a journal volume flag indicating whether the volume in question is a component of a journal volume (the flag indicates ON when the volume is a component of a journal volume). Further, instead of the sequence management information number, the volume management information shown in FIG. 23 includes a journal management information number indicating the journal management information corresponding to the volume managed by the volume management information.

Figure 24:
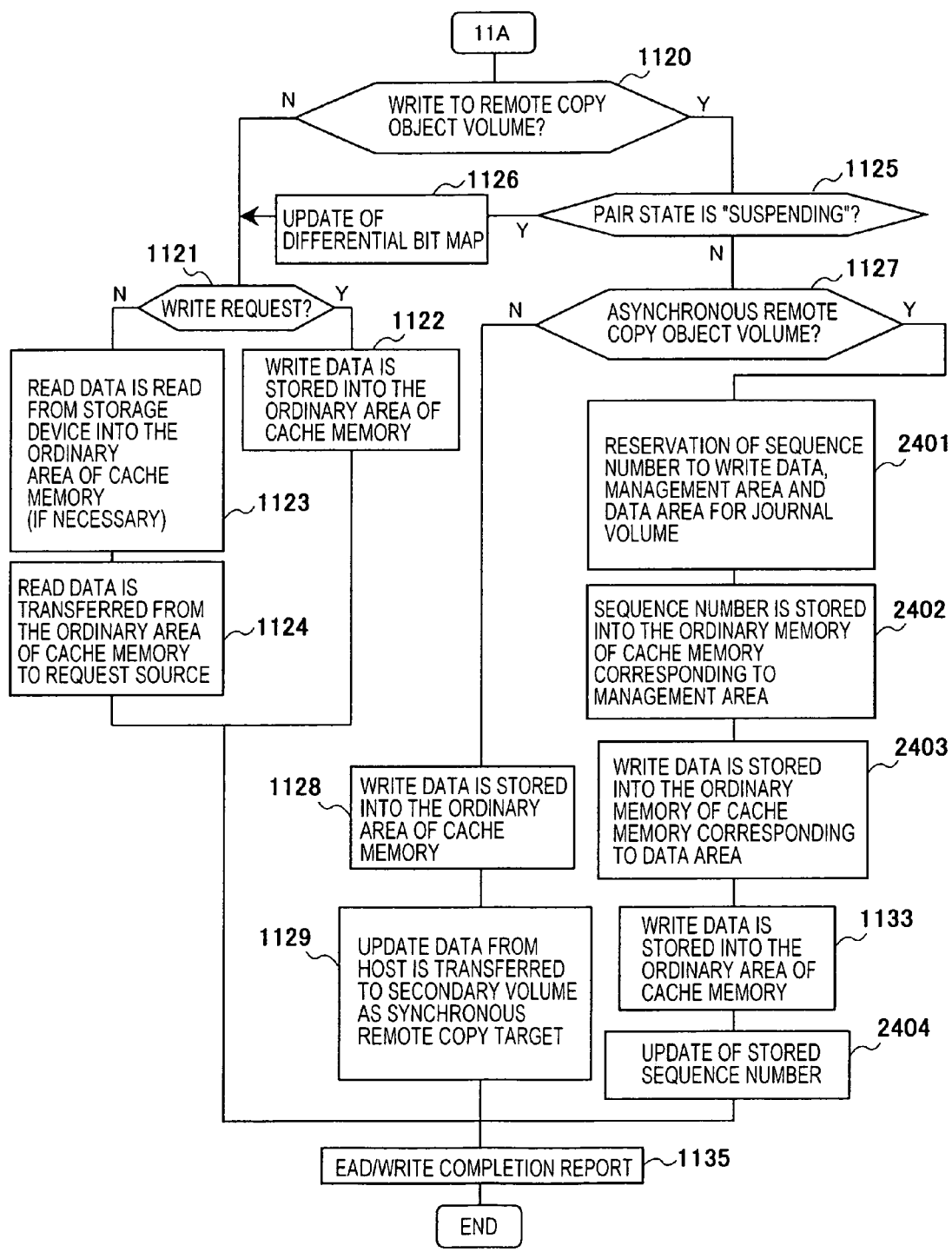
FIG. 24 is a chart showing an example of processes performed by a read/write program (primary) in the second embodiment.

FIG. 24 shows an example of processes performed by the read/write program (primary) when the journal volume is used to perform asynchronous remote copying. FIG. 24 shows processes corresponding to the processes shown in FIG. 11 of the first embodiment. In the following, referring to FIG. 24, differences from FIG. 11 will be described.

In the second embodiment, instead of Steps 1130, 1131, 1132 and 1134, the read/write program (primary) performs Steps 2401, 2402, 2403 and 2404. First, the read/write program (primary) reserves a sequence number for write data and a management area and a data area in the journal volume (Step 2401). Here, even if the copy source valid flag is "transitional" when the storage system 2_2 having the migration target primary volume V2 receives a write request to the migration target primary volume V2 from the host 1, the storage system 2_2 has already received the journal management information from the storage system 2_1 having the migration source primary volume V1. Accordingly, the management area and the data area of the journal volume, reserved by the storage system 2_2 at the time of receiving the write data do not overlap a management area and a data area of a journal that has not transferred yet to the storage system 2_3 having the secondary volume. In detail, in Step 2401, the read/write program (primary) refers to the journal management information number indicated in the volume management information of the storing target volume for the write data, and reserves, as the sequence number, the value of the sequence number counter of the journal management information indicated by that journal management information number. Then, the read/write program (primary) increments the sequence number counter. Further, the read/write program (primary) refers to the empty journal management information to reserve an empty management area and an empty data area, and updates the empty journal management information.

Next, the read/write program (primary) stores the sequence number into the ordinary area of the cache memory 26 assigned to the management area of the journal volume (Step 2402), and stores the write data into the ordinary area of the cache memory 26 assigned to the data area of the journal volume (Step 2403). Thereafter, the read/write program (primary) can write the data (which has been stored in the cache memory 26 in Steps 2402 and 2403) into the volumes constituting the journal volume of the storage device, at any point of time.

Further, the read/write program (primary) stores the received write data into the ordinary area of the cache memory 26 assigned to the primary volume (Step 1133). Then, the read/write program (primary) updates the stored sequence number and management information address (Step 2404).

Figure 25:
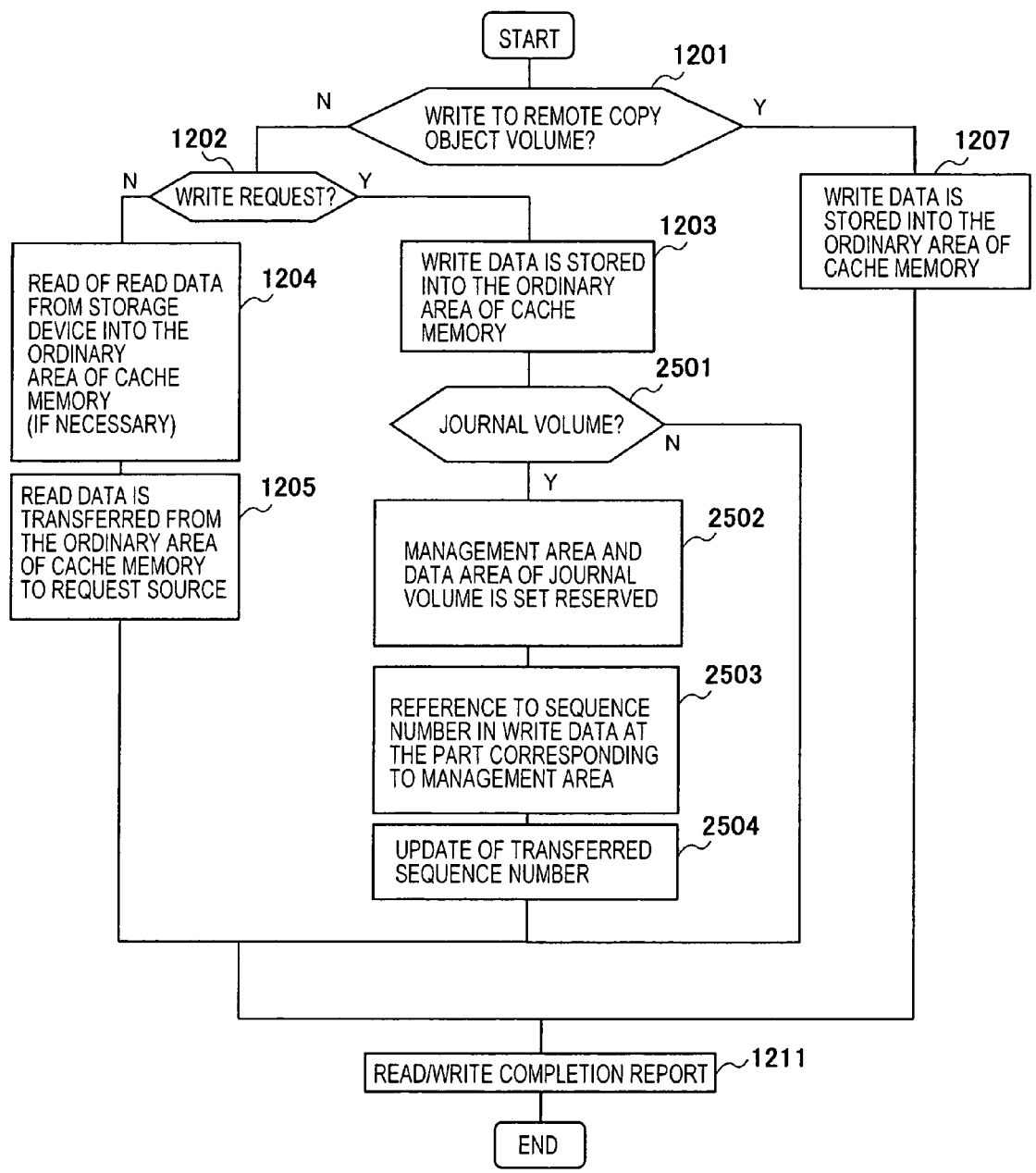
FIG. 25 is a chart showing an example of processes performed by a read/write program (secondary) in the second embodiment.

FIG. 25 shows an example of processes performed by the read/write program (secondary) when the journal volume is used to perform asynchronous remote copying. FIG. 25 shows processes corresponding to the processes of FIG. 12 of the first embodiment. In the following, referring to FIG. 25, differences from FIG. 12 will be described.

In asynchronous remote copying using the journal volume, update contents from the host 1 is transferred from the copy source to the copy target by sending the data stored in the journal volume from the copy source to the copy target. Accordingly, FIG. 25 has Steps 2501, 2502, 2503 and 2504, instead of Steps 1206, 1208, 1209 and 1210 of FIG. 12.

The read/write program (secondary) stores the write data into the ordinary area of the cache memory 26 (Step 1203), and thereafter, judges whether the write target volume for the write data is the journal volume, based on the journal volume flag (Step 2501). In the case where the write target volume for the write data is not the journal volume (N in Step 2501), the read/write program (secondary) proceeds to Step 1211.

In the case of the journal volume (Y in Step 2501), the read/write program (secondary) sets the management area and the data area of the journal volume reserved (namely, updates the empty journal management information) (Step 2502). Then, the read/write program (secondary) refers to the write data at a part corresponding to the management area of the journal volume, to identify the sequence number (Step 2503). Next, the read/write program (secondary) updates the transferred sequence number and management information address (Step 2504).

Figure 26:
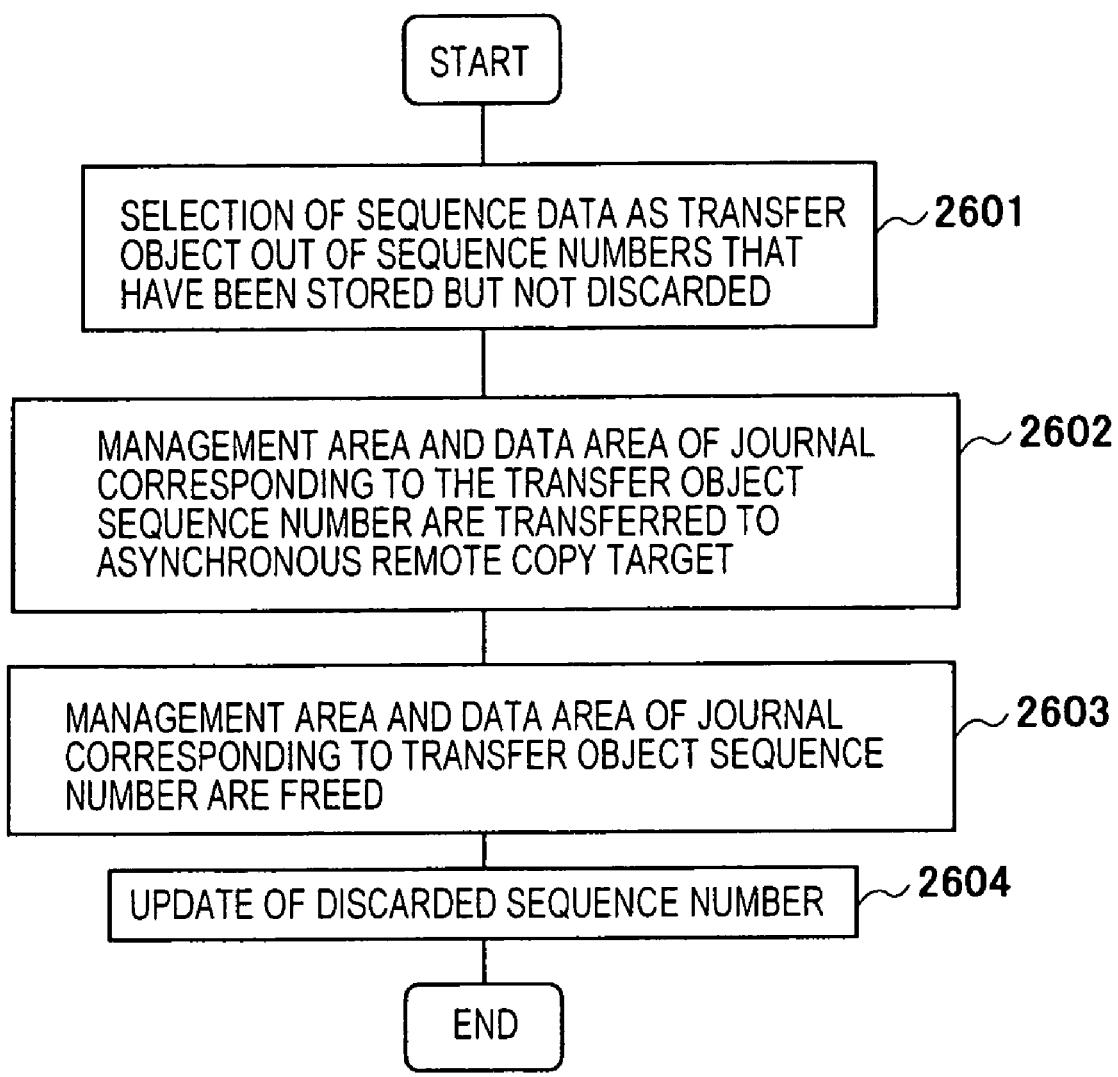
FIG. 26 is a chart showing an example of processes performed by an asynchronous transfer program (W) in the second embodiment.

FIG. 26 shows an example of processes performed by the asynchronous transfer program (W) in the second embodiment. First, the asynchronous transfer program (W) selects a sequence number as a transfer object, out of sequence numbers that have been stored but not been discarded (Step 2601). Next, the asynchronous transfer program (W) transfers the contents of the management area and the data area of the journal corresponding to the transfer object sequence number (Step 2602). Next, the asynchronous transfer program (W) frees the management area and the data area of the journal corresponding to the transfer object sequence number (namely, updates the empty journal management information) (Step 2603), and updates the discarded sequence number and management information address (Step 2604). Actually, the processes shown in FIG. 26 are performed when the asynchronous transfer program (W) is executed by the CPU 28 of the storage system 2.

Figure 27:
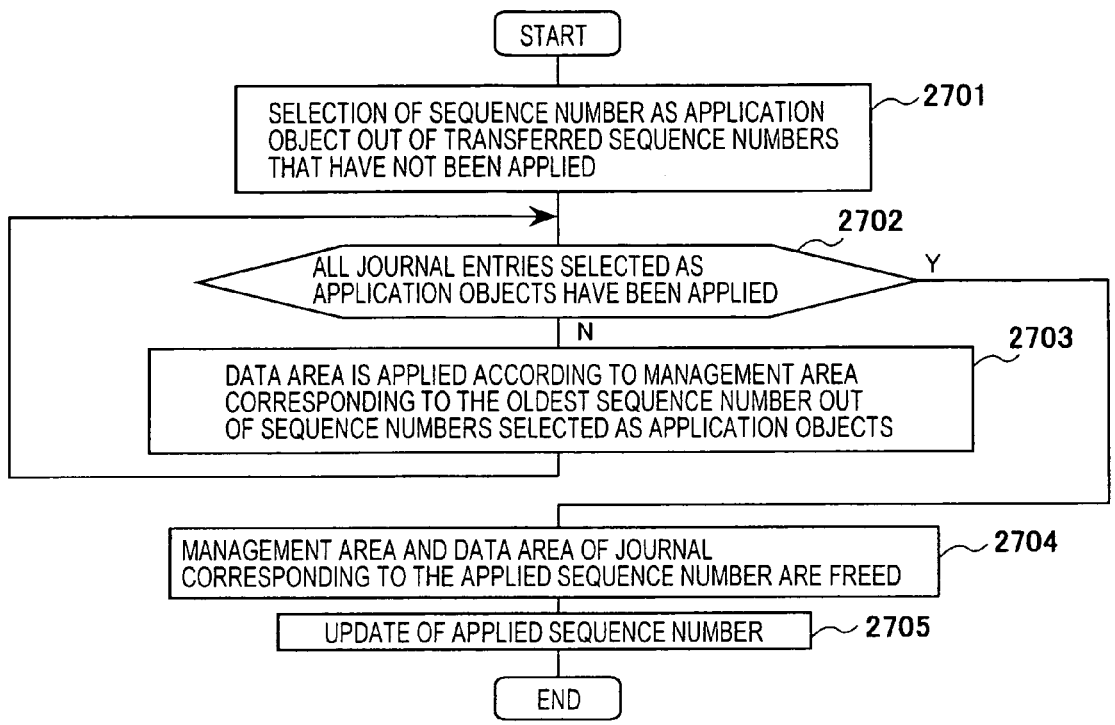
FIG. 27 is a chart showing an example of processes performed by an asynchronous applying program in the second embodiment.

FIG. 27 shows an example of processes performed by the asynchronous applying program. First, the asynchronous applying program selects sequence numbers as application objects, out of transferred sequence numbers that have not been applied (Step 2701). As a method of selection, may be mentioned, for example, a method in which, among a plurality of journal entries having consecutive sequence numbers, journal entries are selected successively from a journal entry corresponding to the smallest sequence number to a journal entry corresponding to the number that is smaller than the most advanced sequence number by one, similarly to the asynchronous formalization program 207 in the first embodiment.

Next, the asynchronous applying program judges whether all the journal entries selected as the application objects have been applied (Step 2702). In the case where there exists a journal entry that has not been applied (N in Step 2702), the asynchronous applying program applies the data area to the copy target volume according to the management area corresponding to the oldest sequence number among the sequence numbers selected as the application objects (namely, data stored in the data area is stored into the ordinary area of the cache memory and thereafter stored into the copy target volume at any point of time) (Step 2703). Thereafter, the asynchronous applying program returns to Step 2702.

In the case where all the selected journal entries have been applied (Y in Step 2702), the asynchronous applying program frees the management area and the data area of the journal corresponding to the sequence numbers applied (namely, updates the empty journal management information) (Step 2704). Last, the asynchronous applying program updates the applied sequence numbers and management information address (Step 2705). Actually, the processes shown in FIG. 27 are performed when the asynchronous applying program is executed by the CPU 28 of the storage system 2.

Figure 28:
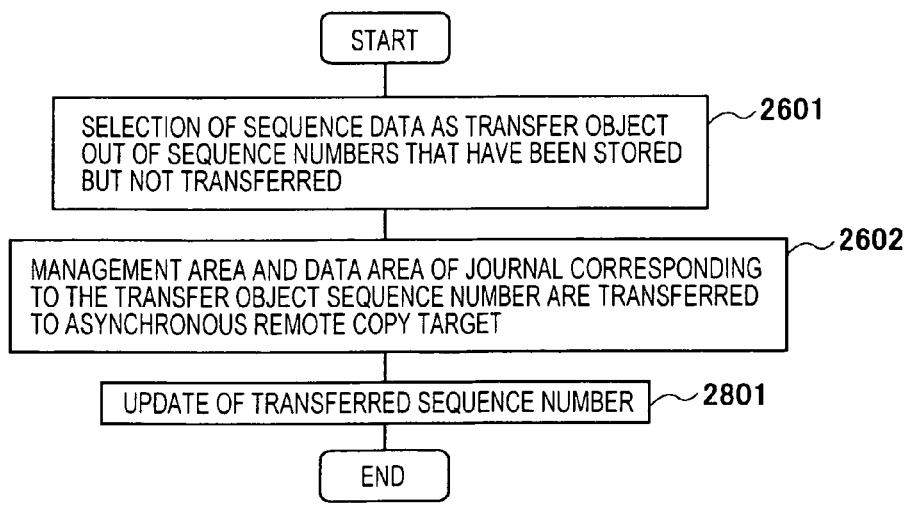
FIG. 28 is a chart showing another example of processes performed by the asynchronous transfer program (W) in the second embodiment.
Figure 29:
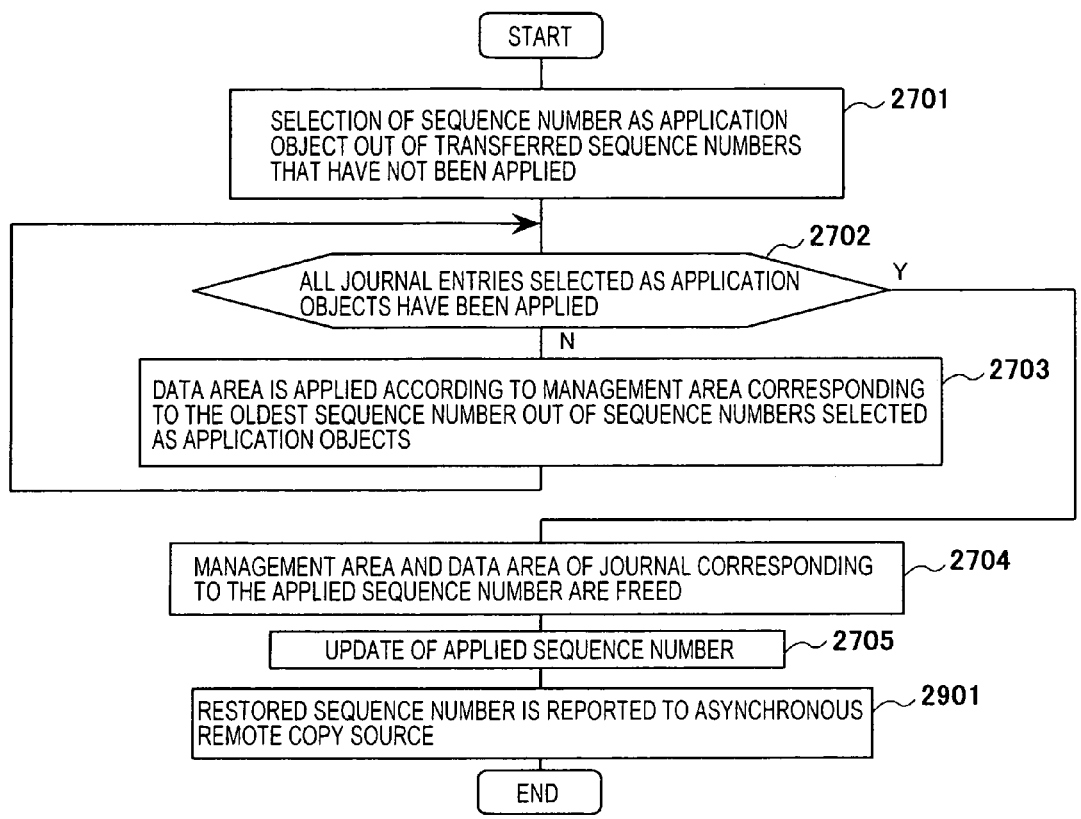
FIG. 29 is a chart showing another example of processes performed by the asynchronous applying program in the second embodiment.
Figure 30:
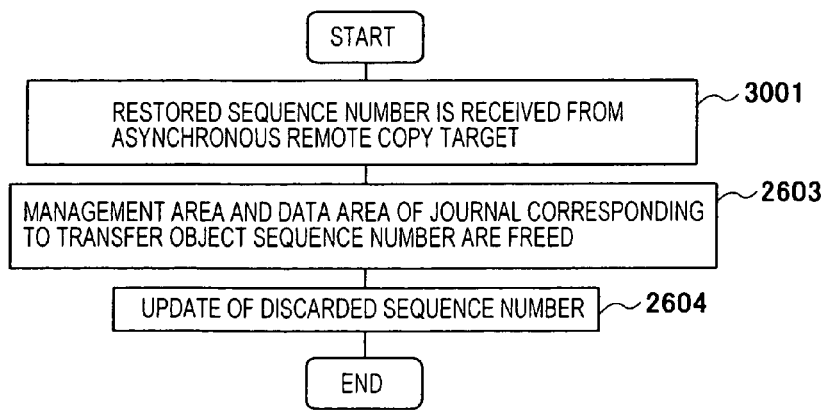
FIG. 30 is a chart showing another example of processes performed by the asynchronous transfer program (W) in the second embodiment.

FIGS. 28 and 30 show other examples of the asynchronous transfer program (W), and FIG. 29 shows another example of the asynchronous applying program.

In asynchronous remote copying using a journal volume, when the storage system 2 in the local site receives write data from the host 1, the storage system 2 stores the write data as a journal into the journal volume made up from storage areas of the storage devices 22. Accordingly, the storage system 2 in the local site can temporarily store a larger quantity of update data, in comparison with the method of asynchronous remote copying in the first embodiment in which write data stored in the cache memory 26 is managed using the sequence management information and sent to the storage system in the remote site. As a result, when the copy source storage system 2 discards the journal after the journal is applied in the copy target storage system, coincidence of the secondary volume with the primary volume can be realized by transferring the journal again without copying the whole primary volume to the secondary volume, if a failure occurs in the non-applied journal in the copy target.

FIG. 28 shows another example of the asynchronous transfer program (W). In comparison with FIG. 26, the asynchronous transfer program shown in FIG. 28 has Step 2801 instead of Step 2603 (in which the management area and the data area corresponding to the transferred sequence number are freed) and Step 2604 (in which the discarded sequence number is updated) of FIG. 26, and updates the transferred sequence number in Step 2801. Since processes corresponding to Steps 2603 and 2604 of FIG. 26 are performed after applying the journal to the remote copy source (these processes will be described later referring to FIG. 30), the asynchronous transfer program (W) updates the transferred sequence number at a point of time when the data stored in the management area and the data area of the journal is transferred.

FIG. 29 shows another example of the asynchronous applying program. In comparison with the asynchronous applying program shown in FIG. 27, Step 2901 (in which the applied sequence number is reported to the asynchronous remote copy source) is added in the FIG. 29. Receiving this report, the asynchronous transfer program (W) of the copy source performs the processes shown in FIG. 30. When the copy source valid flag of the secondary volume to which the journal volume is applied is set with "transitional", the storage system 2_3 in the remote site receives the contents of the journal volume from both the storage system 2_1 having the migration source primary volume V1 and the storage system 2_2 having the migration target primary volume V2, the above-mentioned report is sent to both the storage system 2_1 having the migration source primary volume V1 and the storage system 2_2 having the migration target primary volume V2.

FIG. 30 shows an example of processes performed by the asynchronous transfer program (W). As described referring to FIG. 28, the asynchronous transfer program (W) receives the report of Step 2901 of FIG. 29 (Step 3001), and performs processes corresponding to Steps 2603 and 2604 of FIG. 26.

Figure 31:
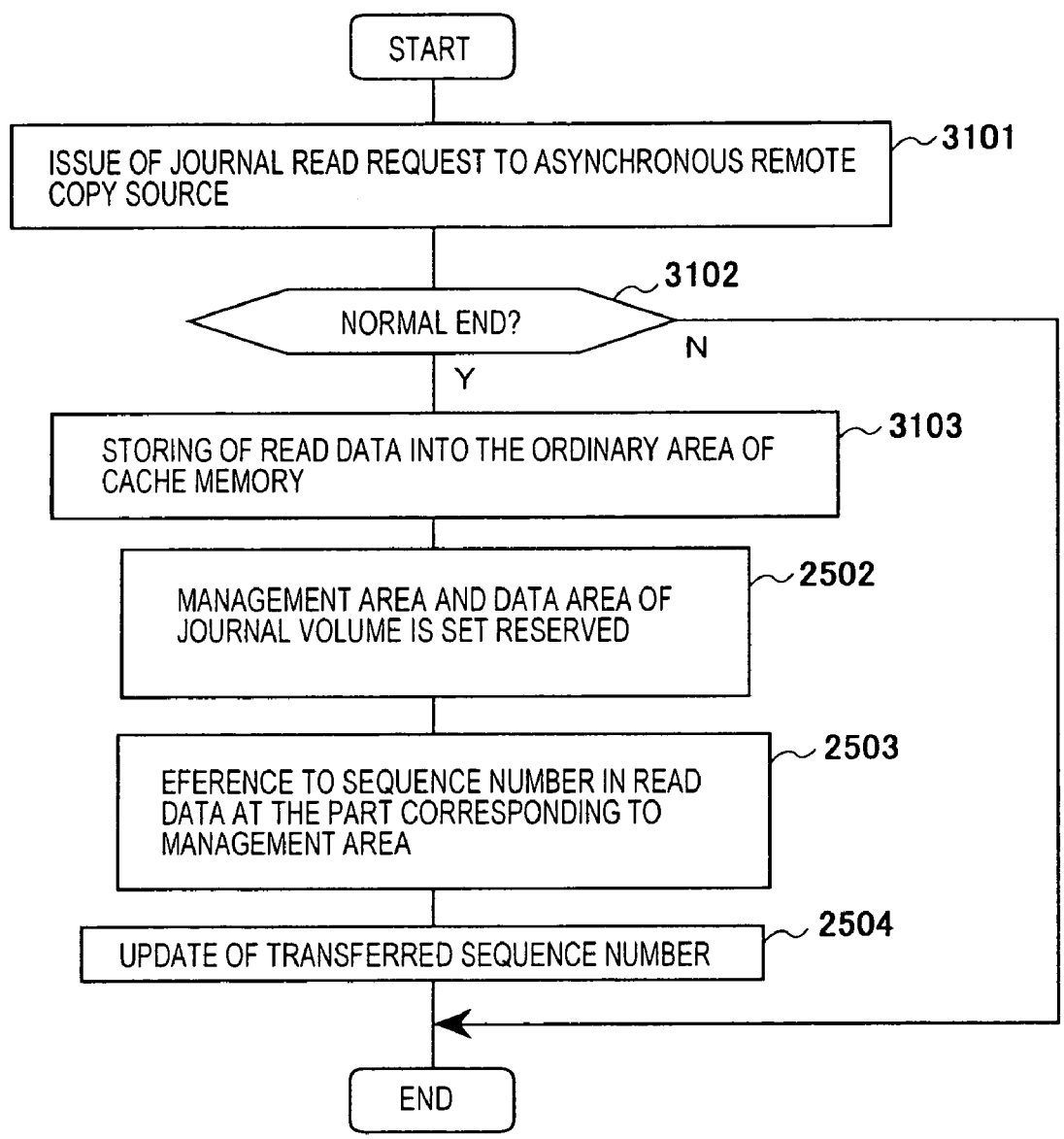
FIG. 31 is a chart showing an example of processes performed by an asynchronous transfer program (R) in the second embodiment.
Figure 32:
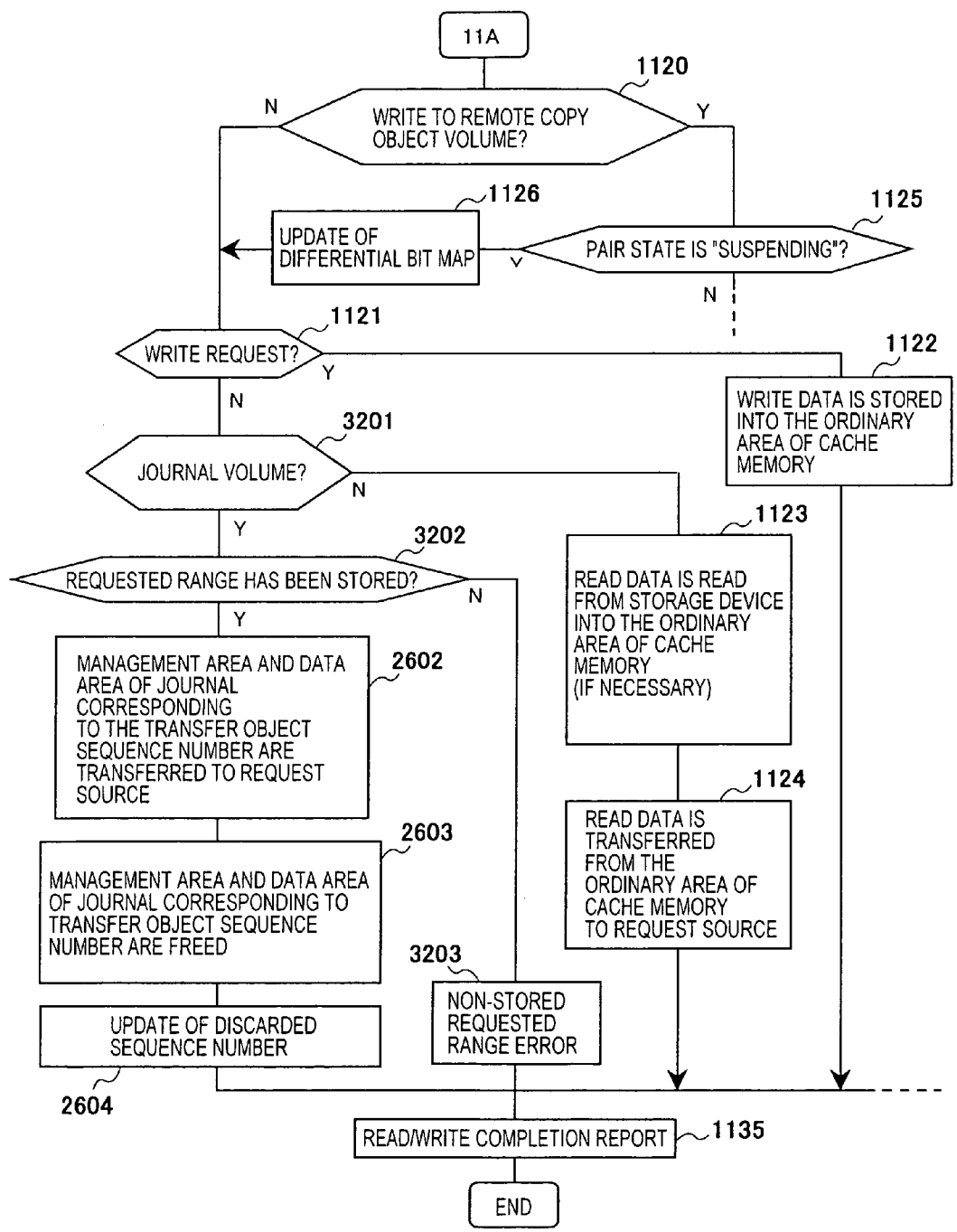
FIG. 32 is a chart showing another example of processes performed by the read/write program (primary) in the second embodiment.

FIG. 31 shows an example of processes performed by the asynchronous transfer program (R), and FIG. 32 shows another example of processes performed by the read/write program (primary).

In the case of the asynchronous transfer program (w) of FIGS. 26, 28 and 30 and the read/write program (secondary) of FIG. 25, the asynchronous transfer program (W) operates in the copy source to perform the processing of transferring and writing the journal from the copy source to the copy target. However, in FIG. 31, the asynchronous transfer program (R) operates in the copy target to read, from the copy target, the journal stored in the copy source. In the case where the copy source valid flag of the secondary volume to which the journal volume in question is applied is set with "transitional", the contents of the journal volume exist in both the storage system 2_1 having the migration source primary volume V1 and the storage system 2_2 having the migration target primary volume V2. Accordingly, the asynchronous transfer program (R) reads the contents of the journal volume from both the storage system 2_1 having the migration source primary volume V1 and the storage system 2_2 having the migration target primary volume V2.

First, the asynchronous transfer program (R) issues a journal read request to the copy source of the asynchronous remote copying (Step 3101). A read range may be a storage area in the journal volume corresponding to sequence numbers of a certain range, or a storage area in the journal volume corresponding to a certain quantity of journal data. Next, the asynchronous transfer program (R) judges whether the read request ended normally (Step 3102). In the case of an error end (N in Step 3102), the processing is ended. In that case, the asynchronous transfer program (R) may resume the processing from Step 3101, after a given period, or at a frequency determined, for example, by a difference of sequence numbers between the transferred sequence number and the applied sequence number.

In the case of a normal end (Y in Step 3102), the asynchronous transfer program (R) stores the read data into the ordinary area of the cache memory 26 (Step 3103), and thereafter performs the same processes as Steps 2502, 2503 and 2504 shown in FIG. 25.

FIG. 32 shows another example of processes performed by the read/write program (primary). For the sake of simplicity, FIG. 32 omits processes corresponding to Steps 1127, 1128, 1129, 2401, 2402, 2403, 1133 and 2404 of FIG. 24, although these steps are performed also by the read/write program (primary).

In the case where the read/write program (primary) judges the request is a read request in Step 1121 (N in Step 1121), the read/write program (primary) judges the read object volume is the journal volume, based on the journal volume flag (Step 3201). In the case where the read object volume is not the journal volume (N in step 3201), the read/write program (primary) proceeds to Step 1123 to perform processes similar to Steps 1123 and 1124 shown in FIG. 24.

In the case where the volume in question is the journal volume (Y in Step 3201), the read/write program (primary) judges whether the read request range has been stored (Step 3202). In the case where the range has not been stored (N in Step 3202), the read/write program (primary) sets a non-stored request range error into a completion report (Step 3203) and proceeds to Step 1135. In the case where the volume in question has been stored (Y in Step 3202), the read/write program (primary) performs the same processes as the above-described Steps 2602, 2603 and 2604.

Further, the journal volume in course of use by the storage system 2_1 having the migration source primary volume V1 may be migrated as a data migration object volume to the storage system 2_2 having the migration target primary volume V2. In that case, in Step 906 of FIG. 9, the journal volume management information is also reported to the storage system 2_2 having the migration target primary volume V2. Further, only an area of the journal volume, which stores journal that has not been transferred to the storage system 2_3 having the secondary volume, may become the object of data migration, by setting OFF to the data migration completion bit map at the corresponding bits (for example, by clearing to 0).

According to the above-described first and second embodiments, data stored in a primary volume of remote copying can be migrated to a new primary volume while continuing the remote copying and receiving and processing read/write requests from a host 1. Further, even when the data stored in the primary volume of the remote copying has been migrated to the new primary volume, the update order from the host 1 can be secured for a secondary volume existing in a remote site. In other words, the data can be written into the secondary volume existing in the remote site in the same order that the data was written into the primary volume.

What is claimed is

1. A method of controlling data transfer in a virtualization system, the virtualization system coupled to a host system and a plurality of storage systems and having a virtual volume related to a first logical volume, the first logical volume being related to a portion of disk drives in a first storage system of the storage systems, the method comprising:

receiving a first input request, the first input request being sent from the host system and targeted to the virtual volume;

transferring data of the first input request to the first logical volume, so that the first storage system inputs the data of the first input request into a storage area of the disk drives related to the first logical volume;

copying data stored in the first logical volume to a second logical volume related to a portion of disk drives in a second storage system of the storage systems;

starting to migrate data stored in the first logical volume to a third logical volume related to a portion of disk drives in a third storage system of the storage systems during the copying step; and processing a new input request targeting the virtual volume according to differential information that records locations for which data migration is completed in the first logical volume and the third logical volume when the virtualization system receives the new input request to the virtual volume from the host system during the migration step.

2. The method of controlling data transfer as recited in claim 1, further comprising:

remapping the virtual volume to map to the third logical volume in the third storage system prior to said migration step;

receiving, at the third storage system, management information related to the copying of the data stored in the first logical volume to the second logical volume;

receiving new data associated with the new input reguest at the third storage system during said migration step; and copying the new data from the third storage system to the second logical volume at the second storage system based on the management information received from the first storage system.

3. The method of controlling data transfer as recited in claim 2, further comprising:

causing all current requests to the first storage system to end in errors, so that when those current requests are retried, the retried requests sent to the virtual volume are received by the third storage system.

4. The method of controlling data transfer as recited in claim 2, further comprising:

retaining the new input request in a virtual management network apparatus until all current requests received from the host by the first storage system directed to the first logical volume have been processed, and forwarding the new input request to the third storage system after completion of all the current request.

5. The method of controlling data transfer as recited in claim 2, further comprising:

sending, by a management system in the virtualization system, an instruction to the third storage system for operating the third logical volume as a primary volume for copying the new data to the second logical volume.

6. The method of controlling data transfer as recited in claim 2, further comprising:

sending, by a management system in the virtualization system, an instruction to the third storage system for relaying the management information from the first storage system to the third storage system.

7. The method of controlling data transfer as recited in claim 1, further comprising:

receiving a write reguest at the second storage system directed to the second logical volume;

when the write reguest is for an asynchronous remote copy write reguest, assigning a sequence number for data associated with the write request and reserving an area for storing the sequence number;

storing the data associated with the write request into cache memory; and when the write request is for an asynchronous remote copy write request, registering the data associated with the write request to formalization object data.

8. A method of controlling data transfer in a virtualization system, the virtualization system coupled to a host system and a plurality of storage systems and having a virtual volume related to a first logical volume, the first logical volume being related to a portion of disk drives in a first storage system of the storage systems, the method comprising:

receiving a first input request, the first input request being sent from the host system and targeted to the virtual volume transferring data of the first input request to the first logical volume, so that the first storage system inputs the data of the first input request into a storage area of the disk drives related to the first logical volume;

copying data stored in the first logical volume to a second logical volume related to a portion of disk drives in a second storage system of the storage systems;

migrating data stored in the first logical volume to a third logical volume related to a portion of disk drives in a third storage system of the storage systems during the copying step; and processing a new input request targeting the virtual volume according to differential information that records locations for which data migration is completed in the first logical volume and the third logical volume when the virtualization system receives the new input request to the virtual volume from the host system during the migration step.

9. The method of controlling data transfer as recited in claim 8, further comprising:

remapping the virtual volume to map to the third logical volume in the third storage system prior to said migration step;

receiving, at the third storage system, management information related to the copying of the data stored in the first logical volume to the second logical volume;

receiving new data associated with the new input request at the third storage system during said migration step; and copying the new data from the third storage system to the second logical volume at the second storage system based on the management information received from the first storage system.

10. The method of controlling data transfer as recited in claim 9, further comprising:

causing all current requests to the first storage system to end in errors, so that when those current requests are retried, the retried requests sent to the virtual volume are received by the third storage system.

11. The method of controlling data transfer as recited in claim 9, further comprising:

retaining the new input request in a virtual management network apparatus until all current requests received from the host by the first storage system directed to the first logical volume have been processed; and forwarding the new input request to the third storage system after completion of all the current requests.

12. The method of controlling data transfer as recited in claim 9, further comprising:

sending, by a management system in the virtualization system, an instruction to the third storage system for operating the third logical volume as a primary volume of the step of copying the new data to the second logical volume.

13. The method of controlling data transfer as recited in claim 9, further comprising:

sending, by a management system in the virtualization system, an instruction to the third storage system for relaying the management information from the first storage system to the third storage system.

14. The method of controlling data transfer as recited in claim 13, further comprising:

storing the new data to the third logical volume, so that the third storage system inputs the new data of the new input request into the storage area of the third disk drives allocated to the third logical volume and forwarding of the new data to the first logical volume on the first storage system does not take place.

15. A method of controlling data transfer in a virtualization system, the virtualization system coupled to a host system and a plurality of storage systems and having a virtual volume related to a first logical volume, the first logical volume being related to a portion of disk drives in a first storage system of the storage systems, the method comprising:

receiving a first input request, the first input request being sent from the host system and targeted to the virtual volume;

transferring data of the first input request to the first logical volume, so that the first storage system inputs the data of the first input request into a storage area of the disk drives related to the first logical volume; copying data stored in the first logical volume to a second logical volume related to a portion of disk drives in a second storage system of the storage systems;

starting to migrate, from a third logical volume, stored data sent from the host system and corresponding to data to be stored in the first logical volume, to a fourth logical volume related to a portion of disk drives in a third storage system of the storage systems during the copying step; and processing a new input request targeting the virtual volume according to differential information that records locations for which data migration is completed in the third logical volume and the fourth logical volume when the virtualization system receives the new input request to the virtual volume from the host system during the migration step.

16. The method of controlling data transfer as recited in claim 15, further comprising:

remapping the virtual volume to map to the fourth logical volume in the third storage system prior to said migration step;

receiving, at the third storage system, management information related to the copying of the data stored in the first logical volume to the second logical volume;

receiving new data associated with the new input request at the third storage system during said migration step; and copying the new data from the third storage system to the second logical volume at the second storage system based on the management information received from the first storage system.

17. The method of controlling data transfer as recited in claim 16, further comprising:

storing the new data to the fourth logical volume, so that the third storage system inputs the new data of the new input request into the storage area of the third disk drives allocated to the third logical volume and forwarding of the new data to the first logical volume on the first storage system does not take place.

18. A method of controlling data transfer in a virtualization system, the virtualization system coupled to a host system and a plurality of storage systems and having a virtual volume related to a first logical volume, the first logical volume being related to a portion of disk drives in a first storage system of the storage systems, the method comprising:

receiving a first input request, the first input request being sent from the host system and targeted to the virtual volume;

transferring data of the first input request to the first logical volume, so that the first storage system inputs the data of the first input request into a storage area of the disk drives related to the first logical volume;

copying, from a second logical volume, stored data sent from the host system and corresponding to data to be stored in the first logical volume, to a third logical volume related to a portion of disk drives in a second storage system of the storage systems;

starting to migrate data from the first logical volume to a fourth logical volume related to a portion of disk drives in a third storage system of the storage systems during the copying step; and processing a new input request targeting the virtual volume according to differential information that records locations for which data migration is completed in the first logical volume and the fourth logical volume when the virtualization system receives the new input request to the virtual volume from the host system during the migration step.

19. The method of controlling data transfer as recited in claim 18, further comprising:

remapping the virtual volume to map to the fourth logical volume in the third storage system prior to said migration step;

receiving, at the third storage system, management information related to the copying of the data stored in the first logical volume to the second logical volume:

receiving new data associated with the new input request at the third storage system during said migration step; and copying the new data from the third storage system to the second logical volume at the second storage system based on the management information received from the first storage system.

20. The method of controlling data transfer as recited in claim 19, further comprising:

storing the new data to the fourth logical volume, so that the third storage system inputs the new data of the new input request into the storage area of the third disk drives allocated to the third logical volume and forwarding of the new data to the first logical volume on the first storage system does not take place.

* * * * *